(12) United States Patent
Yada

(10) Patent No.: US 7,532,360 B2
(45) Date of Patent: May 12, 2009

(54) IMAGE OUTPUT APPARATUS

(75) Inventor: Junya Yada, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/521,791

(22) Filed: Sep. 15, 2006

(65) Prior Publication Data
US 2007/0115490 A1 May 24, 2007

(30) Foreign Application Priority Data
Sep. 16, 2005 (JP) ............................. 2005-270118
Sep. 16, 2005 (JP) ............................. 2005-270130

(51) Int. Cl.
G06F 15/00 (2006.01)
H04N 1/40 (2006.01)
(52) U.S. Cl. ......................... 358/1.9; 358/448; 358/471
(58) Field of Classification Search ................ 358/1.13, 358/1.9, 2.1, 3.06, 3.14, 3.15, 321, 530, 540, 358/471, 448, 504
See application file for complete search history.

(56) References Cited

U.S. PATENT DOCUMENTS

| 5,768,432 | A  | * | 6/1998  | Schweid ...................... 382/237 |
| 5,838,463 | A  | * | 11/1998 | Gahang ...................... 358/465 |
| 6,157,749 | A  | * | 12/2000 | Miyake ....................... 382/300 |
| 6,215,519 | B1 | * | 4/2001  | Nayar et al. .................. 348/159 |
| 6,543,870 | B1 | * | 4/2003  | Kakutani ...................... 347/15 |
| 6,674,538 | B2 | * | 1/2004  | Takahashi ................... 358/1.15 |
| 6,711,998 | B2 | * | 3/2004  | Hashimoto ................... 101/129 |
| 6,724,497 | B1 | * | 4/2004  | Takahashi ................... 358/1.15 |
| 6,731,400 | B1 | * | 5/2004  | Nakamura et al. ........... 358/1.9 |
| 6,747,758 | B1 | * | 6/2004  | Nishida ....................... 358/1.9 |
| 6,771,835 | B2 | * | 8/2004  | Han et al. .................... 382/260 |
| 7,173,734 | B2 | * | 2/2007  | Klassen et al. ............... 358/1.9 |
| 7,180,636 | B2 | * | 2/2007  | Hashimoto et al. ......... 358/3.15 |
| 7,295,334 | B2 | * | 11/2007 | Hashimoto et al. ......... 358/1.15 |
| 2004/0215706 | A1 | * | 10/2004 | Lavender et al. ............ 709/201 |
| 2005/0068585 | A1 | * | 3/2005  | Shimizu ...................... 358/2.1 |
| 2005/0213160 | A1 | * | 9/2005  | Namikata ................... 358/3.27 |
| 2006/0056735 | A1 | * | 3/2006  | De Haan ..................... 382/299 |
| 2007/0171439 | A1 | * | 7/2007  | Kakutani .................... 358/1.9 |

FOREIGN PATENT DOCUMENTS

WO WO 2004/086750 A1 10/2004

* cited by examiner

Primary Examiner—King Y Poon
Assistant Examiner—Huo Long Chen
(74) Attorney, Agent, or Firm—Edwards Angell Palmer & Dodge LLP; John J. Penny, Jr.

(57) ABSTRACT

The image output apparatus of the invention includes a main unit group of multiple main units connected in series to perform preset series of image processing and a pass unit group of multiple pass units connected in series to be parallel with the multiple main units. The averaged data of the tone values of four pixels generated by a black/white edge processing unit are sequentially transferred through the main unit group. The standard edge data and the noise data generated by a color conversion unit are sequentially transferred through the pass unit group, synchronously with the transfer of the averaged data through the main unit group. The data transferred through the pass unit group enters an inner-block smoothing unit to go through the smoothing process. The image output apparatus of the invention has the hardware configuration that allows flexible design change according to the required series of image processing.

3 Claims, 41 Drawing Sheets

Fig.3
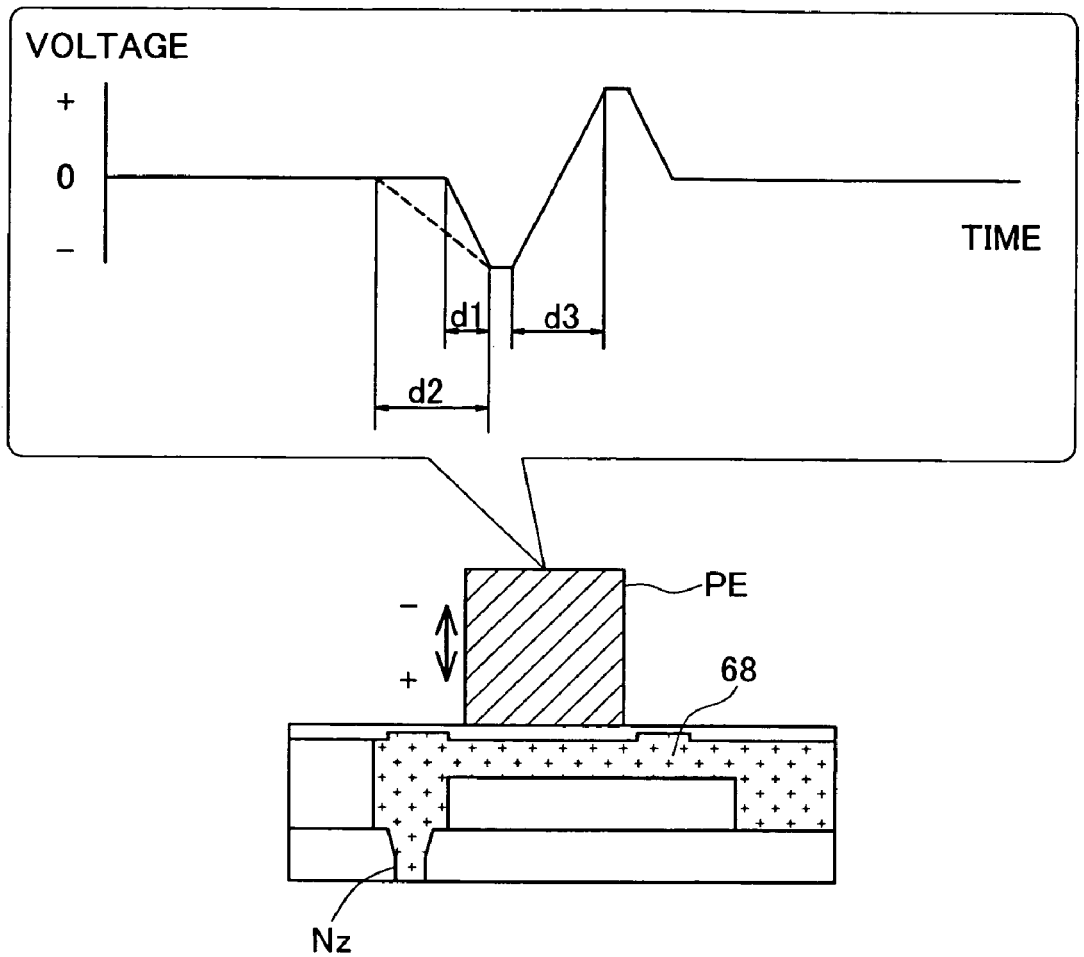
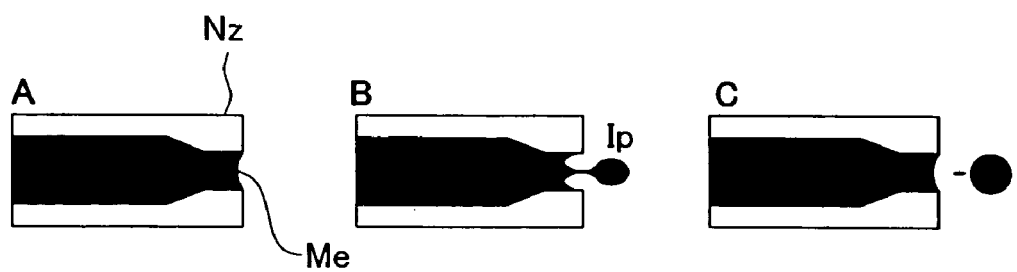
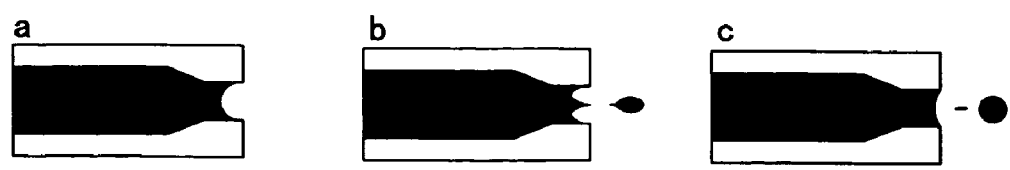

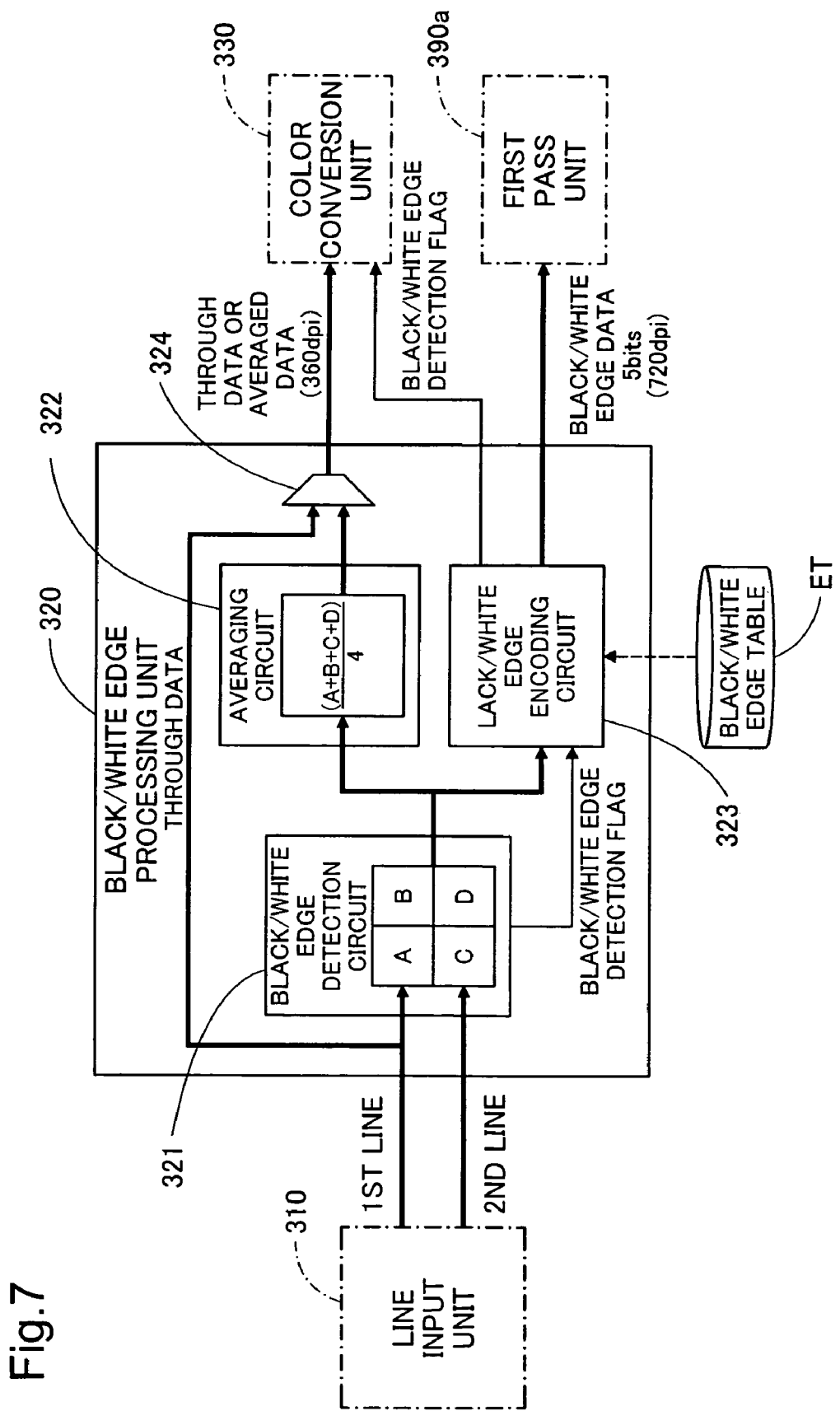

2x2 PIXEL PATTERN

BLACK/WHITE EDGE TABLE — ET

| A | B | C | D | ENCODED DATA |
|---|---|---|---|---|
| 0 | 0 | 0 | 255 | 0001 |
| 0 | 0 | 255 | 0 | 0010 |
| 0 | 0 | 255 | 255 | 0011 |
| 0 | 255 | 0 | 0 | 0100 |
| 0 | 255 | 0 | 255 | 0101 |
| 0 | 255 | 255 | 0 | 0110 |
| 0 | 255 | 255 | 255 | 0111 |
| 255 | 0 | 0 | 0 | 1000 |
| 255 | 0 | 0 | 255 | 1001 |
| 255 | 0 | 255 | 0 | 1010 |
| 255 | 0 | 255 | 255 | 1011 |
| 255 | 255 | 0 | 0 | 1100 |
| 255 | 255 | 0 | 255 | 1101 |
| 255 | 255 | 255 | 0 | 1110 |

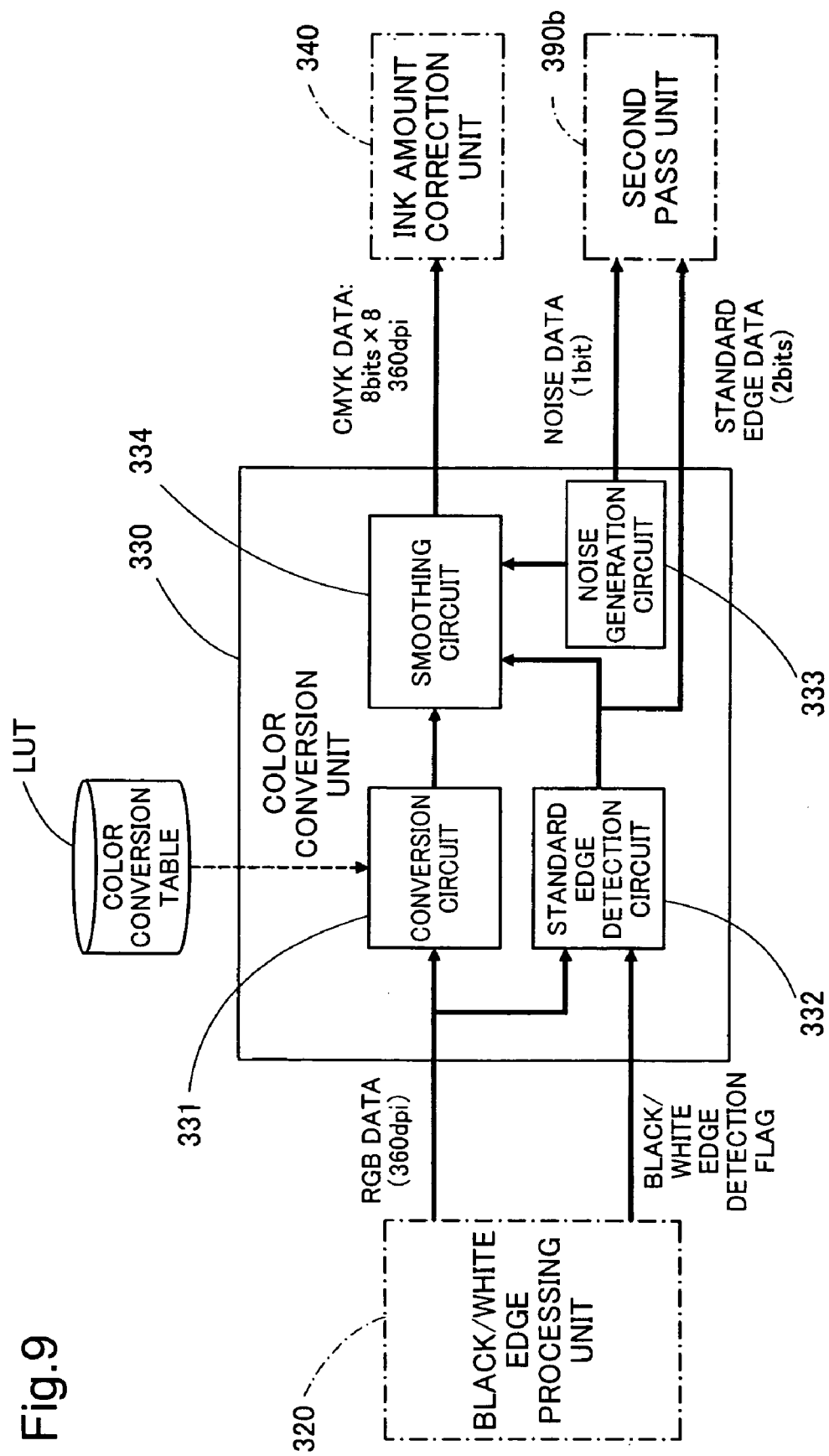

Fig.17
IDENTIFICATION OF BLOCK NUMBER IN 2×2 MODE
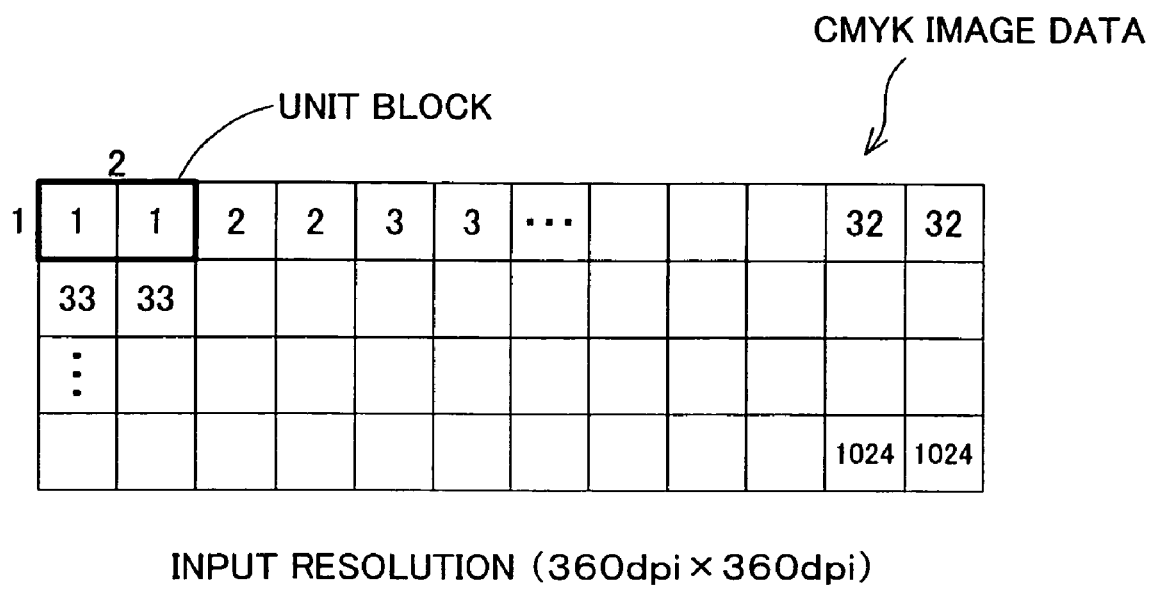
INPUT RESOLUTION (360dpi × 360dpi)
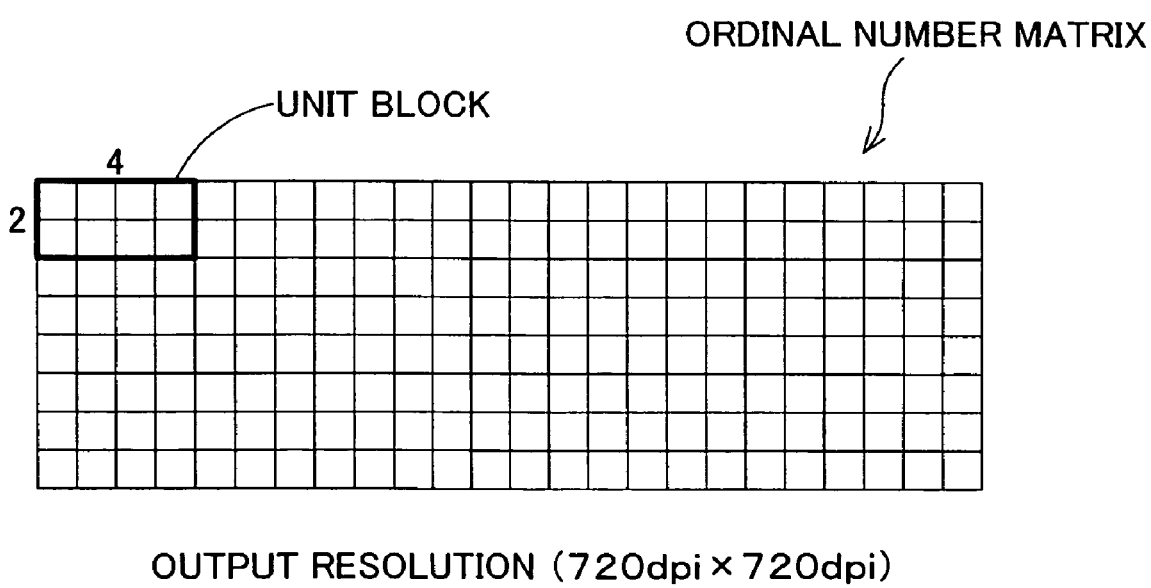
OUTPUT RESOLUTION (720dpi × 720dpi)

Fig.23

SECOND DOT NUMBER TABLE — DT2

| FIRST DOT NUMBER DATA (DECIMAL) | SECOND DOT NUMBER DATA (BINARY) | NUMBERS OF RESPECTIVE SIZE DOTS (REFERENCE) | | |
|---|---|---|---|---|
| | | SMALL -SIZE DOT (01) | MEDIUM -SIZE DOT (10) | LARGE -SIZE DOT (11) |
| 0 | 0000000000000000 | 0 | 0 | 0 |
| 1 | 0000000000000001 | 1 | 0 | 0 |
| 2 | 0000000000000101 | 2 | 0 | 0 |
| 3 | 0000000000010101 | 3 | 0 | 0 |
| 160 | 1010111111111111 | 0 | 2 | 6 |
| 161 | 0011111111111111 | 0 | 0 | 7 |
| 162 | 0111111111111111 | 1 | 0 | 7 |
| 163 | 1011111111111111 | 0 | 1 | 7 |
| 164 | 1111111111111111 | 0 | 0 | 8 |

NUMBERS OF RESPECTIVE SIZE DOTS

LARGE-SIZE DOT
MEDIUM-SIZE DOT
SMALL-SIZE DOT

FIRST DOT NUMBER DATA (0 to 164)

Fig.24

| 8 | 7 | | 6 | | 5 | | 4 | | 3 | | 2 | | 1 | |
|---|---|---|---|---|---|---|---|---|---|---|---|---|---|---|
| 0 | 0 | 0 | 1 | 0 | 1 | 1 | 0 | 1 | 0 | 1 | 1 | 1 | 1 | 1 |

NONE | SMALL-SIZE DOT | SMALL-SIZE DOT | MEDIUM-SIZE DOT | MEDIUM-SIZE DOT | LARGE-SIZE DOT | LARGE-SIZE DOT | LARGE-SIZE DOT

Fig.25

ORDINAL NUMBER MATRIX

CLASSIFICATION NUMBER 1 | CLASSIFICATION NUMBER 2 | CLASSIFICATION NUMBER 3

| 1 | 6 | 3 | 5 | 3 | 6 | 4 | 5 | 6 | 4 | 1 | 7 |
|---|---|---|---|---|---|---|---|---|---|---|---|
| 8 | 4 | 7 | 2 | 8 | 1 | 7 | 2 | 2 | 8 | 5 | 3 |

⋮

OM

Fig.26
ORDINAL NUMBER MATRIX
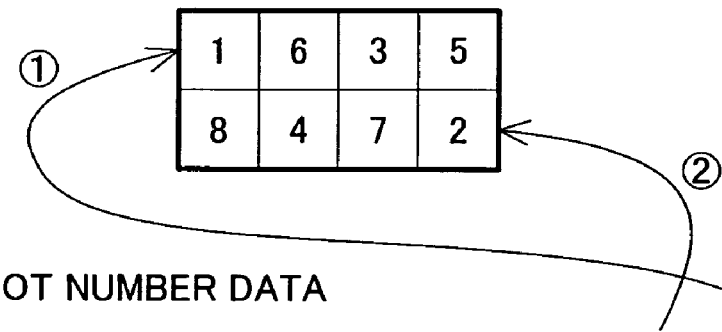
SECOND DOT NUMBER DATA
| 8 | 7 | 6 | 5 | 4 | 3 | 2 | 1 |
| 0 | 0 | 0 | 1 | 0 | 1 | 1 | 0 | 1 | 0 | 1 | 1 | 1 | 1 | 1 | 1 |
NONE | SMALL-SIZE DOT | SMALL-SIZE DOT | MEDIUM-SIZE DOT | MEDIUM-SIZE DOT | LARGE-SIZE DOT | LARGE-SIZE DOT | LARGE-SIZE DOT
INTERMEDIATE DOT DATA
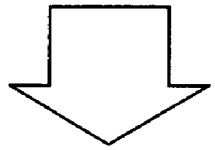
DOT IMAGE
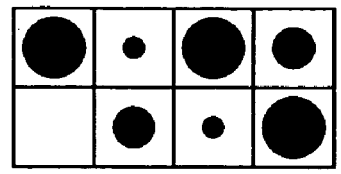

IDENTIFICATION OF BLOCK NUMBER IN 2 × 1 MODE

IDENTIFICATION OF BLOCK NUMBER IN 4 × 2 MODE

Fig.37 SORTING OF DOTS IN 2×1 MODE

Fig.38
SORTING OF DOTS IN 4 × 2 MODE
INTERMEDIATE DOT DATA (1 × 1 DOTS)
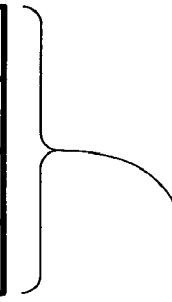
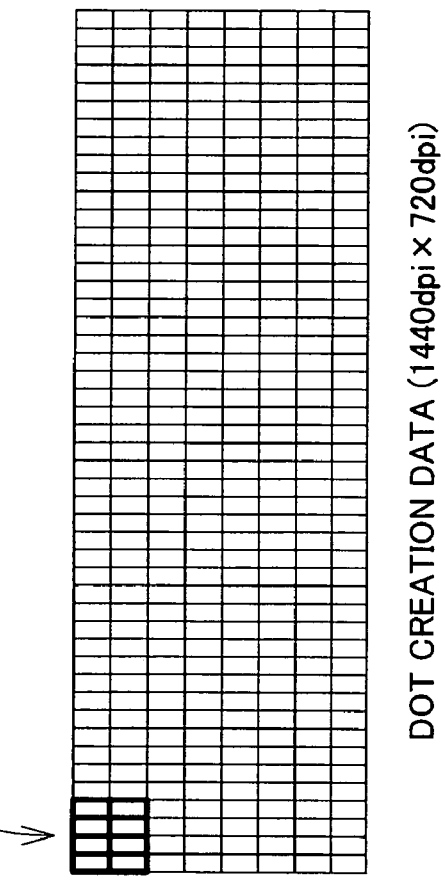
DOT CREATION DATA (1440dpi × 720dpi)

IMAGE OUTPUT APPARATUS

CLAIM OF PRIORITY

The present application claims priority from Japanese Patent Applications P2005-270118A filed on Sep. 16, 2005 and P2005-270130A filed on Sep. 16, 2005, the contents of which are hereby incorporated by reference into this application.

BACKGROUND OF THE INVENTION

1. Field of the Invention

The present invention relates to an image output apparatus that inputs image data of a multi-tone image at a preset input resolution, converts the input image data to generate dot creation data, and creates dots according to the generated dot creation data on a printing medium at an output resolution of not lower than the preset input resolution.

2. Description of the Related Art

The printing resolution of printers and other printing apparatuses has been increasing year after year and often exceeds the resolution of images taken with digital cameras. In such cases, one pixel of image data to be printed corresponds to a set of multiple pixels as printing units. For example, when the resolution of an object image to be printed is 360 dpi×360 dpi and the printing resolution is 1440 dpi×720 dpi, one pixel of the image data corresponds to a set of 4×2 pixels in the printing apparatus.

In such cases, the tone value of each pixel requires multi-valuing according to the number and the positions of dots to be created in a group of 4×2 pixels. The simplest method applies the principle of area tone to each group of 4×2 pixels to express 9 different tones from the state of no dot creation in any pixel to the state of dot creation in all the pixels (density pattern method). The applicant of the invention has proposed a method that locally applies the systematic dither technique to the set of 4×2 pixels to enable the high-speed image processing while keeping the high picture quality by the systematic dither technique (see International Publication No. WO-2004-086750A). This innovative method enables the extremely high-speed halftoning process and ensures the high picture quality equivalent to the picture quality attained by the conventional systematic dither method.

Images including characters or letters generally require the sharper reproducibility at the edges of the characters, compared with natural images. The proposed technique has advantages in the processing speed and the resulting picture quality. The high reproducibility of the edges of the characters requires the high resolution of an input image. The high resolution of the input image, however, may cause undesirable extension of the total processing time by this proposed method, like the conventional methods.

The object of the invention is thus to enhance the processing speed when image data includes edges, such as characters and symbols.

SUMMARY

In order to attain at least part of the above and the other related objects, the present invention is directed to an image output apparatus that makes input image data subjected to a preset series of image processing and outputs processed image data.

The image output apparatus has: an image processing unit group including multiple image processing units that are connected in series to process first intermediate data based on the input image data by respective series of image processing and sequentially transfer the processed first intermediate data through the multiple image processing units in the image processing unit group; a pass unit group including multiple pass units that are connected in series to receive second intermediate data different from the first intermediate data and sequentially transfer the second intermediate data synchronously with transfer of the first intermediate data through the multiple image processing units; and an output image generation module that generates an output image, based on at least either of outputs from the image processing unit group and from the pass unit group.

In the image output apparatus of the invention, transfer of the first intermediate data through the image processing unit group is synchronous with transfer of the second intermediate data through the pass unit group. The output image is generated, based on at least either of the outputs from the image processing unit group and from the pass unit group. The required operations for image processing of the image data and for the output of the image are thus adequately divided into the image processing unit group and the pass unit group.

In one preferable embodiment of the invention, the image output apparatus further includes: an intermediate data generation unit that divides the input image data into at least one unit pixel group including a preset number of plural pixels, generates the first intermediate data and the second intermediate data according to a characteristic of the unit pixel group, and outputs the generated first intermediate data to a first image processing unit on a first stage of the image processing unit group, while outputting the generated second intermediate data to a first pass unit on a first stage of the pass unit group; a data selector that inputs both the first intermediate data that has gone through the respective series of image processing by the image processing unit group and the second intermediate data that has been sequentially transferred through the pass unit group and selects one of the input first and second intermediate data based on a predetermined condition; and a data storage module that stores the intermediate data selected by the data selector.

The output image generation module uses the intermediate data stored in the data storage module to generate the output image.

In the image output apparatus of this embodiment, the input image data is divided into at least one unit pixel group including a preset number of plural pixels. The first intermediate data and the second intermediate data are generated according to the characteristic of the unit pixel group. The first intermediate data are sequentially transferred with going through the diverse series of image processing executed by the multiple image processing units. The second intermediate data is sequentially transferred through the pass unit group synchronously with the transfer of the first intermediate data through the image processing unit group. The data selector selects either the first intermediate data or the second intermediate data based on the predetermined condition. The selected first or second intermediate data is stored into the data storage module.

In the image output apparatus of this embodiment, the first intermediate data and the second intermediate data generated according to the characteristic of the unit pixel group are respectively transferred through the image processing unit group and through the pass unit group in a synchronous manner. The selected intermediate data is stored into the storage module as data used for generation of the output image. This arrangement enables the first intermediate data and the second intermediate data to be readily processed by different series of image processing. The first intermediate data and the second intermediate data are transferred synchronously, before being stored into the storage module. This arrangement enables the first intermediate data and the second intermediate data to be successively transferred through the image processing unit group and through the pass unit group at their accurate transfer orders. No hardware element is required for adjustment of the order of data transfer. This desirably simplifies the hardware configuration and significantly shortens the total time required for image processing. The respective pass units may process the second intermediate data by preset series of image processing, in addition to the transfer of the second intermediate data.

In one preferable application of the image output apparatus of the invention, a first image processing unit located at a stage other than a final stage in the image processing unit group is connected with a first pass unit located at a stage other than a final stage in the pass unit group and outputs the second intermediate data to the first pass unit.

A second pass unit located at a later stage than the first pass unit in the pass unit group is connected with a second image processing unit located at a later stage than the first image processing unit in the image processing unit group and outputs the second intermediate data sequentially transferred from the first pass unit to the second image processing unit.

The second image processing unit uses the second intermediate data input from the second pass unit to process the first intermediate data transferred synchronously with the second intermediate data by a preset series of image processing.

In the image output apparatus of this application, the second intermediate data different from the first intermediate data is transferred through the pass unit group, which is the different pathway from the image processing unit group executing the diverse series of image processing. Namely only the first intermediate data are transferred through the image processing unit group. This arrangement does not require significant change of the hardware configuration, for example, the bus width or the buffer capacity of each image processing unit, in response to a change in data structure or data volume of the second intermediate data. This enhances the versatility of the respective image processing units and facilitates the design change of the image output apparatus.

In the image output apparatus of this application, the second intermediate data used for the image processing by a certain image processing unit is transferable through the pass unit group to another image processing unit. The second intermediate data can then be reused for the image processing by the another image processing unit. This arrangement does not require individual generation of the same second intermediate data commonly used for image processing by multiple image processing units. This desirably simplifies the hardware configuration and reduces the manufacturing cost.

Each image processing unit may not use the second intermediate data generated by itself. For example, when the first image processing unit has the richer hardware resource than the second image processing unit, the first image processing unit may generate the second intermediate data, which is originally expected to be generated by the second image processing unit. The image output apparatus of this application enable flexible transmission of the second intermediate data through the pass unit group. Even when there is a difference between the hardware resources of the image processing units, this arrangement absorbs such a difference to facilitate the design of the image output apparatus.

In the image output apparatus of the above application, the first intermediate data may be the image data itself, and the second intermediate data may be auxiliary data generated in the course of image processing executed by each image processing unit.

BRIEF DESCRIPTION OF THE DRAWINGS

FIG. 3 shows the principle of ejecting ink droplets of different sizes from an ink head 211;

FIG. 7 shows the internal structure of a black/white edge processing unit 320 shown in FIG. 5;

FIG. 9 shows the internal structure of a color conversion unit 330 shown in FIG. 5;

FIG. 17 shows identification of block numbers in a 2×2 mode;

FIG. 23 shows one example of a second dot number data DT2;

FIG. 24 shows one example of second dot number data;

FIG. 25 shows part of an ordinal number matrix OM shown in FIG. 13;

FIG. 26 conceptually shows arrangement of dots in 8 pixels based on the second dot number data and the ordinal number matrix OM;

FIG. 38 shows allocation of intermediate dot data in the 4×2 mode;

DESCRIPTION OF THE PREFERRED EMBODIMENTS

Figure 1:
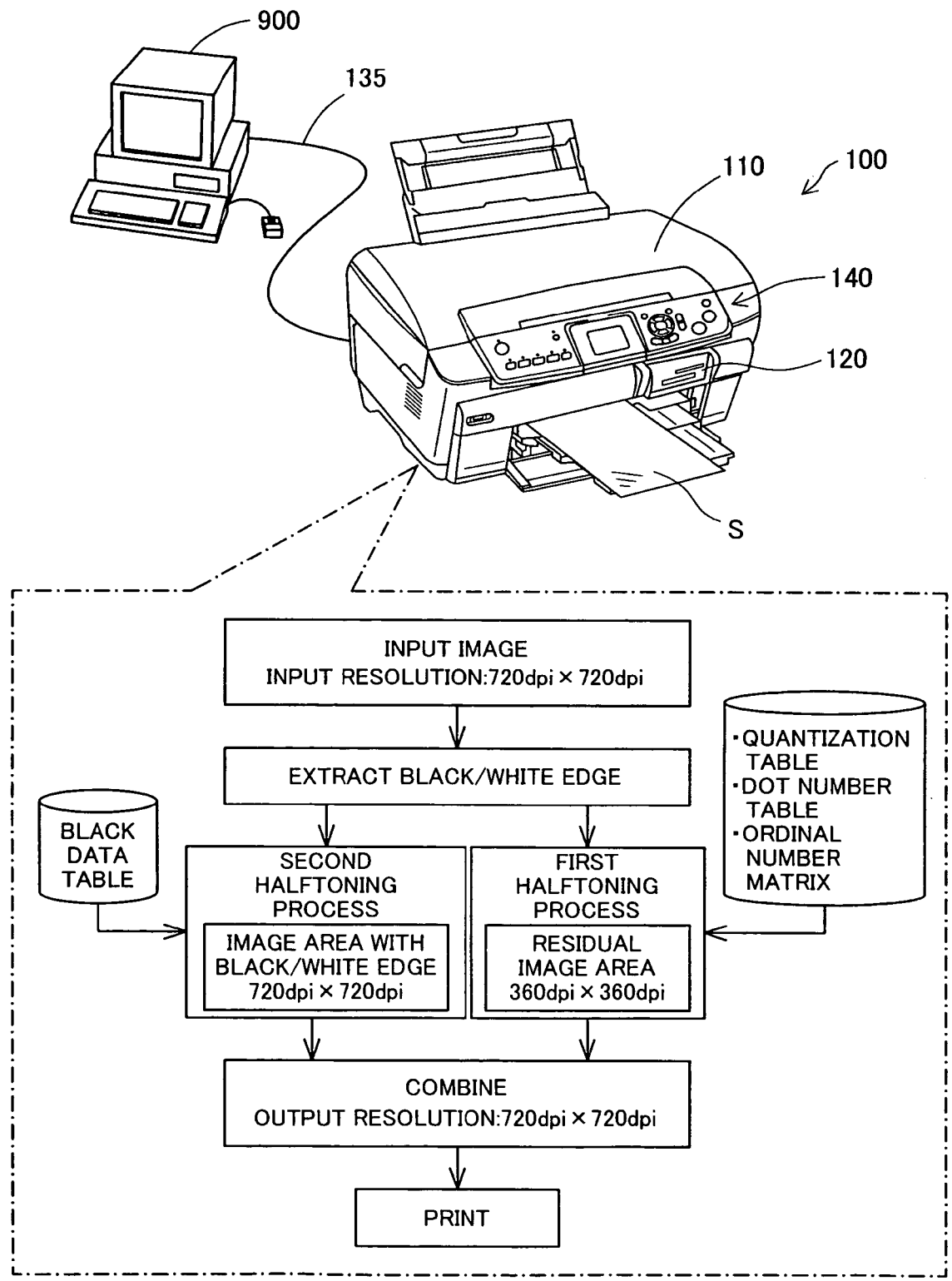
FIG. 1 schematically illustrates the configuration of a printing apparatus 100 in one embodiment of the invention.

In order to elucidate the functions and the effects of the invention, some modes of carrying out the invention are described below as preferred embodiments in the following sequence:

A. General Configuration of Printing Apparatus
B. Internal Structure of Printing Apparatus
C. Detailed Structure of Image Processing Unit
C-1. Color Conversion Circuit (Black/White Edge Encoding)
C-2. Halftoning Circuit (Black/White Edge Decoding, Halftoning)
C-3. Head-Driving Data Conversion Circuit
D. Effects of Embodiment
E. Data Flow in Halftoning Circuit in 1×1 Mode
F. Creation of Black Data Table
G. Other Output Resolution Modes
H. Modifications A. General Configuration of Printing Apparatus FIG. 1 schematically illustrates the configuration of a printing apparatus 100 in one embodiment of the invention. The printing apparatus 100 is one example of the image output apparatus of the invention. The printing apparatus 100 of the embodiment is connected with a computer 900 via a USB cable 135 or another means and prints data, such as images and documents, sent from the computer 900. The computer 900 is operated to specify various settings required for printing these data by the printing apparatus 100, for example, the type and the size of a printing medium S and the output resolution. The printing apparatus 100 has an operation panel 140 to be manipulated by the user for the specification of such settings. The combination of the printing apparatus 100 with the computer 900 may be regarded as an image output apparatus in a wide sense.

The printing apparatus 100 of the embodiment is a complex machine and has a scanner 110 on an upper portion thereof. The use of the scanner 110 enables the printing apparatus 100 to scan images and print the scanned images, regardless of connection with or disconnection from the computer 900. The printing apparatus 100 also has a memory card slot 120 on its front face to receive a memory card inserted therein. The printing apparatus 100 inputs images from a memory card inserted in the memory card slot 120 and prints the input images, regardless of connection with or disconnection from the computer 900.

The lower half of FIG. 1 briefly shows the operations of the printing apparatus 100 of the embodiment. The printing apparatus 100 of the embodiment inputs image data at a resolution of 720 dpi×720 dpi from the computer 900, the scanner 110, or the memory card and prints the input image data on the printing medium S at a resolution of 720 dpi×720 dpi. The printing process identifies the presence or the absence of any specific image area composed of only a black and white combination (hereafter referred to as 'black/white edge') in the input image data. In an image area without a black/white edge, the printing process temporarily lowers the resolution to 360 dpi×360 dpi and adopts a first halftoning process with reference to various tables including a quantization table, a dot number table, and an ordinal number matrix. In an image area with a black/white edge, on the other hand, the printing process keeps the resolution at 720 dpi×720 dpi and adopts a second halftoning process with reference to a black data table prepared in advance. The printing process combines the image area processed by the first halftoning process with the image area processed by the second halftoning process and outputs the combined image areas as a printing image at an output resolution of 720 dpi×720 dpi. This arrangement ensures clear, distinct, and high-resolution printing of characters, letters, symbols, and marks expressed by black and white combinations, while reducing the data volume for printing a residual background image. The detailed structure of the printing apparatus 100 is described below.

B. Internal Structure of Printing Apparatus

Figure 2:
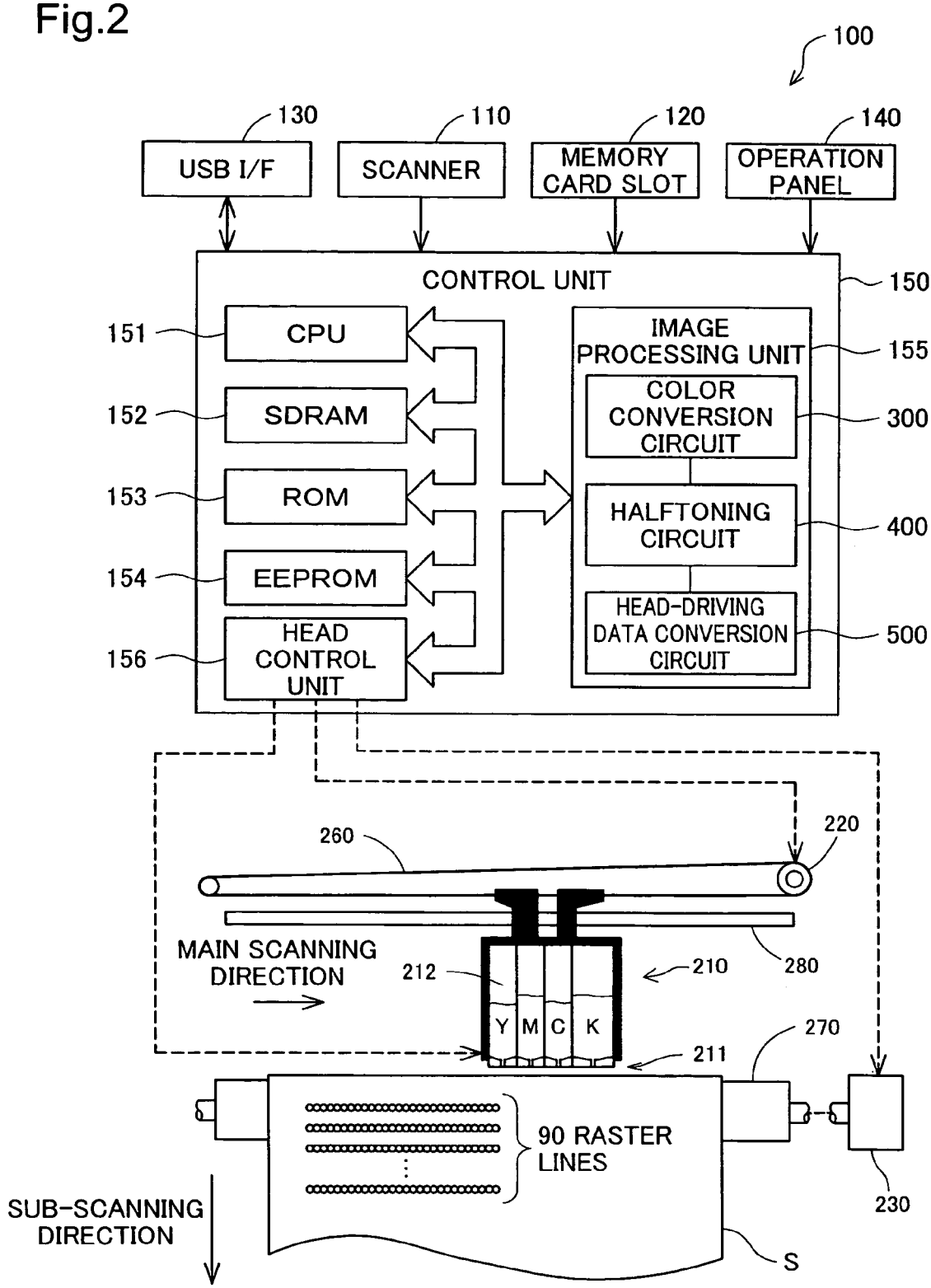
FIG. 2 shows the internal structure of the printing apparatus 100.

FIG. 2 shows the internal structure of the printing apparatus 100. As illustrated, the printing apparatus 100 includes a carriage 210 with an ink cartridge 212 mounted thereon, a carriage motor 220 that drives the carriage 210 in a main scanning direction, and a paper feed motor 230 that feeds the printing medium S in a sub-scanning direction.

The carriage 210 is movably held on a sliding shaft 280 that is arranged parallel to the axis of a platen 270. The carriage motor 220 rotates a drive belt 260 in response to a command from the control unit 150 to move the carriage 210 back and forth in the main scanning direction along the sliding shaft 280.

The paper feed motor 230 rotates the platen 270 in response to a command from the control unit 150 and accordingly feeds the printing medium S perpendicular to the axis of the platen 270. Namely the paper feed motor 230 shifts the carriage 210 relatively in the sub-scanning direction.

The ink cartridge 212 attached to the carriage 210 keeps therein 8 different inks, that is, cyan (C), magenta (M), yellow (Y), black (K), light cyan (lc), light magenta (lm), dark yellow (dy), and transparent (cr) (only 4 different inks are illustrated for the matter of convenience). Attachment of the ink cartridge 212 to the carriage 210 causes inks in the ink cartridge 212 to flow through respective ink conduits (not shown) and to be supplied to an ink head 211 provided on a lower face of the carriage 210. The printing apparatus 100 uses the 8 different inks in this embodiment but may have a reduced number of different inks with exclusion of some of light cyan, light magenta, dark yellow, and transparent inks. The transparent ink is mainly used in a white background area with no color inks ejected and printed. The transparent ink gives the similar gloss effect to those of the other color inks to the white background area.

The ink head 211 has 8 nozzle arrays that are arranged in the sub-scanning direction and correspond to the 8 different inks. Each nozzle array has 90 nozzles arranged at a fixed pitch, for example, 1/120 inch=0.21 mm. One main scan of the carriage 210 thus simultaneously forms maximum of 90 raster lines at specific intervals on the printing medium S. This interval is an integral multiple of a pitch between adjoining raster lines eventually formed on the printing medium S. Feeding the printing medium S in the sub-scanning direction by a fixed distance N/(D·k) after every main scan causes adjacent raster lines in the sub-scanning direction to be formed by different nozzles. Here N [nozzles] is a positive integer and represents the number of nozzles included in each nozzle array and arranged in the sub-scanning direction, k [dots] is an integer coprime to the positive integer N and represents a dot pitch between adjacent nozzles, and D [nozzles/inch] represents a nozzle density. Regardless of some variations in characteristic and pitch of the individual nozzles, this arrangement effectively prevents the appearance of banding caused by such variations and thereby ensures high-quality printing. This printing technique is called interlace printing.

The control unit 150 controls the ink head 211 to regulate the size of ejected ink droplets. Three variable size dots, that is, large-size dot, medium-size dot, and small-size dot, are accordingly created on the printing medium S.

FIG. 3 shows the principle of ejecting ink droplets of different sizes from the ink head 211. A broken-line plot on the top of FIG. 3 represents a voltage waveform for creating a standard size dot. Application of a negative voltage to a piezoelectric element PE in a division d2 of this voltage waveform deforms the piezoelectric element PE to increase the sectional area of an ink conduit 68. There is a speed limit in ink supply through the ink conduit of the ink cartridge 212. This speed limit causes an insufficiency of ink supply relative to expansion of the ink conduit 68. An ink interface Me at the end of a nozzle Nz is thus concaved inward as shown in a state A in the lower half of FIG. 3.

Abrupt application of a negative voltage to the piezoelectric element PE in a division d1 of a solid-line voltage waveform increases the insufficiency of ink supply from the ink cartridge 212. The ink interface Me at the end of the nozzle Nz has a greater degree of inward concave in a state 'a', compared with the state A. Subsequent application of a positive voltage to the piezoelectric element PE in a division d3 contracts the ink conduit 68 to trigger ink injection. As shown in states B and C, a larger ink droplet is ejected from the ink interface Me having the moderate degree of inward concave (state A). As shown in states 'b' and 'c', a smaller ink droplet is ejected from the ink interface Me having the greater degree of inward concave (state 'a'). In this manner, variable size ink droplets are ejected from the ink head 211.

With referring back to FIG. 2, the printing apparatus 100 has the control unit 150 for controlling the printing mechanism. The control unit 150 is connected with a USB interface 130, the scanner 110, and the memory card slot 120 for input of object image data to be printed. The control unit 150 is also connected with the operation panel 140 manipulated by the user.

The control unit 150 processes the input image data from the USB interface 130, the scanner 110, or the memory card slot 120 by a preset series of image processing and controls the printing mechanism to print an image expressed by the processed image data. In order to exert these functions, the control unit 150 includes a CPU 151, an SDRAM 152, a ROM 153, an EEPROM 154, an image processing unit 155, and a head control unit 156. The respective units are interconnected via a specific bus.

The ROM 153 stores a firmware as a control program for controlling the operations of the whole printing apparatus 100. The CPU 151 loads and executes this firmware on a predetermined work area of the SDRAM 152 on a power supply of the printing apparatus 100.

Figure 4:
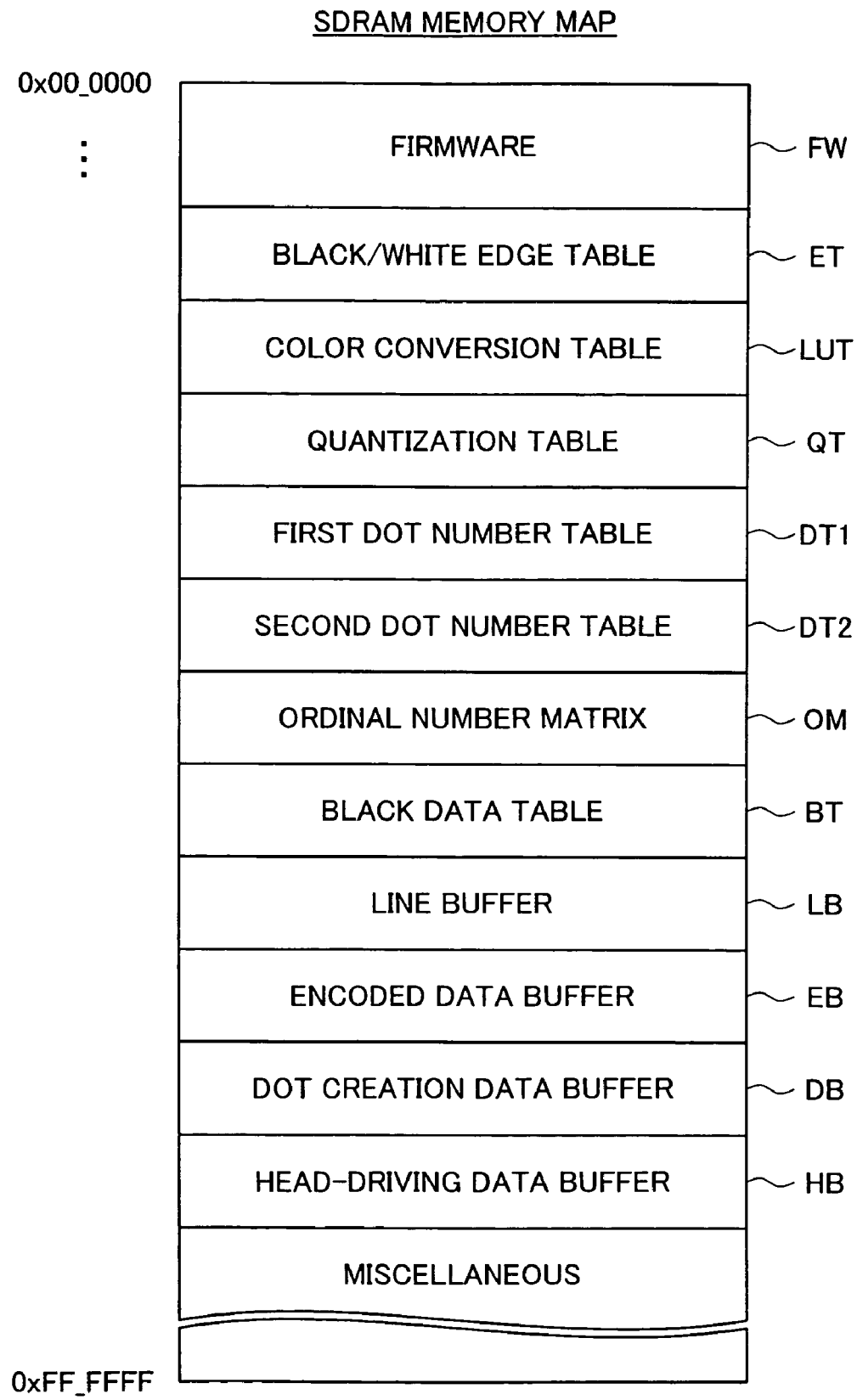
FIG. 4 shows a memory map of an SDRAM 152.

FIG. 4 shows a memory map of the SDRAM 152. A firmware FW as well as various data are read from the ROM 153 and are expanded on the SDRAM 152 by the CPU 151. The expanded data include, for example, a black/white edge table ET, a color conversion table LUT, a quantization table QT, a first dot number table DT1, a second dot number table DT2, an ordinal number matrix OM, and a black data table BT. Diverse buffer areas are set in the SDRAM 152 for temporary storage of various intermediate data generated in the course of image processing. The buffer areas include, for example, a line buffer LB, an encoded data buffer EB, a dot creation data buffer DB, and a head-driving data buffer HB. The functions of the expanded data and the buffers will be described in detail below when needed.

With referring back to FIG. 2, the EEPROM 154 stores correction data for correcting a unique characteristic of each printing apparatus 100 detected in the manufacturing process. The correction data includes, for example, data for correcting the amount of ink ejected from each nozzle of the ink head 211 or data for correcting the ejection direction of ink from each nozzle. The correction data is used for correction of the color tone by the image processing unit 155 as described later.

The image processing unit 155 is a custom LSI specialized in printing-related image processing functions and mainly includes a color conversion circuit 300, a halftoning circuit 400, and a head-driving data conversion circuit 500. The color conversion circuit 300 converts RGB data into CMYK data. The halftoning circuit 400 processes the CMYK data by a halftoning process. The head-driving data conversion circuit 500 converts the halftoning-processed data into a specific data format for actuating the ink head 211.

The image processing unit 155 has a register (not shown) to store various pieces of setting information required for image processing. The various pieces of setting information set through the user's operation of the computer 900 or the operation panel 140, for example, the resolution of object image data to be printed, the size of a printing medium, and an output resolution mode, are written into this register by the CPU 151. The image processing unit 155 executes the diverse series of image processing according to the various pieces of setting information written in the register.

The head control unit 156 obtains head driving data eventually generated by the image processing unit 155 from the head-driving data buffer HB of the SDRAM 152, and controls the paper feed motor 230 and the carriage motor 220 to eject ink droplets from the respective nozzles of the ink head 211 at adequate timings according to the obtained head driving data. Dots of the respective color inks are then created at adequate positions on the printing medium S to complete a color printed image.

C. Detailed Structure of Image Processing Unit

The image processing unit 155 includes the color conversion circuit 300, the halftoning circuit 400, and the head-driving data conversion circuit 500 as mentioned above. The detailed structures of these circuits are sequentially described below.

C-1. Color Conversion Circuit

Figure 5:
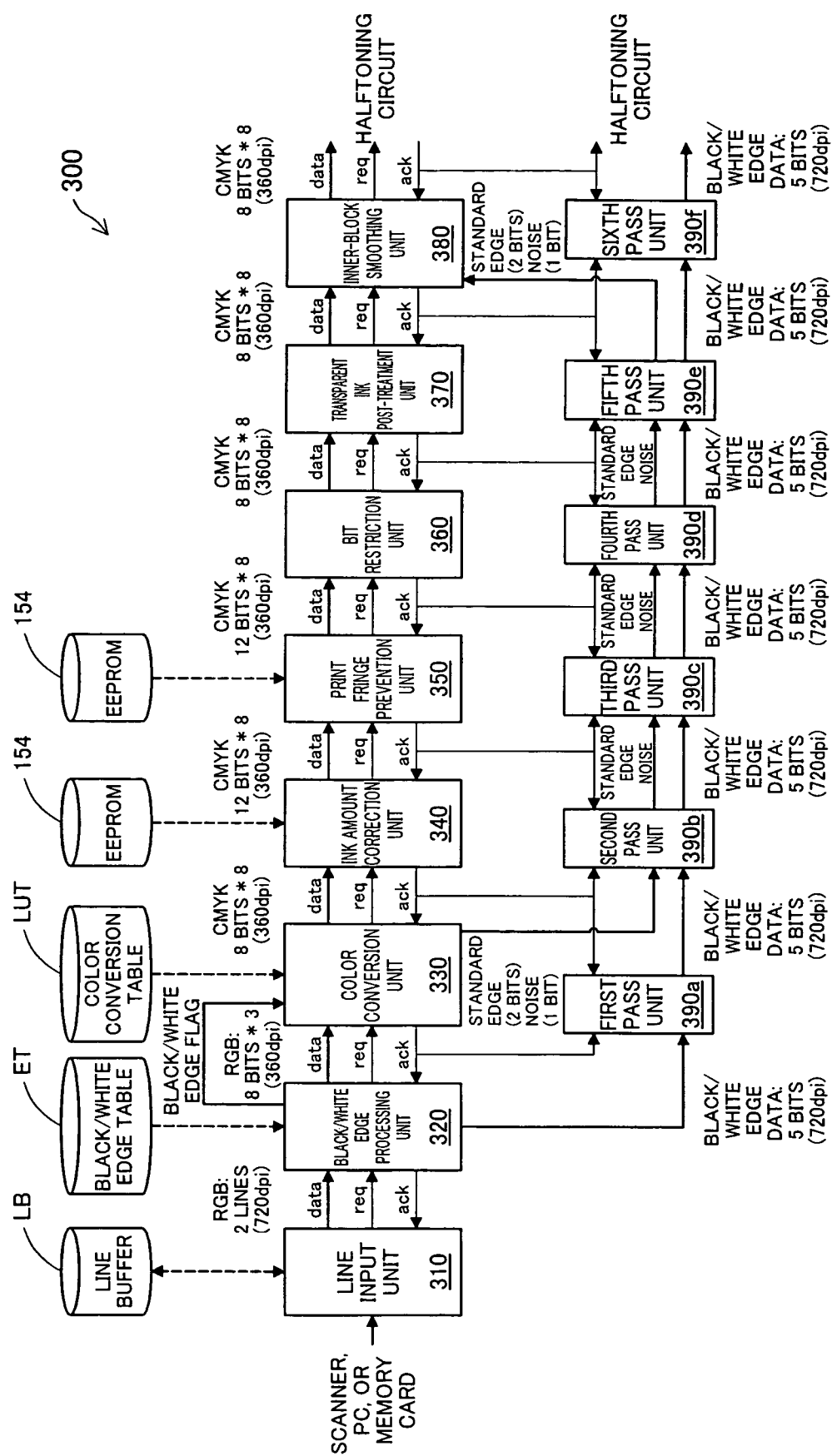
FIG. 5 is a block diagram showing the detailed structure of a color conversion circuit 300.

FIG. 5 is a block diagram showing the detailed structure of the color conversion circuit 300. The color conversion circuit 300 has the functions of converting image data expressed in the RGB format (hereafter referred to as 'RGB image data') into image data expressed in the CMYK format (hereafter referred to as 'CMYK image data'), of executing diverse series of image processing to enhance the picture quality of the CMYK image data, and of extracting a black/white edge from the input RGB image data.

The color conversion circuit 300 includes a line input unit 310, a black/white edge processing unit 320, a color conversion unit 330, an ink amount correction unit 340, a print fringe prevention unit 350, a bit restriction unit 360, a transparent ink post-treatment unit 370, and an inner-block smoothing unit 380. These units shown in the upper half of FIG. 5 are collectively called the main units.

The color conversion unit 330, the ink amount correction unit 340, the print fringe prevention unit 350, the bit restriction unit 360, the transparent ink post-treatment unit 370, and the inner-block smoothing unit 380 included in the color conversion circuit 300 and an encoder 410 included in the halftoning circuit 400 of the embodiment constitute the 'image processing unit' of the invention. The black/white edge processing unit 320 of the embodiment corresponds to the 'intermediate data generation unit' of the invention.

The respective main units are connected in series in the above sequence by three signal lines, a data line (data), a request line (req), and an acknowledge line (ack). Each of the main units uses these signal lines to send and receive a req signal and an ack signal for data transfer. A data sender unit sends a req signal to inform a data receiver unit of data transmission, simultaneously with actual transmission of data to the data receiver unit. The data receiver unit receives the req signal to be informed of data transmission, starts a data reading process, and returns an ack signal to inform the data sender unit of data reception. On completion of the data reading process, the data receiver unit inactivates the ack signal. This enables the data sender unit to confirm successful data transmission to the data receiver unit. The data sender unit then inactivates the req signal and prepares for transmission of next data.

The color conversion circuit 300 has six pass units from a first pass unit 390a to a sixth pass unit 390f that are arranged in series corresponding to the color conversion unit 330 to the inter-block smoothing unit 380 as the main units. Each of the six pass units 390a to 390f transfers the data received from the black-white edge processing unit 320 to the halftoning circuit 400, while transferring the various pieces of information received from the color conversion unit 330 to the inner-block smoothing unit 380.

Each of the pass units 390a to 390f receives a branch of the ack signal sent from a corresponding main unit to a previous main unit in the connection flow and inputs data from a previous pass unit. Each of the pass units 390a to 390f receives a branch of the ack signal sent from a subsequent main unit to the corresponding main unit in the connection flow and transfers data to a subsequent pass unit. Namely data is sequentially transmitted through the pass units 390a to 390f, synchronously with data transmission through the corresponding main units. This arrangement enables various data transferred through the respective pass units to be readily input into the corresponding main units and accordingly enhances the extensibility of the circuit structure. The use of these pass units ensures successful data transmission, even when the pass width between the adjacent main units in the connection flow is insufficient for the total volume of data to be transferred.

Figure 6:
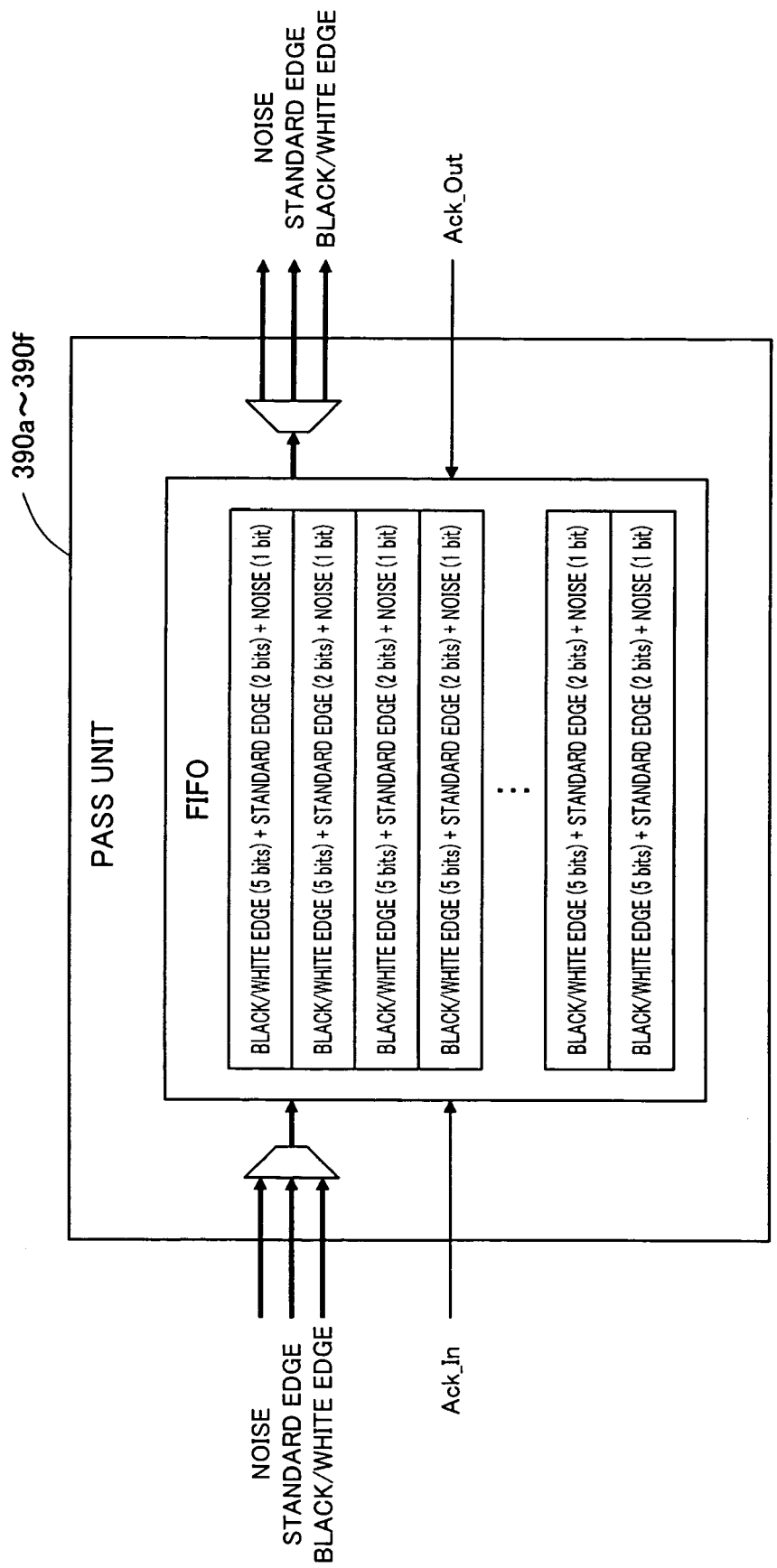
FIG. 6 shows the inner structure of each of pass units 390a to 390f.

FIG. 6 shows the inner structure of each of the pass units 390a to 390f. As illustrated, each of the pass units 390a to 390f is constructed by 8-bit 16-step FIFO memories. The 8-bit data transferred from a previous pass unit are sequentially accumulated into the FIFO memories and are output in the order of accumulation to a subsequent pass unit. The 8-bit data includes 5-bit black/white edge data, 2-bit standard edge data, and 1-bit noise data.

(C-1-1) Line Input Unit

With referring back to FIG. 5, the respective main units are described in detail.

The line input unit 310 inputs RGB image data having a resolution of 720 dpi×720 dpi from the USB interface 130, the scanner 110, or the memory card slot 120 and accumulates the input RGB image data into the line buffer LB. The line input unit 310 reads every 2 lines of the RGB image data from the line buffer LB and transfers the read 2 lines of the RGB image data to the black/white edge processing unit 320. The line input unit 310 also has a function of transferring every line of image data when the input RGB image data has a resolution of 360 dpi×360 dpi.

(C-1-2) Black/White Edge Processing Unit

FIG. 7 shows the internal structure of the black/white edge processing unit 320 shown in FIG. 5. As illustrated, the black/white edge processing unit 320 includes a black/white edge detection circuit 321 that connects with the line input unit 310, and an averaging circuit 322 that receives the output of the black/white edge detection circuit 321 and averages the input tone values. The black/white edge processing unit 320 also has a black/white edge encoding circuit 323 that receives the output of the black/white edge detection circuit 321 and encodes the input black-white edge, and a selector circuit 324 that receives the outputs of the line input unit 310 and the averaging circuit 322 and selects data to be output to the color conversion unit 330.

(C-1-2-1) Black/White Edge Detection Circuit

The black/white edge detection circuit 321 identifies whether input pixels constitute a black/white edge. According to a concrete procedure, the black/white edge detection circuit 321 sequentially extracts 2×2 pixels A, B, C, and D from image data of the first line and the second line input from the line input unit 310 and identifies whether the extracted 4 pixels constitute a black/white edge pattern. The black/white edge pattern consists of only white color (RGB=(255,255,255)) and black color (RGB=(0,0,0)) but is neither an all white pattern nor an all black pattern. The black/white edge detection circuit 321 sets a value '1' to a black/white edge detection flag when the extracted 4 pixels constitute a black/white edge pattern, while setting a value '0' to the black/white edge detection flag when the extracted 4 pixels do not constitute a black/white edge pattern. After identification of a black/white edge pattern, the black/white edge detection circuit 321 outputs the RGB data of the 4 pixels as the target of identification to both the averaging circuit 322 and the black/white edge encoding circuit 323. The setting of the black/white edge detection flag is also output to the black/white edge encoding circuit 323.

(C-1-2-2) Black/White Edge Encoding Circuit

The black/white edge encoding circuit 323 binarizes the data of a black/white edge pattern to generate encoded 5-bit data. According to a concrete procedure, when the value '1' is set in the black/white edge detection flag input from the black/white edge detection circuit 321, the black/white edge encoding circuit 323 refers to the black/white edge table ET and converts the RGB data of the 4 pixels transferred from the black/white edge detection circuit 321 to generate 5-bit black/white edge data.

Figures 8A, 8B:
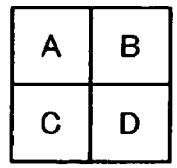
FIGS. 8A and 8B show a 2×2 pixel pattern and one example of a black/white edge table ET.

FIG. 8B shows one example of the black/white edge table ET. The black/white edge table ET stores 4-bit encoded data in relation to each pattern of 4 pixels shown in FIG. 8A. The black-white edge table ET is stored in the SDRAM 152 as shown in FIG. 4. The upper left pixel, the upper right pixel, the lower left pixel, and the lower right pixel among the 4 pixels are respectively expressed as pixels A, B, C, and D as shown in FIG. 8A. For example, when the RGB data of 4 pixels is (A,B,C,D)=(0,0,0,255), the black/white edge encoding circuit 323 converts the RGB data into 4-bit encoded data of '0001'. When the RGB data of 4 pixels is (A,B,C,D)=(0,0,255,0), the black/white edge encoding circuit 323 converts the RGB data into 4-bit encoded data of '0010'. The black/white edge table ET has a relatively small data volume and may thus be built in as a circuit element of the black/white edge encoding circuit 323. One possible modification may not use the black/white edge table ET but divides the tone value of each pixel by '255' and sums up the quotients of such divisions to dynamically generate encoded data.

With referring back to FIG. 7, when the value '0' is set in the black/white edge detection flag input from the black/white edge detection circuit 321, the black/white edge encoding circuit 323 encodes the RGB data of the 4 pixels transferred from the black/white edge detection circuit 321 into 4-bit data '0000', irrespective of the black/white edge table ET.

After conversion of the RGB data of every 4 pixels into 4-bit encoded data, the black/white edge encoding circuit 323 adds the setting of the black/white edge detection flag as an upper-most bit to each 4-bit encoded data and accordingly generates 5-bit black/white edge data. For example, when the 4-bit encoded data of 4 pixels is '0001', the resulting 5-bit black/white edge data is '10001'. When the RGB data of 4 pixels do not constitute a black/white edge pattern, the resulting 5-bit data is '00000'. This 5-bit data is called dummy data for the purpose of discrimination from the black/white edge data.

The black/white edge encoding circuit 323 transfers the encoded 5-bit black/white edge data to the first pass unit 390a. The pass units 390a to 390f sequentially receive the transferred black/white edge data when 4 pixels as a processing target constitute a black/white edge pattern, while sequentially receiving the transferred dummy data when 4 pixels as a processing target do not constitute a black/white edge pattern.

(C-1-2-3) Averaging Circuit

The averaging circuit 322 shown in FIG. 7 averages the tone values of 4 pixels to reduce the resolution. More specifically the averaging circuit 322 averages the tone values of RGB data of every 4 pixels input from the black/white edge detection circuit 321 and thereby converts the image data having the resolution of 720 dpi×720 dpi into image data having the resolution of 360 dpi×360 dpi. The RGB data of any 4 pixels output from the black/white edge detection circuit 321 enters the averaging circuit 322, regardless of whether the RGB data constitutes a black/white edge pattern. The RGB data of 4 pixels constituting a black/white edge pattern is thus also averaged by the averaging circuit 322.

The tone values of every 4 pixels are averaged according to the following computation.

When 4 pixels A, B, C, and D have tone values expressed as:

$A=(Ra,Ga,Ba)$ $B=(Rb,Gb,Bb)$ $C=(Rc,Gc,Bc)$ $D=(Rd,Gd,Bd)$ tone values (R,G,B) of a new pixel after conversion is:

$R=(Ra+Rb+Rc+Rd)/4$ $G=(Ga+Gb+Gc+Gd)/4$ $B=(Ba+Bb+Bc+Bd)/4$

The division by 4 is readily performed by rightward bit shift of each value by 2 bits. The averaged RGB data having the resolution of 360 dpi×360 dpi is output as a tone value of a new 1×1 pixel to the selector circuit 324.

(C-1-2-4) Selector Circuit

The selector circuit 324 receives the RGB data of 360 dpi×360 dpi output from the averaging circuit 322 and the RGB data output from the line input unit 310. When the original image data input into the image processing unit 155 has a resolution of 720 dpi×720 dpi, the selector circuit 324 selects the RGB data input from the averaging circuit 322 and transfers the selected RGB data to the subsequent color conversion unit 330. When the original image data input into the image processing unit 155 has a resolution of 360 dpi×360 dpi, on the other hand, the selector circuit 324 selects the RGB data directly input from the line input unit 310 and transfers the selected RGB data to the subsequent color conversion unit 330. When image data of a printing object has a low input resolution of 360 dpi×360 dpi, it is impossible to process black/white edges at a higher resolution of 720 dpi×720 dpi. The black/white edge processing unit 320 thus directly transfers the RGB data input from the line input unit 310 as through data.

As described above, when the input image data from the line input unit 310 represents a black/white edge pattern, the black/white edge processing unit 320 outputs 5-bit black/white edge data having the high resolution of 720 dpi×720 dpi to the first pass unit 390a, while outputting averaged RGB data of 360 dpi×360 dpi obtained by averaging the tone values of the 4 pixels to the color conversion unit 330. When the input image data from the line input unit 310 is ordinary data other than a black-white edge pattern, on the other hand, the black/white edge processing unit 320 outputs 5-bit dummy data to the first pass unit 390a, while outputting averaged RGB data of 360 dpi×360 dpi obtained by averaging the tone values of the 4 pixels to the color conversion unit 330.

The averaged RGB data obtained by averaging the tone values of every 4 pixels by the black/white edge processing unit 320 in this embodiment corresponds to the 'first intermediate data' of the invention. The black/white edge data obtained by encoding a black/white edge pattern is equivalent to the 'second intermediate data' of the invention.

(C-1-3) Color Conversion Unit

FIG. 9 shows the internal structure of the color conversion unit 330 shown in FIG. 5. The color conversion unit 330 processes the RGB data input from the black/white edge processing unit 320 by color conversion to generate CMYK data. As illustrated, the color conversion unit 330 includes a conversion circuit 331 that is connected with the black/white edge processing unit 320 and converts an RGB data format into a CMYK data format, and a standard edge detection circuit 332 that is connected with the black/white edge processing unit 320 and detects an edge between 2 pixels. The color conversion unit 330 further includes a noise generation circuit 333 that generates 1-bit noise, and a smoothing circuit 334 that is connected with the conversion circuit 331, the standard edge detection circuit 332, and the noise generation circuit 333 and uses the data output from these circuits 331, 332, and 333 to smooth the tone values.

(C-1-3-1) Conversion Circuit

The conversion circuit 331 refers to a color conversion table LUT stored in the SDRAM 152 and converts the RGB data input from the black/white edge processing unit 320 into CMYK data. The color conversion table LUT stores each color expressed by the RGB data format in correlation to a color expressed by a combination of 8 different inks C (cyan), M (magenta), Y (yellow), K (black), lc (light cyan), lm (light magenta), dy (dark yellow), and cy (transparent). The conversion circuit 331 refers to this color conversion table LUT and reads CMYK data corresponding to the RGB data input from the black/white edge processing unit 320 to implement the color conversion.

(C-1-3-2) Standard Edge Detection Circuit

The standard edge detection circuit 332 receives the RGB data of 2 pixels from the black/white edge processing unit 320, computes a slope (edge) of the 2 pixels in the horizontal direction, and expresses the slope as an intensity of 0 to 2 to generate 2-bit standard edge data. The standard edge data is different from the black-white edge data.

According to a concrete procedure, the standard edge detection circuit 332 computes differences Rdiff, Gdiff, and Bdiff of the RGB tone values between 2 pixels in the horizontal direction as:

$Rdiff=|R-Rp|$ $Gdiff=|G-Gp|$ $Bdiff=|B-Bp|$ where R, G, and B represent RGB tone values of a target pixel as an object of edge detection, and Rp, Gp, and Bp represent RGB tone values of a left pixel located on the left of the target pixel.

The computed differences of the RGB tone values are weighted by:

$Rdiff=Rdiff-(TR-TG)$ $Gdiff=Gdiff$ $Bdiff=Bdiff-(TB-TG)$ where TR, TG, and TB denote preset threshold values: for example, TR=10, TG=8, and TB=14.

The maximum among the weighted differences Rdiff, Gdiff, and Bdiff is selected as a maximum difference DiffMax:

$DiffMax=max(Rdiff,Gdiff,Bdiff)$

When the maximum difference DiffMax is smaller than the threshold value TG, the standard edge detection circuit 332 identifies the absence of any edge and sets the value '0' to the standard edge data. When the maximum difference DiffMax is greater than the threshold value TG but is smaller than the sum of the threshold value TG and a predetermined offset value (for example, 8), the standard edge detection circuit 332 identifies the presence of a weak edge and sets the value '1' to the standard edge data. When the maximum difference DiffMax is greater than the sum of the threshold value TG and the offset values, the standard edge detection circuit 332 identifies the presence of a strong edge and sets the value '2' to the standard edge data. When the value '1' is set in the black/white detection flag input from the black/white edge processing unit 320, the value '2' representing the presence of a strong edge is set to the standard edge data of the target pixel, regardless of the value of the maximum difference DiffMax. The standard edge detection circuit 332 outputs the generated standard edge data to the smoothing circuit 334 and to the second pass unit 390b. The standard edge data output to the second pass unit 390b is transferred through the group of pass units to the inner-block smoothing unit 380.

(C-1-3-3) Noise Generation Circuit

The noise generation circuit 333 generates 1-bit noise data (random digit) representing either '0' or '1' at random. The noise generation circuit 333 generates two different noise data and outputs one noise data to the smoothing circuit 334 and the other noise data to the second pass unit 390b. The noise data output to the second pass unit 390b is transferred through the group of pass units to the inner-block smoothing unit 380.

The standard edge data generated by the standard edge detection circuit 332 and the noise data generated by the noise generation circuit 333 correspond to the 'auxiliary data' of the invention.

(C-1-3-4) Smoothing Circuit

The smoothing circuit 334 smoothes the tone values of the CMYK data output from the conversion circuit 331, based on the standard edge data input from the standard edge detection circuit 332 and the noise data input from the noise generation circuit 333. A concrete procedure of the smoothing operation is given below.

The smoothing circuit 334 identifies the value of the input standard edge data and, when the standard edge data is equal to either 0 or 1, smoothes the C, M, Y, and K tone values of 2 pixels in the horizontal direction according to arithmetic expressions given as:

when the standard edge data is equal to 0 $C=(C+Cp\times(SP0-1)+N\times(SP0-1))/SP0$ (1)

when the standard edge data is equal to 1 $C=(C+Cp\times(SP1-1)+N\times(SP1-1))/SP1$ (2)

In the above arithmetic expressions, C represents the tone value of a target pixel as an object of the smoothing operation, Cp represents the tone value of a left pixel located on the left of the target pixel, SP0 and SP1 denote preset weighting parameters (for example, SP0=4 and SP1=2), and N denotes the value of noise data (either 0 or 1).

When the standard edge data is equal to 2, the smoothing circuit 334 identifies the presence of a strong edge in the target pixel and does not perform the smoothing operation. This arrangement effectively prevents a decrease in clarity of an output image. The smoothing circuit 334 outputs the smoothed CMYK data to the ink amount correction unit 340.

(C-1-4) Ink Amount Correction Unit

With referring back to FIG. 5, the ink amount correction unit 340 inputs the CMYK data from the color conversion unit 330 and corrects the tone values of the input CMYK data to correct the amounts of inks ejected from the respective nozzle arrays. In the nozzle arrays on the ink head 211 provided for the individual inks, the manufacturing error may cause a variation in inner diameter of nozzles or a variation in degree of deformation of piezoelectric elements. This may lead to ejection of different amounts of inks from different nozzle arrays even when the tone value is fixed. The manufacturing process of the printing apparatus 100 measures the amounts of inks ejected from the respective nozzle arrays and stores correction data for compensation of a difference between ejection amounts of inks in the EEPROM 154.

The ink amount correction unit 340 reads the correction data stored in the EEPROM 154 and corrects the tone values of the CMYK data based on the correction data. For example, when the amount of ink ejected from a cyan nozzle array is greater than the amounts of inks ejected from nozzle arrays of the other colors, the correction procedure corrects the tone value of cyan to be lower than the tone values of the other colors. This equalizes the amounts of inks ejected from the respective nozzle arrays.

For the enhanced accuracy of the correction, the ink amount correction unit 340 internally expands the input 8-bit data to 12-bit data, prior to the correction. Namely the correction is performed after expansion of the 256 tone values of the CMYK data to 4096 tone values. The expansion to 12-bit data is implemented by leftward bit shift of the input CMYK data by 4 bits. The ink amount correction unit 340 transfers the corrected 12-bit C, M, Y, and K data to the print fringe prevention unit 350.

(C-1-5) Print Fringe Prevention Unit

The print fringe prevention unit 350 receives the 12-bit C, M, Y, and K data transferred from the ink amount correction unit 340 and corrects the received CMYK data to prevent the occurrence of a print fringe. Each nozzle array on the ink head 211 is arranged at a preset nozzle pitch in the sub-scanning direction. The ink may, however, not be ejected perpendicularly from all the nozzles in a nozzle array, but the manufacturing error of nozzles may cause inclined ejection of ink from the nozzles. Such inclination may result in the appearance of a print fringe in the main scanning direction in a resulting output image printed on a printing medium. The manufacturing process of the printing apparatus 100 measures the inclination of nozzles and stores correction data for compensation of such inclination in the EEPROM 154.

The print fringe prevention unit 350 reads the correction data stored in the EEPROM 154 and corrects the tone values of the CMYK data based on the correction data. For example, when the input CMYK data represents a raster line causing a print fringe, the correction procedure enhances the tone values of the input CMYK data to increase the number of nozzles ejecting the ink. In another example, when the input CMYK data represents a raster line having an overlap of dots due to inclination of nozzles, on the other hand, the correction procedure reduces the tone values of the input CMYK data to decrease the number of nozzles ejecting the ink. This arrangement effectively prevents the occurrence of a print fringe. For the enhanced accuracy of the correction, the print fringe correction unit 350 corrects the CMYK expanded to the 12-bit data. The print fringe prevention unit 350 transfers the corrected 12-bit CMYK data to the bit restriction unit 360.

The ink amount correction unit 340 and the print fringe prevention unit 350 respectively read the correction data from the EEPROM 154. In one modified structure, the correction data may automatically be loaded from the EEPROM 154 to the SDRAM 152 on the power supply of the printing apparatus 100 and may be input respectively from the SDRAM 152 to the ink amount correction unit 340 and to the print fringe prevention unit 350. Such modification enables the higher-speed correction.

(C-1-6) Bit Restriction Unit

The bit restriction unit 360 receives the 12-bit CMYK data from the print fringe prevention unit 350 and contracts the input 12-bit data to 8-bit data for reduction of the data volume. A concrete procedure adds 4-bit noise to the input 12-bit CMYK data and cuts off the lower 4 bits among the 12 bits to generate 8-bit data. Another possible procedure may shift the input 12-bit CMYK data rightward by 4 bits and cut off the upper 4 bits. The addition of the noise reduces the possibility of continual generation of identical data and thus effectively prevents deterioration of the picture quality, compared with the conventional process of simply cutting off the lower 4 bits. In the structure of this embodiment, the 4-bit noise is generated by an internal noise generation circuit built in the bit restriction unit 360. In one modified structure, the bit restriction unit 360 may receive the 4-bit noise from the third pass unit 390$c$ as a branch of the noise data transferred from the color conversion unit 330. The bit restriction unit 360 reconverts the 12-bit CMYK data to 8-bit CMYK data and transfers the 8-bit CMYK data to the transparent ink post-treatment unit 370.

(C-1-7) Transparent Ink Post-Treatment Unit

The transparent ink post-treatment unit 370 receives the 8-bit CMYK data from the bit restriction unit 360 and corrects the cr (transparent ink) tone value of the input CYMK data to 0 to prevent ink ejection out of the printing medium S. The size information of the printing medium S is set in a register of the image processing unit 155 by the CPU 151. The transparent ink post-treatment unit 370 refers to the size information of the printing medium S set in the register and determines whether the position of dot creation specified by the currently input CMYK data is out of the printing medium S.

In rimless printing, the printing apparatus 100 ejects ink over a greater printing area than the printing medium S and disposes of the excessive ink outside the printing medium S to print an image over the whole surface of the printing medium S. The transparent ink does not include any pigment or dye and has a greater resin content than the other inks. The disposal of the transparent ink out of the printing medium S may cause adhesion of the resin on the surface of an ink exhaust absorbent (for example, sponge) and interfere with absorption of the other inks. The transparent ink post-treatment unit 370 sets the tone value of the transparent ink (cr) to 0 with regard to the printing area out of the printing medium S, thus preventing such interference.

(C-1-8) Inner-Block Smoothing Unit

The inner-block smoothing unit 380 receives CMYK data of adjacent 2 pixels from the transparent ink post-treatment unit 370, as well as 2-bit standard edge data and 1-bit noise data output from the color conversion unit 330 via the fifth pass unit 390$e$. The inner-block smoothing unit 380 smoothes the tone values of the adjacent 2 pixels input from the transparent ink post-treatment unit 370, based on the 2-bit standard edge data and the 1-bit noise data output from the color conversion unit 330. When the standard edge data between the adjacent 2 pixels is not greater than a preset value, for example, 0 or 1, the smoothing procedure sums up the CMYK data of the 2 pixels, adds the 1-bit noise data to the sum of the CMYK data, and divides the total by 2. Such calculation gives an identical tone value to the adjacent 2 pixels. When adjacent pixels have a low edge intensity, dot distribution of each pixel block in the 2×2 mode according to the ordinal number matrix may cause creation of dots in the adjacent pixels on the printing medium. This may lead to the poor picture quality. The procedure averages the tone values of adjacent pixels having a low edge intensity to give an identical tone value, prior to the halftoning process, in order to prevent creation of dots in the adjacent pixels and accordingly enhance the picture quality. In the configuration of this embodiment, the inner-block smoothing unit 380 utilizes the standard edge data and the noise data output from the color conversion unit 330 and transferred through the set of pass units to smooth the tone values of the adjacent pixels. This arrangement effectively eliminates the overlapping generation of the standard edge data and the noise data by the inner-block smoothing unit 380.

The color conversion circuit 300 of the above construction outputs the 8-bit C, M, Y, and K data having the resolution of 360 dpi×360 dpi and the 5-bit black/white edge data having the resolution of 720 dpi×720 dpi to the halftoning circuit 400.

C-2. Halftoning Circuit

Figure 10:
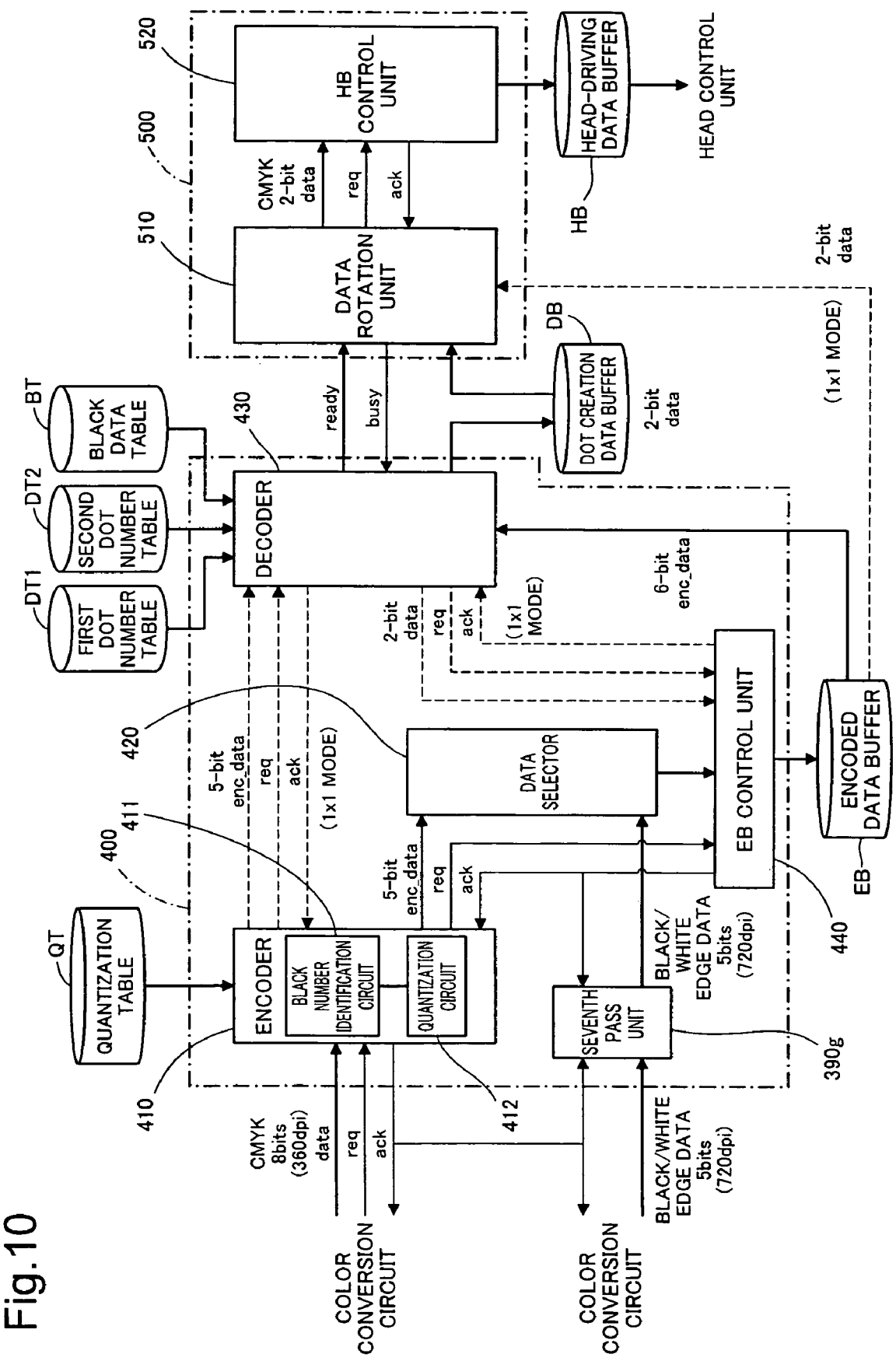
FIG. 10 is a block diagram showing the detailed structure of a halftoning circuit 400 and a head-driving data conversion circuit 500.

FIG. 10 is a block diagram showing the detailed structure of the halftoning circuit 400 and the head-driving data conversion circuit 500. The halftoning circuit 400 converts the CMYK data representing the color shading expressed by the tone values in the range of 0 to 255 into dot creation data representing the densities of dots to be created on the printing medium. The printing apparatus 100 basically takes either of the two ink ejection states, that is, ink-on state or ink-off state, on the printing medium S. It is necessary to express the color shading as the distribution of dots created by ink ejection. Various known techniques including the error diffusion technique and the systematic dither technique are applicable to the halftoning process. The halftoning process of this embodiment, however, adopts a unique expansion of the systematic dither technique.

<Concept of Halftoning Process>

The halftoning process of this embodiment is described in comparison with the conventional systematic dither technique.

Figure 11:
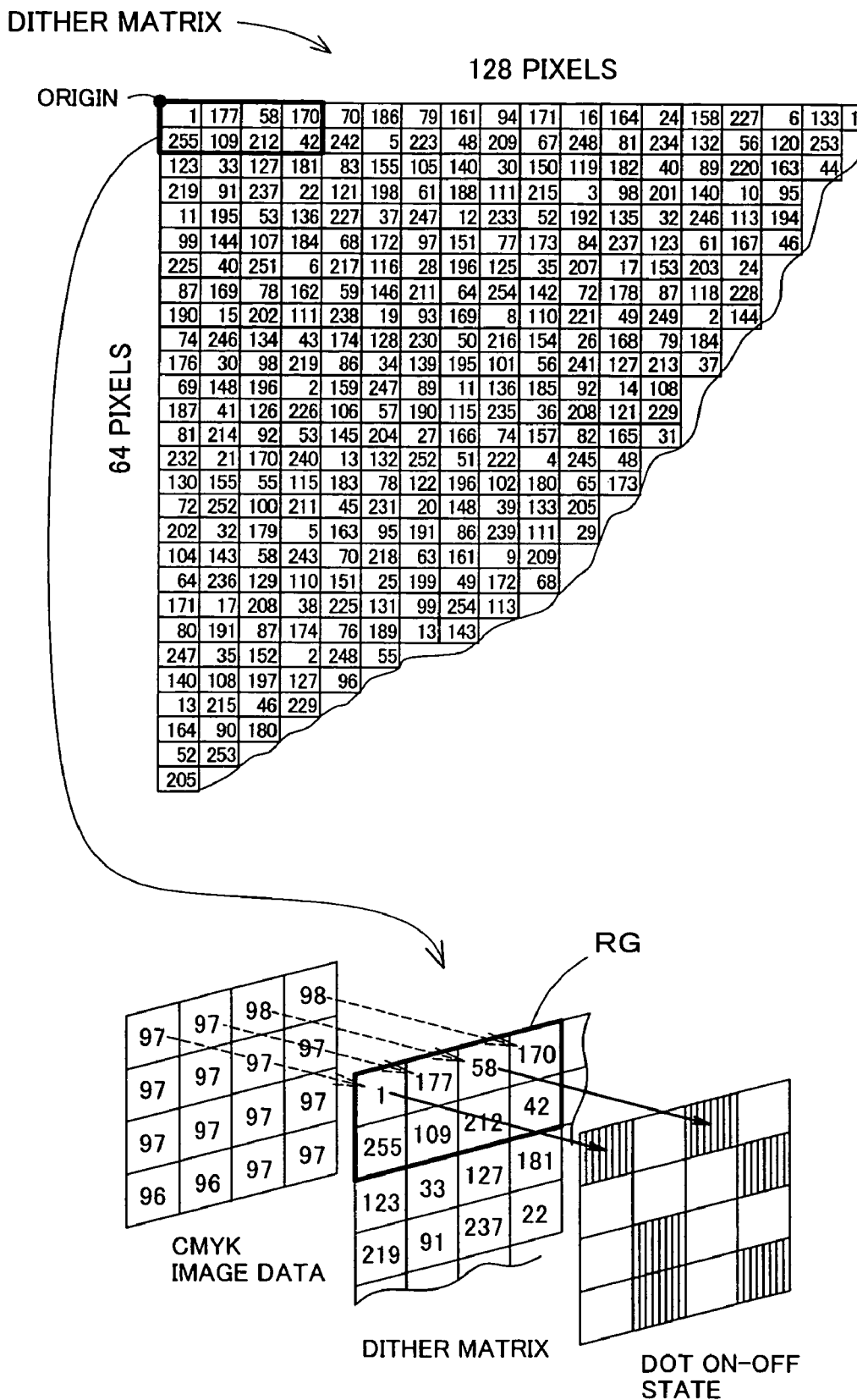
FIG. 11 shows the outline of a halftoning process by the conventional systematic dither technique.

FIG. 11 shows the outline of the halftoning process by the conventional systematic dither technique. The conventional systematic dither technique uses a dither matrix in a preset size (for example, 128 pixels×64 pixels) having evenly distributed threshold values of 1 to 255 as shown in the upper half of FIG. 11. The halftoning process compares the tone value of the CMYK image data in each pixel with a threshold value set at a corresponding pixel position in the dither matrix as shown in the lower half of FIG. 11. The pixel having the tone value of greater than the threshold value at the corresponding pixel position is specified as a dot-on pixel, whereas the pixel having the tone value of not greater than the threshold value at the corresponding pixel position is specified as a dot-off pixel. In this manner, the halftoning process converts the 256-tone CMYK data into the dot creation data representing the dot on-off state of each pixel.

The halftoning process of this embodiment does not directly use the global dither matrix of 128 pixels×64 pixels in size shown in the upper half of FIG. 11, but successively extracts 4×2 threshold value groups from the upper left end of the 128×64 dither matrix and allocates block numbers to the extracted 4×2 threshold value groups according to their positions. An encoding map is provided to correlate each block number to a 4×2 threshold value group. Namely the halftoning process of this embodiment is based on the 4×2 threshold value groups as described below.

Figures 12A, 12B:
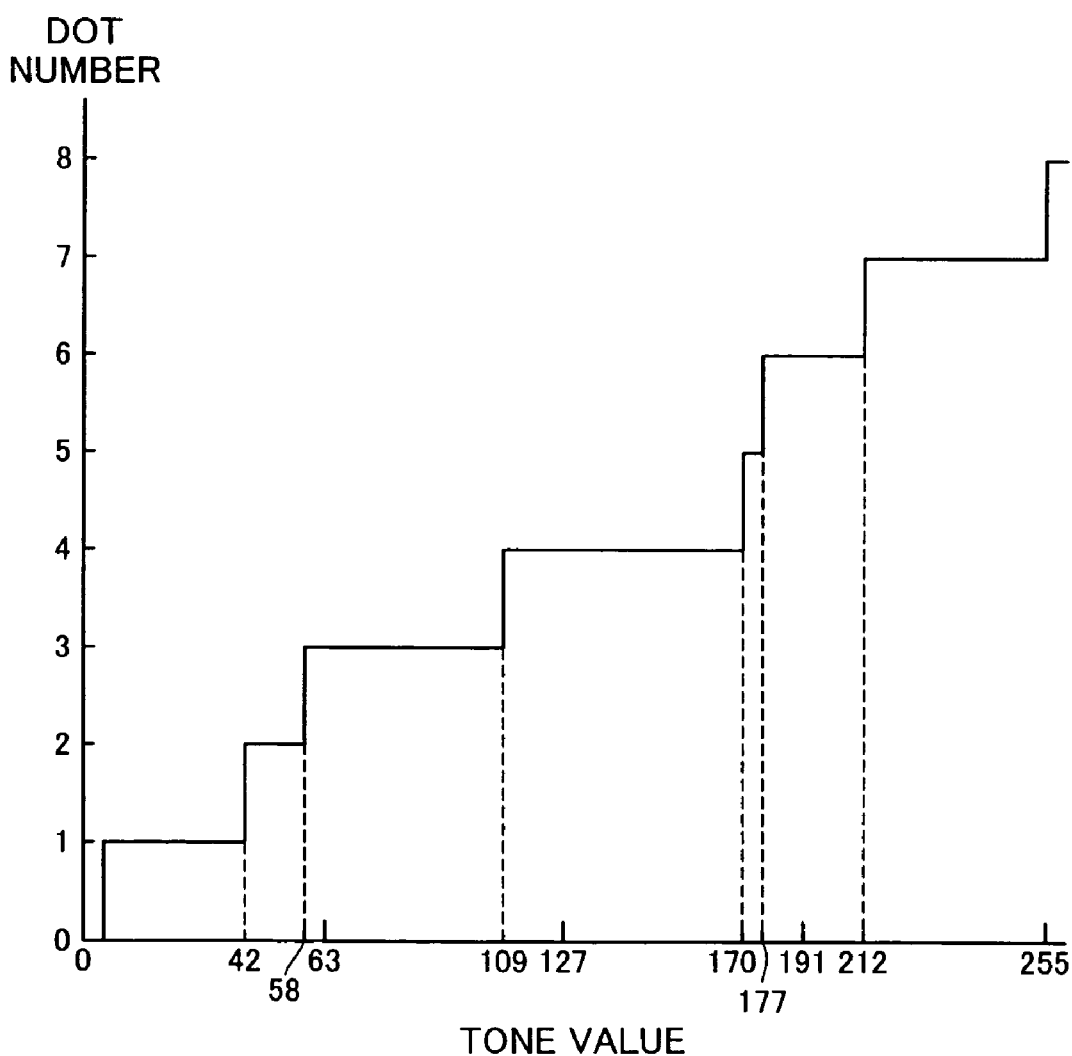
FIGS. 12A and 12B show a variation in number of dots to be created in a 4×2 pixel group.

Multiple 4×2 threshold value groups extracted from the global dither matrix of FIG. 11 have different combinations of threshold values. On the assumption that all the pixels in a 4×2 pixel group have an identical tone value, the dot on-off state changes stepwise at the positions of increasing tone value from 0 to 255 specified by 8 threshold values included in a corresponding 4×2 threshold value group. FIGS. 12A and 12B show a variation in number of dots to be created in a 4×2 pixel group. As shown in FIG. 12B, the number of dots to be created in the 4×2 pixel group sequentially changes, for example, from 0 to 1, from 1 to 2, or from 7 to 8, at the positions of tone values corresponding to 8 threshold values included in a threshold value group of FIG. 12A, that is, 1, 42, 58, 109, 170, 177, 212, and 255. The individual threshold value groups give different tone values as change points of the number of dots to be created in the 4×2 pixel group. Even when consecutive pixels have an identical tone value in image data, sequential application of the different threshold value groups leads to the same halftoning result as the halftoning result based on the global dither matrix of FIG. 11.

Figure 13:
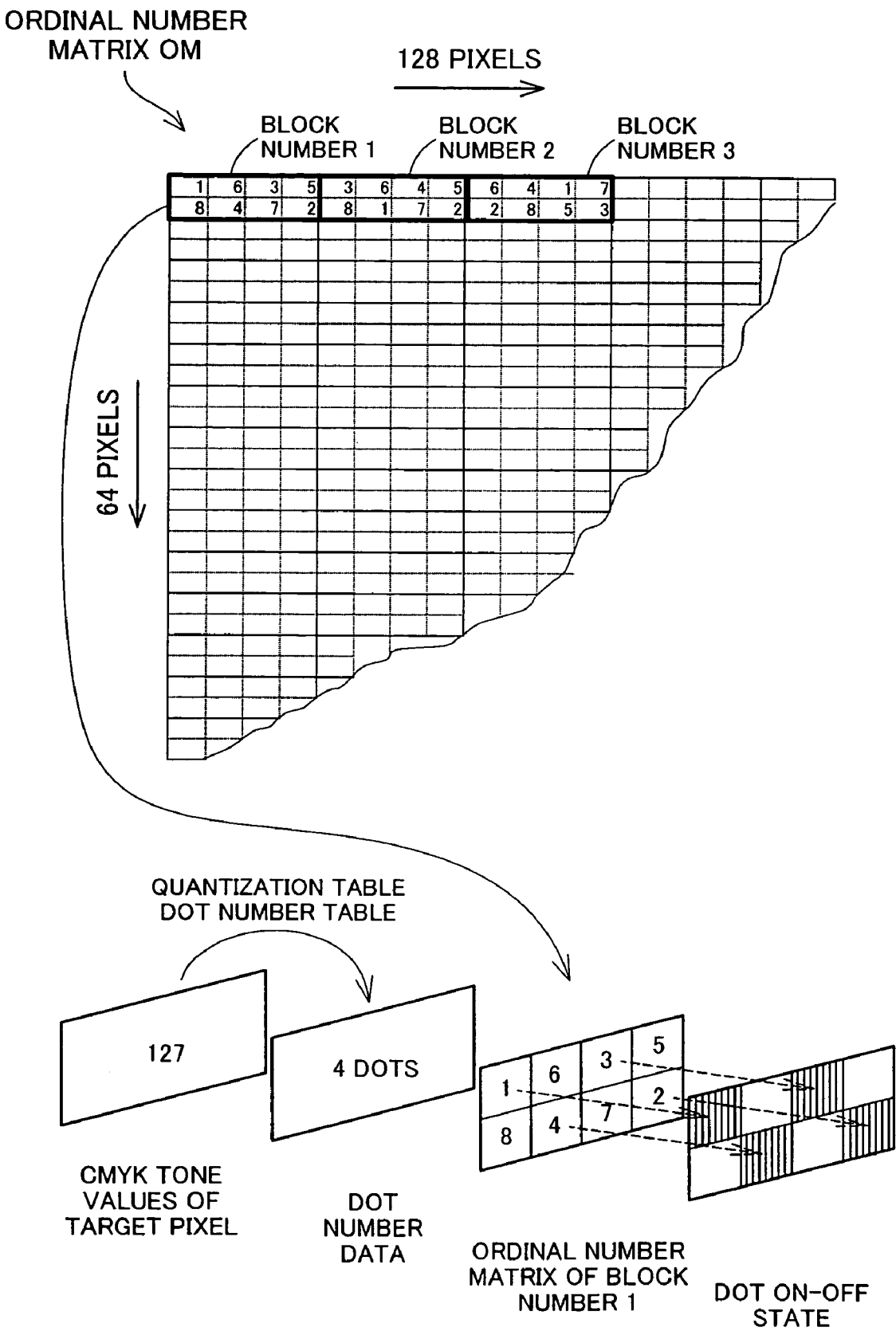
FIG. 13 shows a tone value of a pixel group, the number of dots to be created in the pixel group, and the positions of dot-on pixels.

The individual threshold value groups give different tone values as the change points of increasing the number of dots to be created in the 4×2 pixel group as shown in FIG. 12B. A map for each threshold value group may thus be provided to correlate the tone values to the numbers of dots to be created in a pixel group. When a target pixel of a certain pixel group selected as an object to be processed has a specific tone value of image data, the halftoning process of this embodiment specifies the block number of a threshold value group to be applied for processing the target pixel and refers to the map to read the number of dots, which is to be created in the certain pixel group, corresponding to the combination of the block number and the specific tone value of the target pixel. Specification of the threshold value group to be applied for processing the target pixel automatically determines the order of dot creation in the pixel group, since dots are sequentially created in the pixels having the smaller threshold values in the threshold value group. FIG. 13 shows a tone value of a pixel group, the number of dots to be created in the pixel group, and the positions of dot-on pixels. For example, when a target pixel in a certain pixel group has a tone value of 127, the halftoning process refers to the map (this is actualized by quantization data and a dot number table as described later) and generates dot number data representing the number of dots to be created in the certain pixel group (dot number data '4' in the illustrated example) based on the block number of a threshold value group to be applied for processing the target pixel and the tone value '127' of the target pixel. An ordinal number matrix OM defining the order of dot creation is also allocated to each block number. The combination of the dot number data with the ordinal number matrix OM determines the positions of 4 dot-on pixels as shown on the right end in the lower half of FIG. 13. The ordinal number matrix OM is obtained by dividing the dither matrix into 4×2 blocks, giving unique sequential block numbers to the respective 4×2 blocks, and allocating ordinal numbers representing the order of dot creation to the smaller threshold values in each 4×2 block. The halftoning process of this embodiment encodes information on the tone value of image data in a target pixel of a certain pixel group separately as divisional information on the change points of dot creation state set for a threshold value group corresponding to the certain pixel group and divisional information on the order of dot creation in the certain pixel group. The halftoning process subsequently decodes these pieces of information and determines the positions of dot-on pixels.

Figure 14:
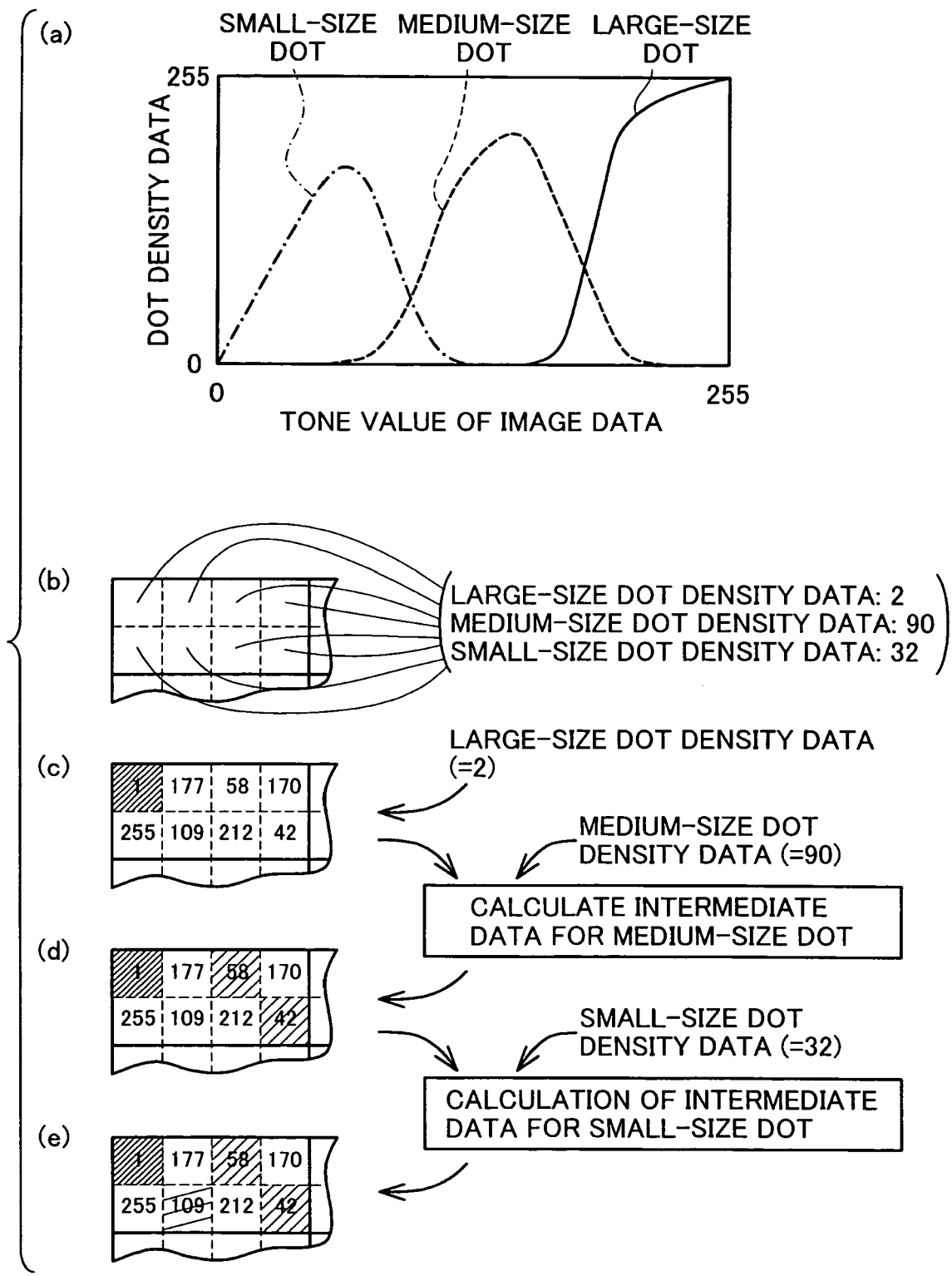
FIG. 14 shows determination of the dot on-off state in a printing apparatus that is capable of creating large-size, medium-size, and small-size dots.

The above description is on the assumption that the type of dots created on the printing medium is fixed to a single dot type. FIGS. 11, 12A, 12B, and 13 show only an example of determining the dot on-off state with regard to a single dot type. The actual printing apparatus may, however, be capable of creating multiple different types of dots in respective pixels, for example, large-size, medium-size, and small-size dots or dark and light dots. The determination of the dot on-off state is thus more complicated in the actual printing apparatus. FIG. 14 shows extension of the above concept to the printing apparatus 100 of the embodiment that is capable of creating the large-size dot, the medium-size dot, and the small-size dot. The actual procedure of specifying the combination of variable size dots to be created according to the tone value first converts the tone value of image data into density data of the small-size dot, the medium-size dot, and the large-size dot as shown in FIG. 14(a). The relation of FIG. 14(a) is set in advance, for example, for each printing apparatus or for the printing quality or the paper type. The graph of FIG. 14(a) gives density data of the small-size dot, density data of the medium-size dot, and density data of the large-size dot corresponding to a given tone value. When a 4×2 pixel group of FIG. 14(b) has a tone value 127, the relation of FIG. 14(a) gives small-size dot density data '32', medium-size dot density data '90', and large-size dot density data '2'. The dot on-off state of the large-size dot, the medium-size dot, and the small-size dot is determined by sequentially comparing the dot density data of the large-size dot, the medium-size dot, and the small-size dot with the threshold values in a corresponding 4×2 threshold value group. The procedure first compares the large-size dot density data '2' with the respective threshold values included in the corresponding 4×2 threshold value group. The comparison specifies a pixel having a threshold value '1' as a dot-on pixel of the large-size dot as shown in FIG. 14(c). There is no other dot-on pixel with regard to the large-size dot. The procedure subsequently adds the medium-size dot density data to the large-size dot density data (90+2=92) and compares the total density data with the respective threshold values in the threshold value group to determine the dot-on pixel of the medium-size dot. The comparison specifies pixels having threshold values '42' and '58' as dot-on pixels of the medium-size dot as shown in FIG. 14(d). The procedure then adds the small-size dot density data to the sum of the medium-size dot density data and the large-size dot density data (32+90+2=124) and compares the total density data with the respective threshold values in the threshold value group to determine the dot-on pixel of the small-size dot. The comparison specifies a pixel having a threshold value '109' as a dot-on pixel of the small-size dot as shown in FIG. 14(e).

Figure 15:
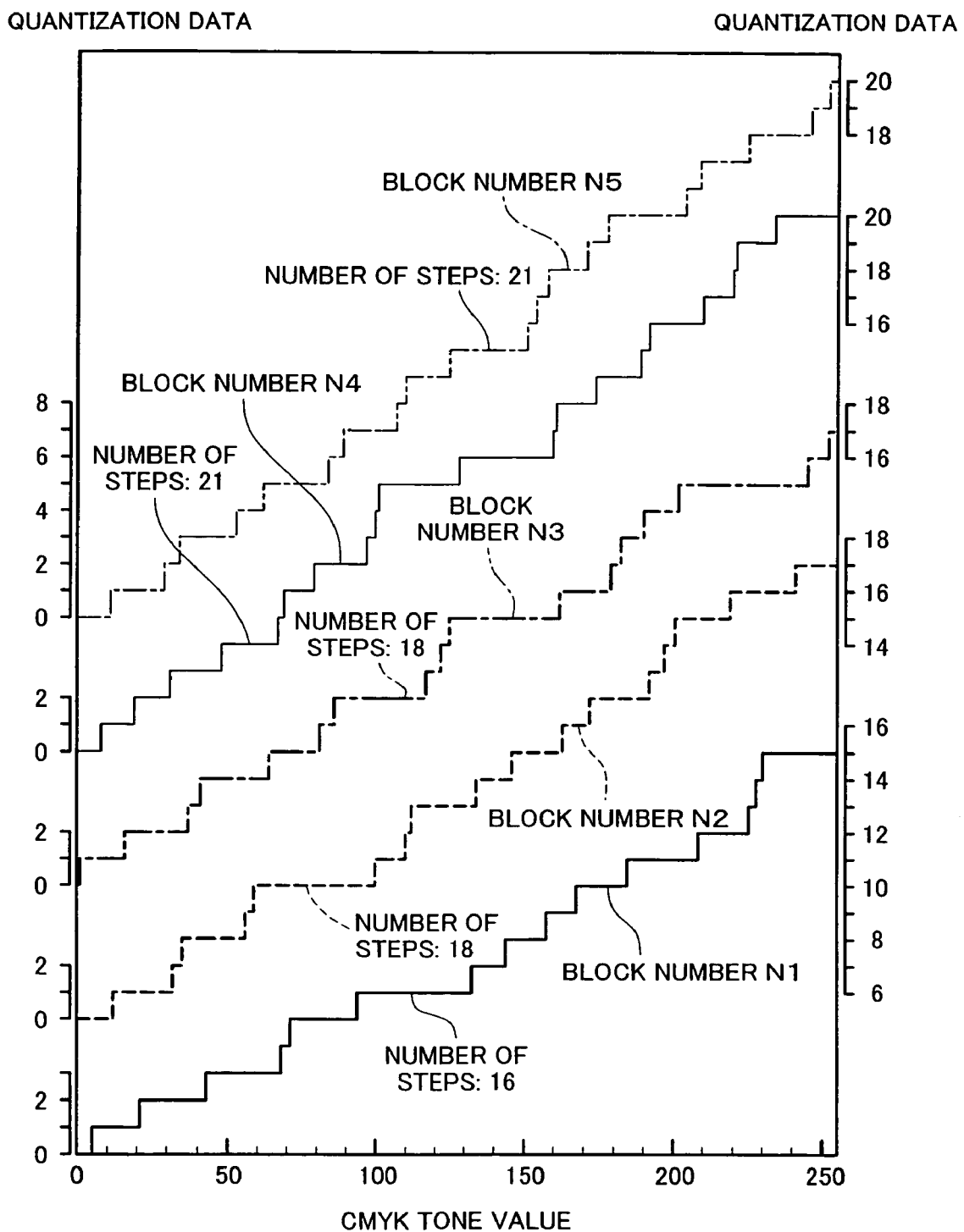
FIG. 15 shows variations of quantization data representing the combinations of numbers of the large-size dots, the medium-size dots, and the small-size dots against the tone value.
Figure 16:
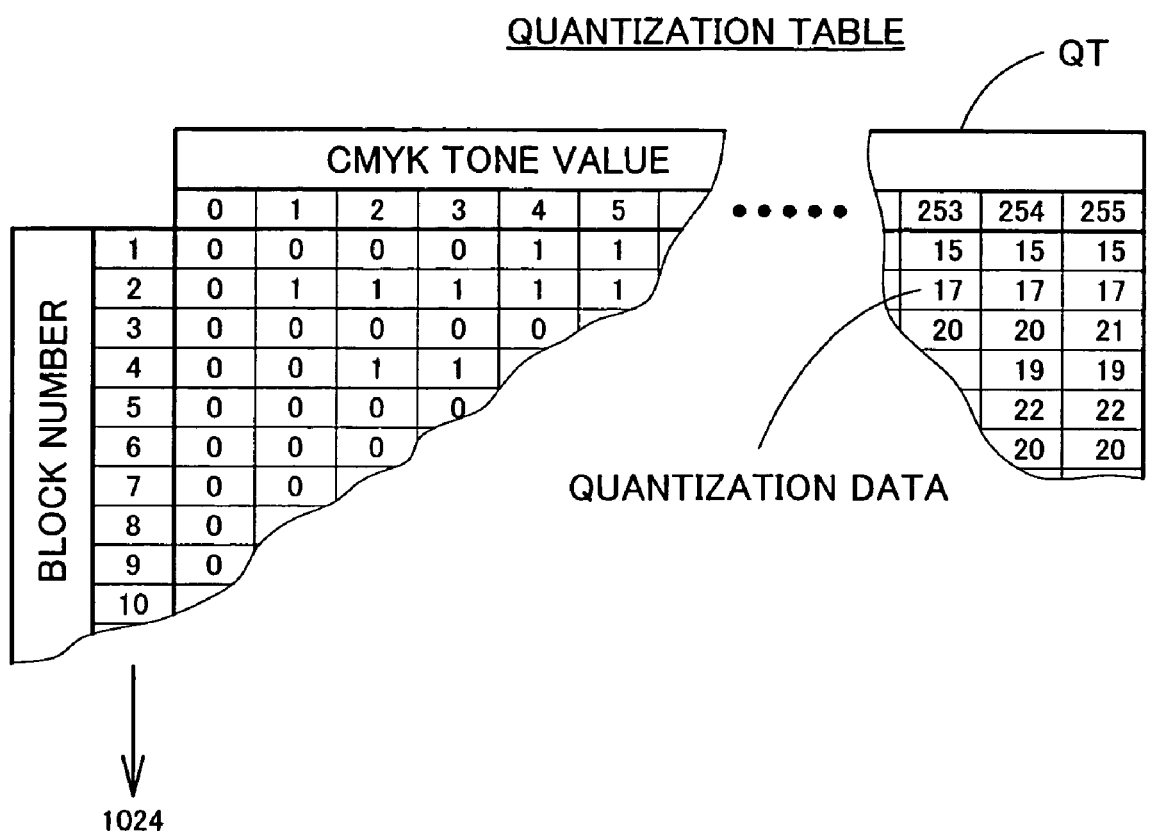
FIG. 16 shows one example of a quantization table QT.

In this manner, the dot creation state of the large-size dot, the medium-size dot, and the small-size dot in each pixel group (the numbers and the positions of dot-on pixels in the pixel group with regard to the respective size dots) is unequivocally determined by the combination of a tone value of the pixel group with a threshold value group applied to the pixel group. As described above with reference to FIGS. 12A and 12B, the procedure extracts multiple 4×2 threshold value groups from a global dither matrix provided in advance, gives block numbers to the respective 4×2 threshold value groups, and specifies a change in dot creation state of the large-size dot, the medium-size dot, and the small-size dot with a variation in tone value of each pixel group from the minimum value to the maximum value (from 0 to 255 in this embodiment), and provides the specified change as a map. FIGS. 15 and 16 show the map provided for the large-size dot, the medium-size dot, and the small-size dot. FIG. 15 is a graph showing a change in dot creation state of the large-size dot, the medium-size dot, and the small-size dot with a variation in tone value of image data from 0 to 255 with regard to five threshold value groups having block numbers N1 to N5. The abscissa shows the tone value, and the ordinate shows the value of quantization data given as the encoded dot creation state of the large-size dot, the medium-size dot, and the small-size dot corresponding to each tone value. For the easier understanding, variations in quantization data of the respective block numbers are illustrated with successive shifts along the ordinate in the graph of FIG. 15. The individual block numbers have different variations in dot creation data as shown in FIG. 15. This is ascribed to the fact that the different combinations of threshold values in a threshold value group, that is, the different block numbers, lead to different dot creation states of the large-size dot, the medium-size dot, and the small-size dot as described previously with reference to FIGS. 12A and 12B.

FIG. 16 shows a quantization table QT obtained from the graph of FIG. 15. The quantization table QT specifies a block number of a threshold value group, which is to be applied to a target pixel of the halftoning process, corresponding to the tone value of the target pixel and refers to the quantization table QT to generate quantization data as the encoded dot creation state of the large-size dot, the medium-size dot, and the small-size dot based on the specified block number and the tone value of the target pixel. In this embodiment, the process of converting the tone value of each pixel into quantization data is called the encoding process. In the quantization table QT of FIG. 16, the quantization data do not have a fixed maximum value but have different maximum values. This is because the different combinations of threshold values may lead to different frequencies of changes in combination of the large-size dot, the medium-size dot, and the small-size dot. The maximum frequency does not exceed 32, and the quantization data of FIG. 16 are expressible by 5-bit data at the maximum. In the specification hereof, the encoded value of the dot creation state is expressed as 'quantization data'. The use of the quantization table QT expresses the tone value of each pixel as a smaller apparent value. This phenomenon is expressed as 'quantization' in this embodiment.

The quantization data encoded according to the quantization table QT is then decoded. The decoding process of specifying the dot-on pixels in a 4×2 pixel group based on the dot number data has been described briefly in the case of creation of only a single dot type with reference to FIG. 13. The printing apparatus of this embodiment ejects ink droplets of three variable sizes to create the large-size dot, the medium-size dot, and the small-size dot on the printing medium. The decoding process with regard to creation of the variable size dots is, in principle, identical with the decoding process with regard to creation of only one dot type described above with reference to FIG. 13. The decoding process of this embodiment refers to a first dot number table DT1 (FIG. 22) and a second dot number table DT2 (FIG. 23) and specifies the numbers of the large-size dots, the medium-size dots, and the small-size dots to be created in a certain pixel group based on the quantization data obtained as the encoding dot creation state. The decoding process then refers to an ordinal number matrix corresponding to the block number of the certain pixel group and determines the positions of the dot-on pixels of the respective size dots in the order of dot creation. The halftoning process then arranges the specified numbers of the large-size dots, the medium-size dots, and the small-size dots at the determined positions.

As described above, the halftoning process of this embodiment refers to the quantization table QT corresponding to a given tone value of each target pixel and a block number of a pixel group including the target pixel and accordingly encodes the given tone value to quantization data. The halftoning process then decodes the quantization data by simply referring to the dot number tables DT1 and DT2 of FIGS. 22 and 23 and the ordinal number matrix. The halftoning process of this embodiment is implemented by simple reference to the multiple tables including the quantization table and the dot number tables and does not require the conditional branching based on the comparison between the tone value and the threshold values as required in the conventional systematic dither technique. This desirably enhances the processing speed. The halftoning process of this embodiment is an extension of the systematic dither technique and does not have any quasi-contour noise characteristic in the error diffusion technique, thus ensuring the extremely high-quality printing.

<Detailed Structure of Halftoning Circuit>

With referring back to FIG. 10, the halftoning process 400 includes an encoder 410 that is connected with the inner-block smoothing unit 380 of the color conversion circuit 300 shown in FIG. 5 and encodes CMYK data, a data selector 420 that is connected with the encoder 410 and the seventh pass unit 390g and selects either of the output data from the encoder 410 and the seventh pass unit 390g, an EB control unit 440 that is connected with the data selector 420 and accumulates the output data from the data selector 420 into the encoded data buffer EB, and a decoder 430 that is connected with the encoded data buffer EB and decodes the encoded data accumulated in the encoded data buffer EB.

The seventh pass unit 390g arranged before the data selector 420 is connected in series with the sixth pass unit 390f in the color conversion circuit 300. The encoder 410 is the main unit corresponding to the seventh pass unit 390g. For example, when the seventh pass unit 390g receives black/white edge data, the encoder 410 receives CMYK data representing an average of four pixels as the encode source of the black/white edge data. The data output from the encoder 410 and the data output from the seventh pass unit 390g simultaneously enter the data selector 420.

(C-2-1) Encoder

The encoder 410 encodes 8-bit CMYK data received from the color conversion circuit 300 into 5-bit quantization data. The encoder 410 includes a block number identification circuit 411 and a quantization circuit 412 as shown in FIG. 10.

(C-2-1-1) Block Number Identification Circuit

The block number identification circuit 411 identifies the block number of each pixel expressed by the CMYK data input from the color conversion circuit 300. Different methods are adopted to identify the block number according to the mode of the output resolution for image printing. There are basically 7 modes of the output resolution:

| Mode | Input Resolution (dpi) | Output Resolution (dpi) |
|---|---|---|
| 1 × 1 | 360 × 360 | 360 × 360 |
| 1 × 2 | 360 × 360 | 360 × 720 |
| 2 × 1 | 360 × 360 | 720 × 360 |
| 2 × 2 | 360 × 360 | 720 × 720 |
| 2 × 4 | 360 × 360 | 720 × 1440 |
| 4 × 2 | 360 × 360 | 1440 × 720 |
| 4 × 4 | 360 × 360 | 1440 × 1440 |

In the structure of this embodiment, CMYK data of 360 dpi×360 dpi input from the color conversion circuit 300 is printed at the output resolution of 720 dpi×720 dpi. The block number is accordingly identified in a 2×2 mode among the above 7 modes. The mode of the output resolution is set in a specific register of the image processing unit 155 by the CPU 151, prior to a start of the printing operation. The current mode of the output resolution is specified by referring to the setting in the register.

FIG. 17 shows identification of the block number in the 2×2 mode. In the 2×2 mode, the encoder 410 doubles the resolution (360 dpi×360 dpi) of the input CMYK image data in both the horizontal direction and in the vertical direction and outputs the CMYK image data at the double resolution of 720 dpi×720 dpi. Namely the size of a 4×2 unit block with one block number in the ordinal number matrix OM shown in the lower half of FIG. 17 corresponds to the size of 2 pixels×1 pixel in the CMYK image data output in the 2×2 mode. In the 2×2 mode, the encoder 410 identifies two adjacent pixels in the horizontal direction among the pixels of the CMYK image data to have an identical block number.

According to this block number identification method, for example, the encoder 410 identifies a first set of adjacent two pixels located on an upper left corner of the CMYK image data to have a block number '1' and a subsequent set of adjacent two pixels on the right of the first set to have a block number '2' as shown in FIG. 17. The encoder 410 also identifies another set of adjacent two pixels below the first set to have a block number '33'. In this manner, the encoder 410 identifies the block number of each set of adjacent two pixels.

Figure 18:
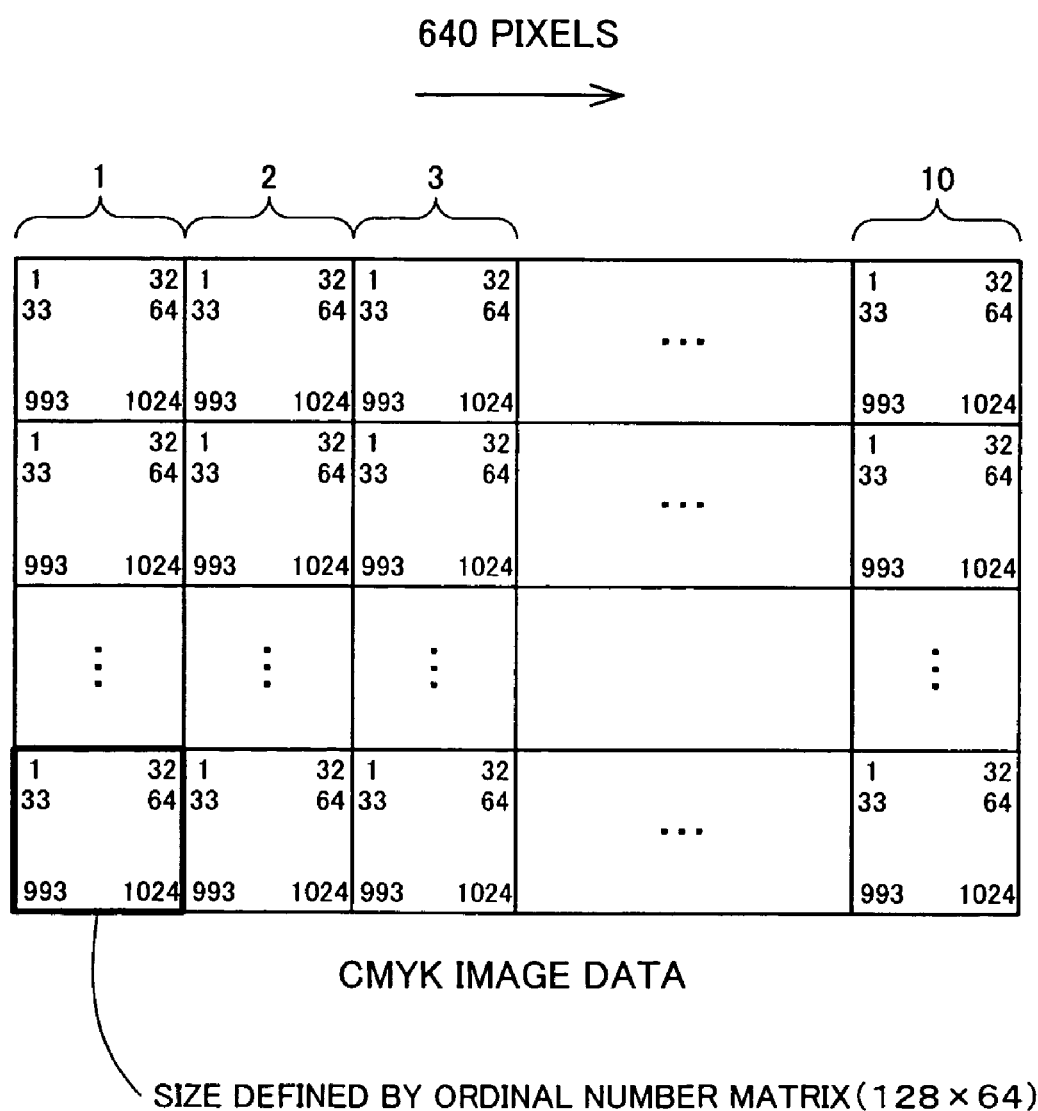
FIG. 18 shows one example of block number identification.

FIG. 18 shows one example of the block number identification. The size of image data input from the computer 900 or the scanner 100 is generally greater than the size (128 pixels× 64 pixels) of the dither matrix (see FIG. 11) as the source of the ordinal number matrix OM. In the illustrated example of FIG. 18, the ordinal number matrix OM corresponding to the size of the dither matrix is applied repeatedly for identification of the block number. For example, when the CMYK image data input into the encoder 410 have a horizontal dimension of 640 pixels, the procedure repeats identification of the block numbers of 1 to 31 ten times with regard to the respective sets of adjacent two pixels located on an upper-most line (=640/(32*2)). The procedure then repeats identification of the block numbers 33 to 64 ten times with regard to the respective sets of adjacent two pixels located on a second upper-most line.

(C-2-1-2) Quantization Circuit

With referring back to FIG. 10, the quantization circuit 412 refers to the quantization table QT shown in FIG. 16 and sequentially encodes the CMYK data of the pixels with the identified block numbers to quantization data. The quantization table QT is stored in the SDRAM 152 as shown in FIG. 4.

As shown in FIG. 16, the quantization table QT sets the quantization data in the range of 0 to 31 according to the tone value of the CMYK data (the minimum '0' to the maximum '255) and the block number (the minimum '1' to the maximum '1024'). The quantization circuit 412 refers to this quantization table QT and reads quantization data of each target pixel with the block number identified by the block number identification circuit 411 corresponding to the CMYK data of the target pixel.

As shown in FIG. 15, the quantization data is set to increase with an increase in tone value. The degree of the increase varies according to the block number. The block numbers N1 to N5 in FIG. 15 represent different block numbers, and the graph of FIG. 15 shows the encoding results with regard to five pixels corresponding to these different block numbers N1 to N5. In the graph of FIG. 15, for the clear distinction, the origins of the respective polygonal curves of the block numbers N1 to N5 are successively shifted along the ordinate.

The thick solid-line polygonal curve of the block number N1 has quantization data '0' in the tone value range of '0' to '4' and increases to '1' in the tone value range of '5' to '20', to '2' in the tone value range of '21' to '42', and to '3' in the tone value range of '43' to '69'. The increasing tone value of each pixel leads to this stepwise increase of the quantization data. The quantization data eventually increases to '15'. This quantizes the tone values of the respective pixels in the range of 0 to 255 to the 16 stages of 0 to 15.

The thick broken-line polygonal curve of the block number N2 and the thick one-dot chain-line polygonal curve of the block number N3 quantize the tone values of the respective pixels in the range of 0 to 255 to the 18 stages of 0 to 17. The thin solid-line polygonal curve of the block number N4 and the thin one-dot chain-line polygonal curve of the block number N5 quantize the tone values of the respective pixels in the range of 0 to 255 to the 21 stages of 0 to 20. The quantization data typically has the 15 to 22 stage according to the individual block numbers. The quantization table QT sets quantization data at a preset number of stages corresponding to each block number. The decree of increase in quantization data is also specified for each block number. When multiple pixels having an identical tone value belong to different block numbers, the identical tone value of the multiple pixels may be quantized to different values of quantization data.

As described above, the quantization circuit 412 converts the CMYK image data of the 256 tone values into quantization data of 32 steps at the maximum. This converts the 8-bit CMYK image data to the 5-bit data representing the information required for dot creation, thus desirably saving the total data volume.

The encoder 410 eventually outputs the quantization data of each pixel with regard to each color, which has been encoded by the quantization circuit 412, to the data selector 420.

(C-2-2) Data Selector

Figure 19:
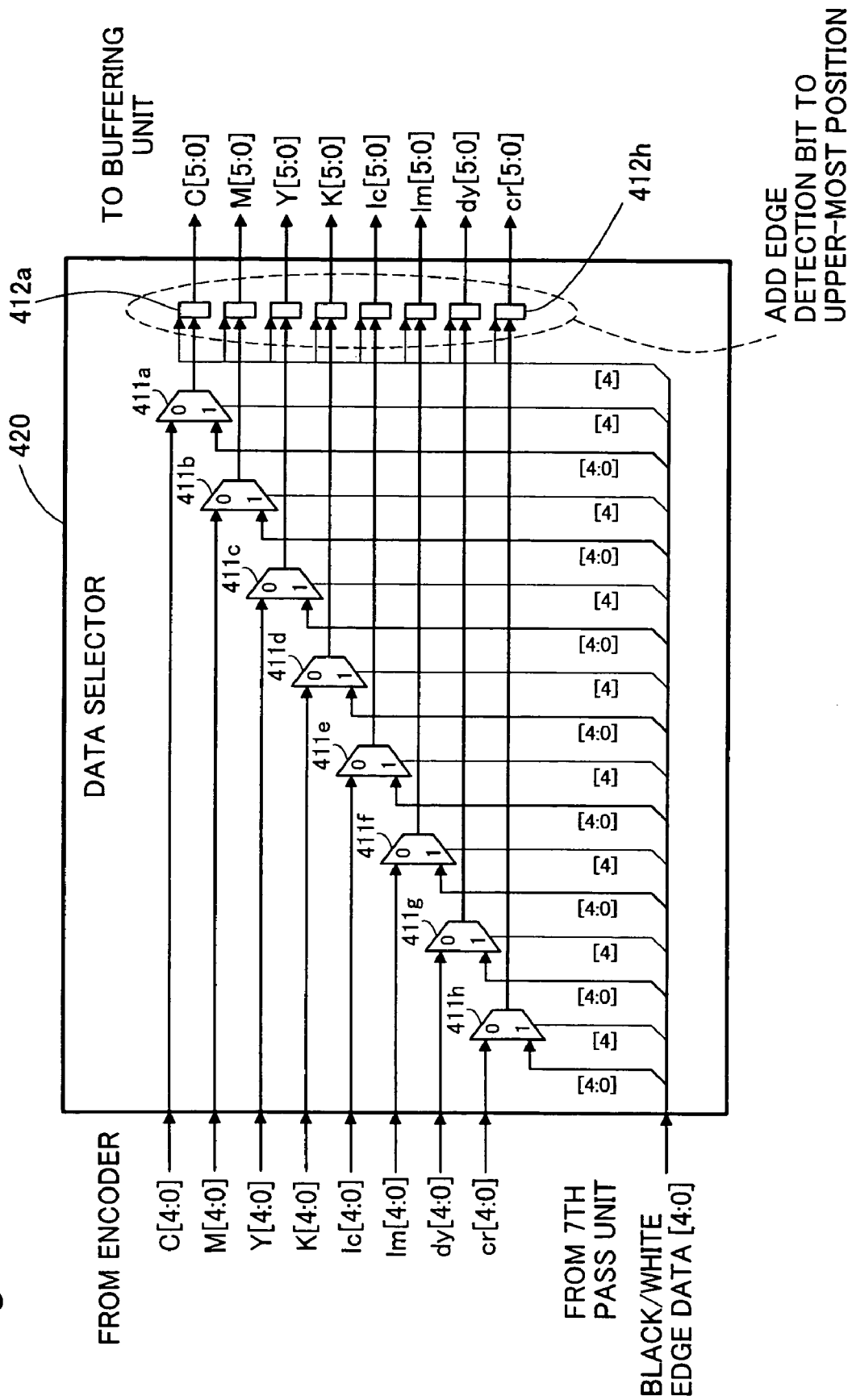
FIG. 19 shows the internal structure of a data selector 420 shown in FIG. 10.

FIG. 19 shows the internal structure of the data selector 420 of FIG. 10. The data selector 420 has eight selector elements 411a through 411h corresponding to the 8 different inks used in the printing apparatus 100. Each of the selector elements 411a through 411h receives the 5-bit quantization data of the corresponding color from the encoder 410, while receiving the 5-bit black/white edge data from the seventh pass unit 390g. Each selector elements 411a through 411h also receives an upper-most bit of the black-white edge data as a select signal, that is, the setting of the black-white edge detection flag.

After receiving the data from the encoder 410 and the seventh pass unit 390g, each of the selector elements 411a through 411h identifies the setting of the black/white edge detection flag input as the select signal. When the black/white edge detection flag is equal to '1', the selector element 411a through 411h selects and outputs the input black/white edge data. When the black/white edge detection flag is equal to '0', on the other hand, the selector element 411a through 411h selects and outputs the input quantization data. Bit adders 412a through 412h are arranged after the respective selector elements 411a through 411h. The bit adders 412a through 412h respectively add the value of the black/white edge detection flag to the upper-most bit of the selected data output from the selector elements 411a through 411h. The data eventually output from the data selector 420 accordingly has a 6-bit data volume, whether the output data is quantization data or the black/white edge data. The data selector 420 outputs the selected data with the additional bit to the EB control unit 440. The 5-bit black/white edge data input into the data selector 420 already includes the value of the black/white edge detection flag at the upper-most bit added by the black/white edge processing unit 320 of the color conversion circuit 300. The value of the black/white edge detection flag is thus recorded in an overlap manner at the upper 2 bits of the 6-bit black/white edge data. The demerit of the overlap record of the same data is, however, negligible over the advantages of the same data length of the quantization data and the black/white edge data. Adjustment of these data to the same data length desirably facilitates the address management in the encoded data buffer EB for storage of these data, avoids the complicated hardware structure, and enhances the processing speed.

(C-2-3) EB Control Unit

With referring back to FIG. 10, the EB control unit 440 selectively receives either the 6-bit black/white edge data or the 6-bit quantization data from the data selector 420 and accumulates the received data into the encoded data buffer EB. In the description below, 'encoded data' may represent both the quantization data and the black/white edge data. The EB control unit 440 of this embodiment is equivalent to the 'output image generation module' of the invention.

Figure 20:
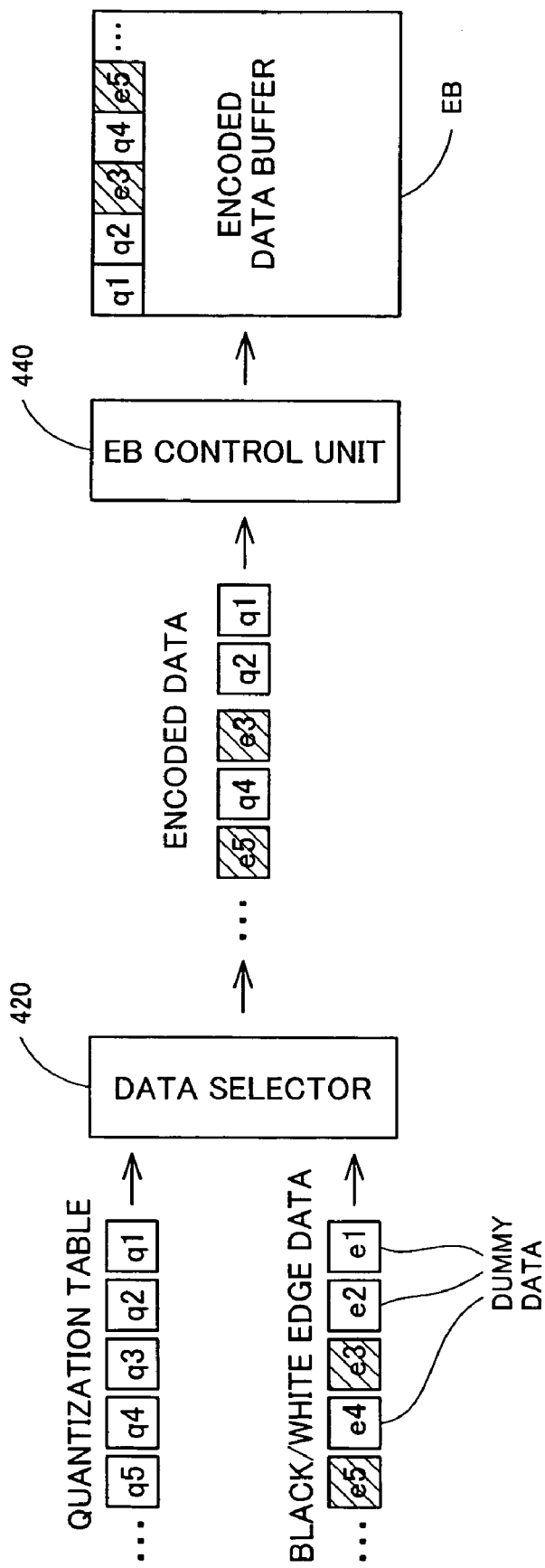
FIG. 20 conceptually shows accumulation of encoded data into an encoded data buffer EB.

FIG. 20 conceptually shows accumulation of encoded data into the encoded data buffer EB by the EB control unit 440. As illustrated, the data selector 420 receives the quantization data from the encoder 410 and the black/white edge data from the seventh pass unit 390g. The data selector 420 identifies the setting of the black/white edge detection flag and outputs the black/white edge data except dummy data '000000' preferentially over the quantization data as the encoded data. The EB control unit 440 sequentially accumulates the encoded data output from the data selector 420 into the encoded data buffer EB. The encoded data accumulated in the encoded data buffer EB are sequentially read out by the decoder 430 shown in FIG. 10.

(C-2-4) Decoder

Figure 21:
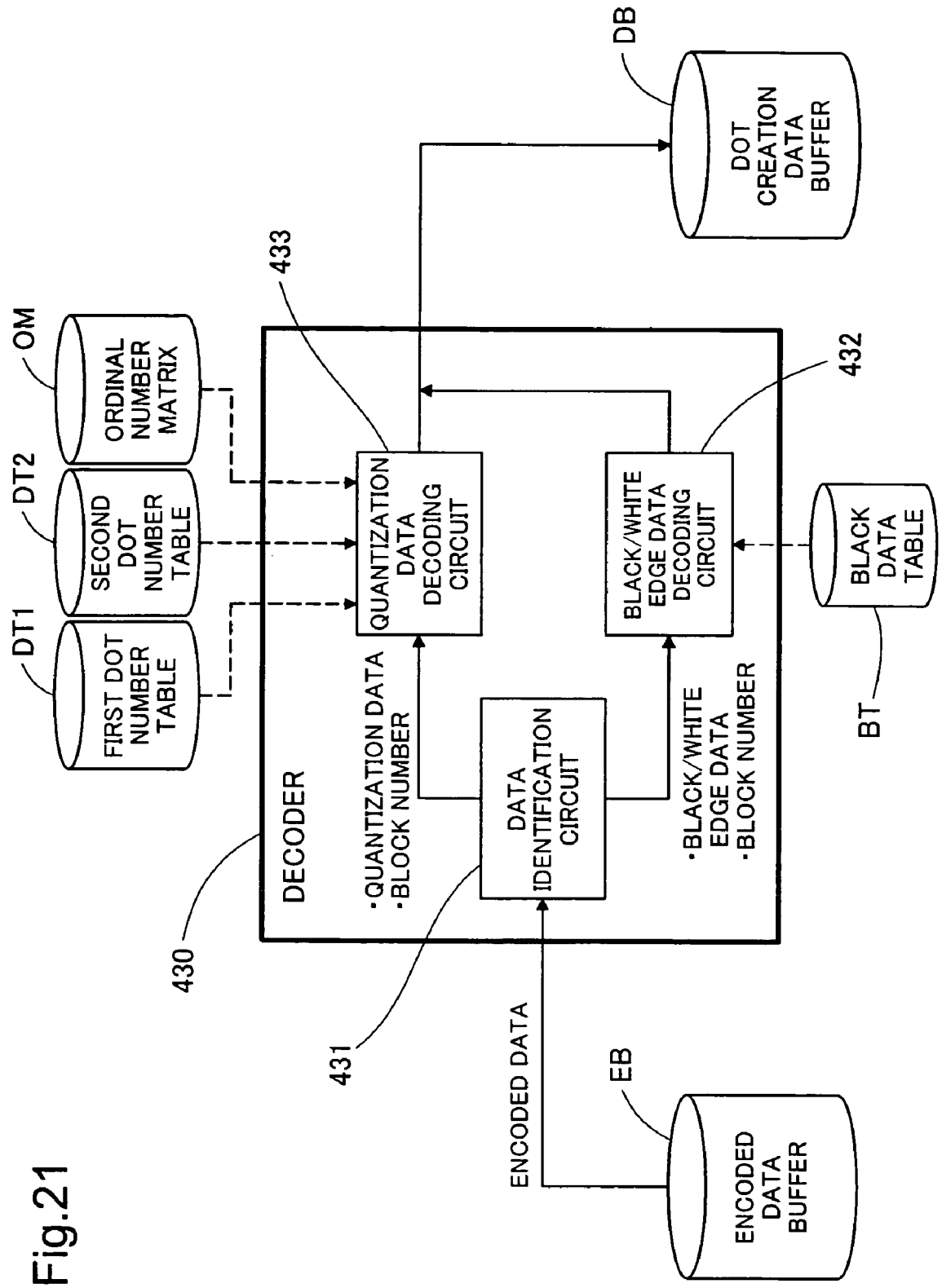
FIG. 21 shows the internal structure of a decoder 430 shown in FIG. 10.

FIG. 21 shows the internal structure of the decoder 430 shown in FIG. 10. The decoder 430 individually decodes the black/white edge data and the quantization data and generates dot creation data. As illustrated, the decoder 430 includes a data identification circuit 431 that is connected with the encoded data buffer EB and receives the encoded data, a black/white edge data decoding circuit 432 that receives the output from the data identification circuit 431 and decodes the black/white edge data, and a quantization data decoding circuit 433 that receives the output from the data identification circuit 431 and decodes the quantization data.

(C-2-4-1)

The data identification circuit 431 sequentially reads out the encoded data from the encoded data buffer EB and identifies the block number of the encoded data. The encoded data are accumulated into the encoded data buffer EB in the order of block numbers identified as shown in FIGS. 17 and 18. Reading out the encoded data in the order of accumulation thus automatically identifies the block numbers of the encoded data. In the 2×2 mode of the output resolution, adjacent two pixels have the same block number. The first and the second read-out encoded data have the block number '1', and the third and the fourth read-out encoded data have the block number '2'. With regard to the encoded data of CMYK image data having 640 pixels in the horizontal direction, the block numbers of 1 to 32 for the first sets of adjacent two pixels are identified repeatedly ten times (=640/(32*2)), and the block numbers of 33 to 64 for the subsequent sets of adjacent two pixels are identified repeated ten times. The pieces of information on the mode of the output resolution and the image size have been set in registers of the image processing unit 155 by the CPU 151. The data identification circuit 431 refers to these registers and identifies block numbers according to the mode of the output resolution and the image size.

After identification of the block numbers, the data identification circuit 431 checks the upper-most bit of the 6-bit encoded data. The value of the black/white edge detection flag has been added as the upper-most bit by the data selector 420 for identification of the encoded data. When the upper-most bit of the encoded data is equal to '0', the encoded data is identified as the quantization data. The data identification circuit 431 cuts off the upper-most bit and transfers the 5-bit quantization data and the identified block number to the quantization data decoding circuit 433. When the upper-most bit of the encoded data is equal to '1', on the other hand, the encoded data is identified as the black/white edge data. The data identification circuit 431 cuts off the upper 2 bits recording the value of the black/white edge detection flag and transfers the 4-bit black/white edge data and the identified block number to the black/white edge data decoding circuit 432.

(C-2-4-2) Quantization Data Decoding Circuit The quantization data decoding circuit 433 decodes the 5-bit quantization data transferred from the data identification circuit 431 and generates dot creation data. The dot creation data expresses the size of a dot to be created in each pixel by one of 4 values, '11', '10', '01', and '00' and represents a printed image by distribution of these 4 values. The process of generating the dot creation data refers to the first dot number table DT1 and the second dot number table DT2 stored in the SDRAM 152 to convert the quantization data into dot number data representing the numbers of the large-size dots, the medium-size dots, and the small-size dots to be created, and arranges the respective size dots based on the dot number data and the ordinal number matrix OM stored in the SDRAM 152. This dot creation data generation process is described in detail below.

<Conversion of Quantization Data to Dot Number Data>

Figure 22:
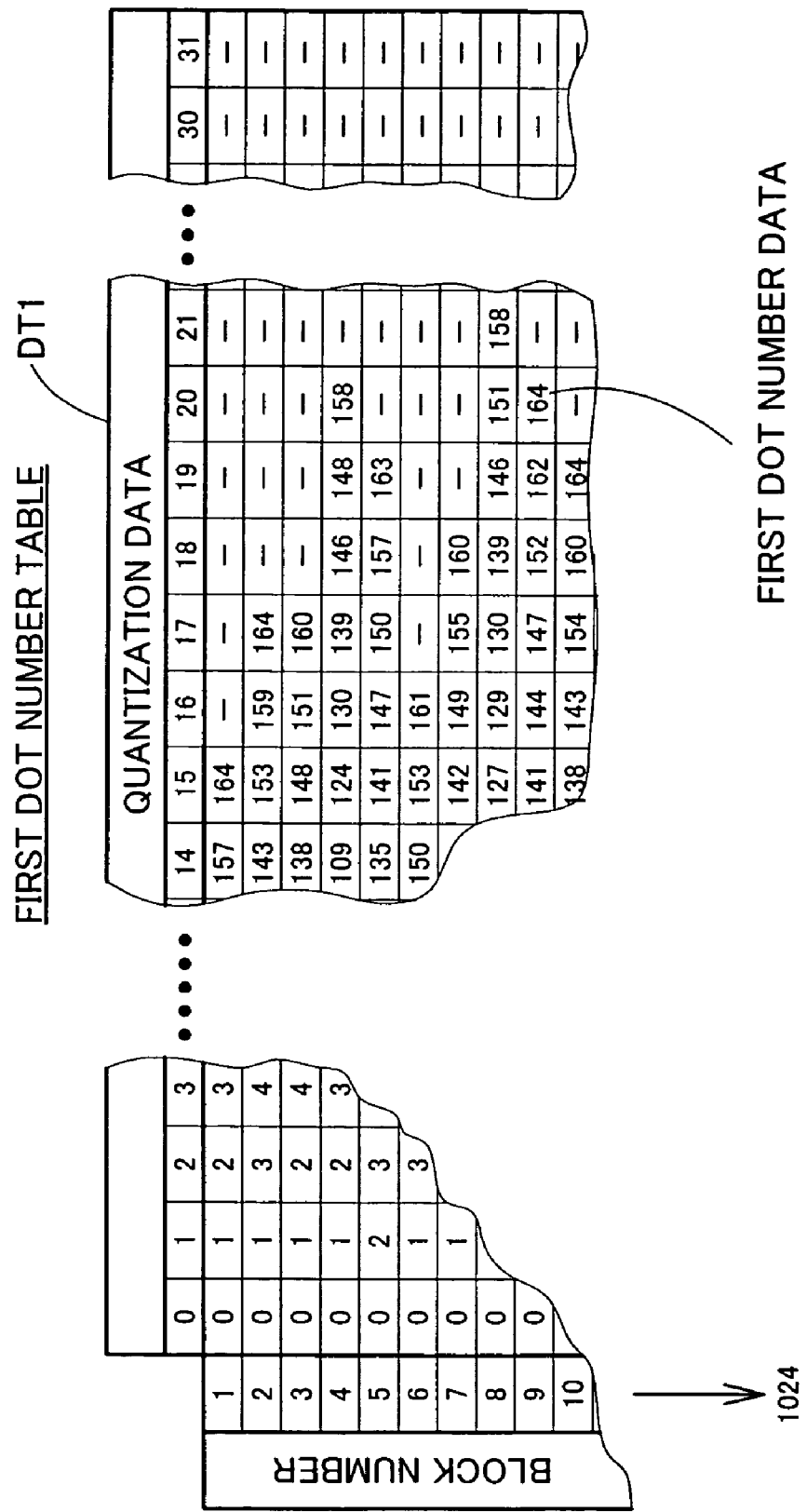
FIG. 22 shows one example of a first dot number table DT1.

FIG. 22 shows one example of the first dot number table DT1. As illustrated, the first dot number table DT1 stores first dot number data set in correlation to the block number and the quantization data. The first dot number data specifies the numbers of the respective size dots to be created in pixels expressed by the quantization data. The first dot number data does not directly represent the numbers of the respective size dots to be created but is given as an encoded value specifying the numbers of the large-size dots, the medium-size dots, and the small-size dots to be created in the pixels as described later. The first dot number data takes the value in the range of 0 to 164. The first dot number table DT1 converts the 5-bit quantization data to 8-bit first dot number data.

The maximum value of the first dot number data is 164, because of the following reason. Each of 8 pixels included in one block takes one of the four different dot on-off conditions, 'creation of the large-size dot', 'creation of the medium-size dot', 'creation of the small-size dot', and 'creation of no dot'. The number of combinations of the respective size dots is equal to the number of combinations by selecting one of these four states 8 times with allowance for repetition and is given as $_4H_8$ ($_{4+8-1}C_8$). There are accordingly 165 possible combinations (0 to 164) at the maximum. The operator $_nH_r$ determines the number of repeated combinations in selection among 'n' elements 'r' times with allowance for repetition. The operator $_nC_r$ determines the number of combinations in selection among 'n' elements 'r' times with prohibition of repetition.

The quantization data decoding circuit 433 refers to the first dot number table DT1 shown in FIG. 22 and accordingly generates first dot number data corresponding to the quantization data and the identified block number input from the data identification circuit 431. For example, when the input quantization data is '0' and the input block number is '1', the first dot number data is '0'. In another example, when the input quantization data is '3' and the block number is '2', the first dot number data is '4'.

The quantization data decoding circuit 433 refers to the second dot number table DT2 to convert the first dot number data to the second dot number data representing the numbers of the large-size dots, the medium-size dots, and the small-size dots to be created.

FIG. 23 shows one example of the second dot number table DT2. As illustrated, the second dot number table DT2 stores second dot number data representing the numbers of the respective size dots to be created, in correlation to the first dot number data. The right-side table explicitly shows the numbers of the respective size dots expressed by the second dot number data. The first dot number data takes the value in the range of 0 to 164 and accordingly has the 8-bit data volume. The second dot number data has a 16-bit data volume. Each pair of 2 bits in the 16-bit data represents a dot size.

FIG. 24 shows one example of the second dot number data. The second dot number data of this example is '0001011010111111'. Division of this data by each pair of 2 bits gives '00', '01', '01', '10', '10', '11', '11', '11'. Each pair of 2 bits expresses a dot size; '11', '10', 01', and '00' respectively denote creation of the large-size dot, creation of the medium-size dot, creation of the small-size dot, and no creation of any dot. The second dot number data of this example accordingly represents creation of 3 large-size dots, 2 medium-size dots, and 2 small-size dots. As shown in FIG. 24, the second dot number data includes multiple 2-bit data right-aligned in the descending order of the dot size.

With referring back to FIG. 23, for example, the second dot number table DT2 gives second dot number data '0000000000000000' corresponding to first dot number data '0'. This represents no creation of any of the 'large-size dot', the 'medium-size dot', and the 'small-size dot'. The second dot number table DT2 gives second dot number data '1010111111111111' corresponding to first dot number data '160'. This represents creation of 6 'large-size dots' and 2 'medium-size dots'.

The lower graph of FIG. 23 shows a variation in dot size expressed by the second dot number data. As illustrated, the percentage of the greater-size dots increases with an increase in first dot number data. The first dot number data increase in proportion to the quantization data as shown in FIG. 22, which increases proportional to the tone value of the CMYK data as shown in FIG. 15. An increase in tone value of the CMYK data thus gradually leads to an increase in percentage of the greater-size dots and raises the density of dots created on the printing medium.

<Arrangement of Dots According to Ordinal Number Matrix>

After conversion of the first dot number data into the second dot number data, the quantization data decoding circuit 433 of FIG. 21 refers to the ordinal number matrix OM stored in the SDRAM 152 and arranges the respective-size dots based on the second dot number data and the block number.

FIG. 25 shows part of the ordinal number matrix OM shown in FIG. 13. As described previously, the ordinal number matrix stores the previously set ordinal numbers representing the order of dot creation in respective elements of each 4×2 unit block. The order of dot creation is individually set for each 4×2 unit block, and different values 1 to 8 are set as the ordinal numbers for 8 elements of the 4×2 unit block. For example, in the ordinal number matrix OM corresponding to the block number '1', an ordinal number '1' is set to an element at the upper left corner among the 8 elements. A first dot is thus created at the upper left corner of the 4×2 unit block having the block number '1'. In this ordinal number matrix OM corresponding to the block number '1', an ordinal number '2' is set to an element at the lower right corner among the 8 elements. A second dot is thus created at the lower left corner of the 4×2 unit block.

In another example, in the ordinal number matrix OM corresponding to the block number '2', the ordinal number '1' and the ordinal number '2' are respectively set to a second lower left element and to an element at the lower right corner. In the ordinal number matrix OM corresponding to the block number '3', the ordinal number '1' and the ordinal number '2' are respectively set to a second upper right element and to an element at the lower left corner. In this manner, the order of dot creation is individually set for each block number.

FIG. 26 conceptually shows arrangement of dots in 8 pixels based on the second dot number data and the ordinal number matrix OM. In this illustrated example, the second dot number data represents creation of 3 large-size dots, 2 medium-size dots, and 2 small-size dots. The ordinal number matrix OM applied to the second dot number data is the ordinal number matrix OM corresponding to the block number '1' shown in FIG. 25.

As shown in FIG. 26, the quantization data decoding circuit 433 first obtains 2-bit data located at the right end of the second dot number data with regard to the pixel having the ordinal number '1' in the ordinal number matrix OM, and subsequently obtains 2-bit data located at the second right end of the second dot number data with regard to the pixel having the ordinal number '2' in the ordinal number matrix OM. In this manner, 2-bit data are sequentially allocated from the right end of the second dot number data according to the ordinal numbers set in the ordinal number matrix OM. This generates intermediate dot data of 4 pixels×2 pixels in size as shown in the middle drawing. The bottom drawing shows an image of dots created according to the intermediate dot data.

According to the ordinal numbers set in the ordinal number matrix, 2-bit data are sequentially allocated from the right end of the second dot number data. The second dot number data includes multiple 2-bit data right-aligned in the descending order of the dot size. The greater-size dots are thus arranged earlier according to the ordinal numbers set in the ordinal number matrix OM. The large-size dots arranged in adjacent pixels are undesirably conspicuous. Sequential dot arrangement from the greater-size dots enables the greater-size dots to be preferentially distributed and made relatively inconspicuous, thus further improving the picture quality of the resulting printed image.

<Adjustment of Output Resolution by Allocation of Intermediate Dot Data>

The quantization data decoding circuit 433 generates intermediate dot data of 4 pixels×2 pixels from one quantization data according to the procedure described above. One quantization data corresponds to one pixel of the CMYK image data input into the halftoning circuit 400. Generation of intermediate dot data from all the quantization data converts the input resolution of 360 dpi×360 dpi to the output resolution of 1440 dpi×720 dpi. This is different from the expected output resolution 720 dpi×720 dpi in the 2×2 mode.

After conversion of the quantization data into the intermediate dot data, the quantization data decoding circuit 433 adequately allocates divisions of the generated intermediate dot data for adjustment of the output resolution. In the 2×2 mode, adjacent two pixels have an identical block number. Data of left 2×2 pixels in the intermediate dot data is allocated as dot creation data of the left-side pixel, while data of right 2×2 pixels in the intermediate dot data is allocated as dot creation data of the right-side pixel. This process adequately converts the input resolution of 360 dpi×360 dpi to the expected output resolution of 720 dpi×720 dpi.

Figure 27:
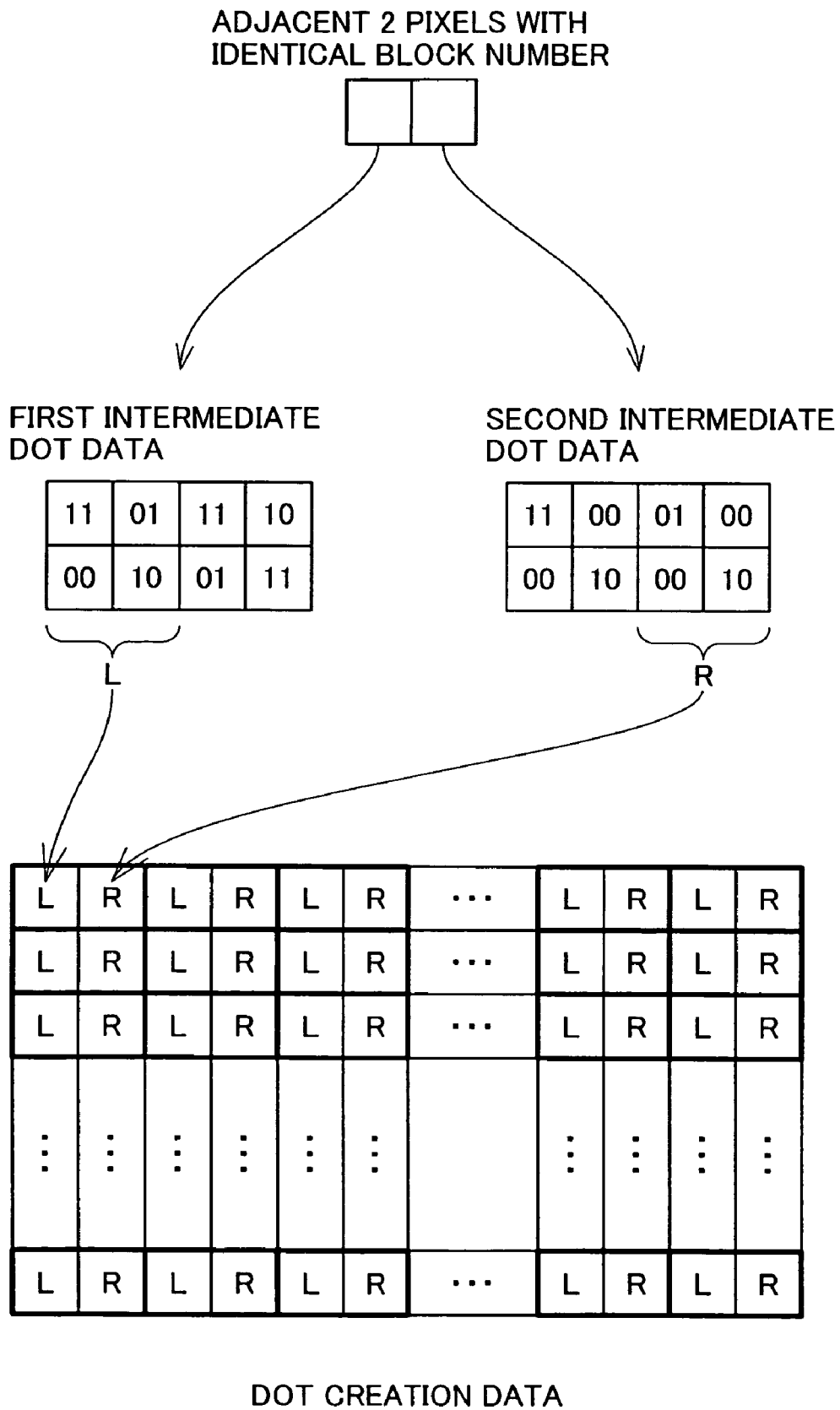
FIG. 27 shows allocation of intermediate dot data in the 2×2 mode.

FIG. 27 shows allocation of intermediate dot data in the 2×2 mode. As illustrated, the quantization data decoding circuit 433 receives quantization data of adjacent two pixels having an identical block number and converts each quantization data sequentially into first dot number data and second dot number data to generate intermediate dot data with reference to the ordinal number matrix OM. Each intermediate dot data thus generated includes data of 8 pixels. Data of 4 pixels on the left (shown by a letter 'L') in first intermediate dot data is adopted for dot creation data of the first pixel, while data of 4 pixels on the right (shown by a letter 'R') in second intermediate dot data is adopted for dot creation data of the second pixel. The quantization data decoding circuit 433 repeats this series of processing and generates dot creation data shown in the lower half of FIG. 27 from intermediate dot data with regard to each pair of adjacent two pixels having an identical block number.

According to the procedure described above, the quantization data decoding circuit 433 generates dot creation data of 2 pixels×2 pixels from each quantization data input from the encoded data buffer EB. The generated dot creation data are sequentially accumulated in the dot creation data buffer DB. This completes the decoding process by the quantization data decoding circuit 433.

The procedure of this embodiment generates intermediate dot data of all the 8 pixels, divides the generated intermediate dot data into two, and allocates one of the two divisions to dot creation data as described above with reference to FIGS. 26 and 27. Another technique may be adopted for such allocation. The divisions 'L' and 'R' of the intermediate dot data allocated to the dot creation data have been fixed as shown in FIG. 27. One modified procedure uses only the ordinal numbers of the ordinal number matrix OM corresponding to the respective divisions to be allocated and thus generates dot creation data and generates intermediate dot data of only the relevant pixels among the 8 pixels to obtain dot creation data. For example, the first 'L' on the upper-most left corner in the dot creation data of FIG. 27 is obtained by applying the 2-bit data of the second dot number data corresponding to the ordinal numbers '1', '6', '8', and '4' in the left half of the ordinal number matrix OM of the block number '1' shown in FIG. 26. The first 'R' on the right side of the first 'L' in the dot creation data of FIG. 27 is obtained by applying the 2-bit data of the second dot number data corresponding to the ordinal numbers '3', '5', '7', and '2' in the right half of the ordinal number matrix OM of the block number '1' shown in FIG. 26. This modified allocation procedure does not require generation of the intermediate dot data with regard to all the 8 pixels, thus enhancing the processing speed and saving the memory capacity.

(C-2-4-3) Black/White Edge Data Decoding Circuit

The black/white edge data decoding circuit 432 shown in FIG. 21 performs the halftoning process of the black/white edge data. The black/white edge decoding circuit 432 receives the 4-bit black/white edge data and the identified block number from the data identification circuit 431 and reversely looks up the black/white edge table ET shown in FIG. 8B to specify the color in each of the 2×2 pixels. For example, when the black/white edge data input from the data identification circuit 431 is '1110', the colors of the pixels (A,B,C,D)=(1,1,1,0) are specified as (white, white, white, black), where '1' represents white and '0' represents black.

Since the white color in the 2×2 pixels is expressed by no ink ejection, the black/white edge data decoding circuit 432 directly sets 2-bit dot creation data '00', which represents no dot creation, without the halftoning process. This enhances the processing speed. When the inks used in the printing apparatus include transparent ink, the black/white edge data decoding circuit 432 may set dot creation data '11' for only the transparent ink and dot creation data '00' for all the other inks.

The black color in the 2×2 pixels is expressed as (R,G,B)=(0,0,0) and has no color appearance in the RGB format. The black color by ink color representation, however, appears as combination of multiple color inks including C, M, and Y inks. The black/white edge data decoding circuit 432 refers to the black data table BT stored in the SDRAM 152 and converts the data of black color in the 2×2 pixels into dot creation data. The black/white edge consists of white pixels and black pixels, and only the black color requires dot creation. The data of black pixels in the black/white edge is readily convertible into dot creation data by referring to the black data table BT provided in advance for the halftoning process with regard to the black color. The black data table BT is created by halftoning reference image data of only black pixels in a preset size input into the color conversion circuit 300 and the halftoning circuit 400. The detailed procedure of creating the black data table BT will be described later. The black color is expressible by the K ink alone. In this embodiment, however, the black color is expressed by combination of multiple color inks including C, M, and Y inks, since fine adjustment of the color tone may be required according to the type of printing paper and the inclination of nozzles.

Figure 28:
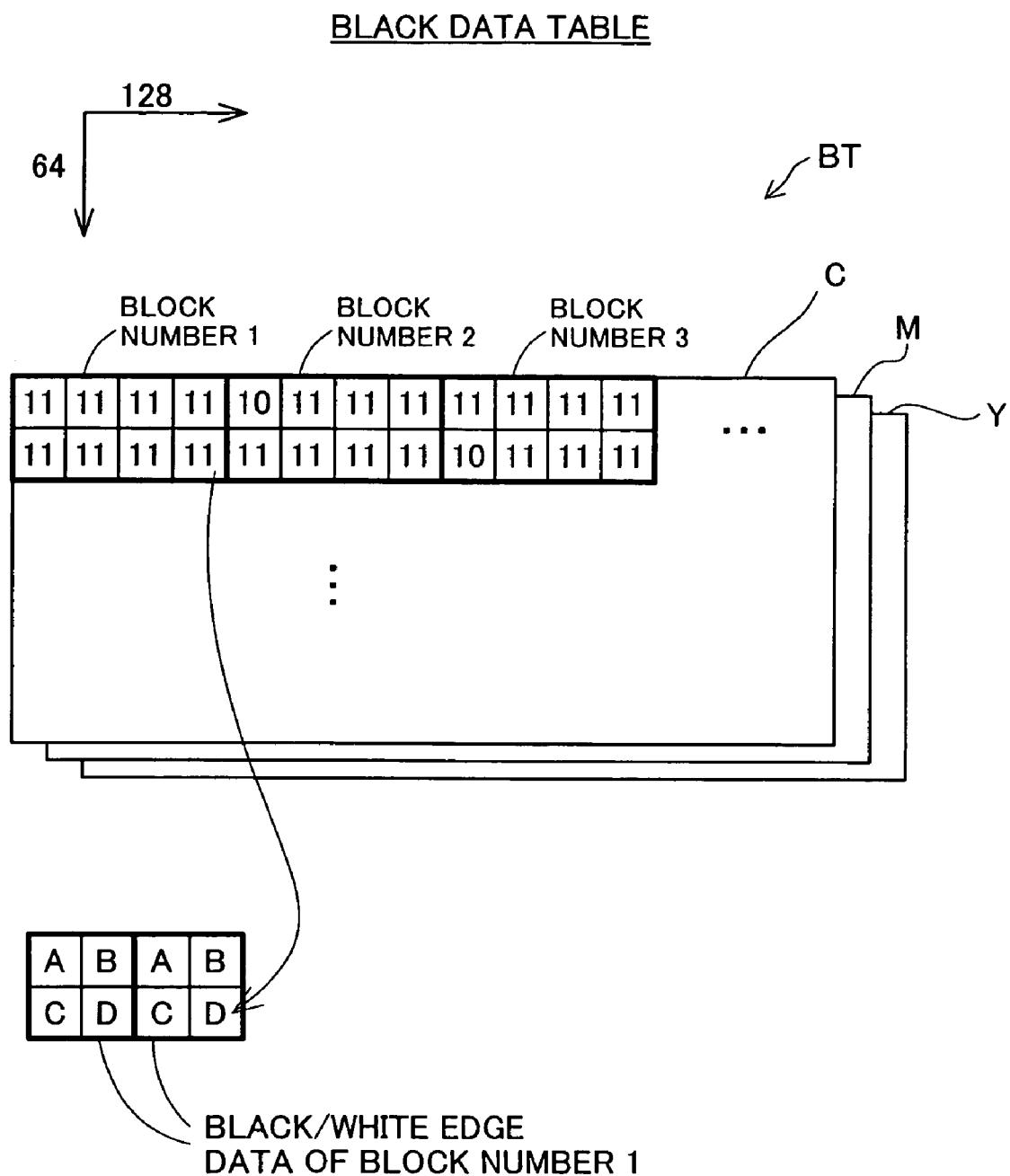
FIG. 28 shows one example of a black data table BT.

FIG. 28 shows one example of the black data table BT. As illustrated, the black data table BT has a size of 128×64, which is identical with the size of the ordinal number matrix OM, and is divided into multiple 4×2 unit blocks. Each unit block of the black data table BT has a block number that is identical with the block number allocated to the corresponding unit block of the ordinal number matrix OM. The black data table BT has 8 color planes corresponding to the 8 color inks. Each element of the black data table BT is 2-bit dot creation data representing the dot size to be created in the pixel. The black/white edge data decoding circuit 432 refers to this black data table BT and generates dot creation data corresponding to black data included in the black/white edge data.

The position in the black data table BT for obtaining the dot creation data of target black data as a processing object is specified by the block number of the input black/white edge data, the input order of the black/white edge data by the data identification circuit 431, and the position of black data in the 2×2 black/white edge data. In the illustrated example of FIG. 28, the input black/white edge data including the target black data has a block number '1', the black/white edge data is the second data input from the encoded data buffer EB, and the black data is present at the lower right position 'D' in the 2×2 black/white edge data. In this case, the dot creation data is obtained from the lower-right corner of the unit block having the block number '1' in the black data table BT.

The use of the black data table BT enables the black/white edge data decoding circuit 432 to directly convert the black data into dot creation data without sequential conversion to the CMYK format and the quantization data. This arrangement desirably enhances the processing speed. The black data table BT is used to convert the black/white edge data having the resolution of 720 dpi×720 dpi into the dot creation data having the resolution of 720 dpi×720 dpi. The black/white edge data decoding circuit 432 thus enables the highly-reproducible halftoning process, compared with the quantization data decoding circuit 433 receiving the quantization data at the input resolution of 360 dpi×360 dpi. The procedure of this embodiment uses the black data table BT to directly convert the black data into the dot creation data. One modified procedure may convert the black data (RGB data) into CMYK data, quantize the CMYK data, sequentially convert the quantization data to the first dot number data and to the second dot number data, and position the dots according to the ordinal number matrix OM to generate dot creation data.

The black/white edge data decoding circuit 432 converts the black/white edge data into the dot creation data of 4 pixels and successively accumulates the generated dot creation data into the dot creation data buffer DB. The dot creation data buffer DB accordingly stores the successively accumulated dot creation data of 2×2 pixel at the resolution of 720 dpi×720 dpi output from the quantization data decoding circuit 433 and the black/white edge data decoding circuit 432. The accumulated dot creation data include image data of the letters and characters and image data of the background, which are combined to constitute one output image. On completion of the accumulation of the dot creation data, the decoder 430 (see FIG. 21) outputs a ready signal representing the completed accumulation of the dot creation data to the head-driving data conversion circuit 500.

The decoder 430 eventually accumulates the dot creation data, which is printable by one main scan of the ink head 211, into the dot creation data buffer DB. Namely the decoder 430 accumulates the dot creation data into the dot creation data buffer DB after skipping out an extra part of the dot creation data that is located between the nozzle pitch and is unprintable by one main scan. The decoder 430 decodes only the quantization data or the black/white edge data corresponding to object raster lines of actual ink ejection to implement the required data skip-out. The skip-out procedure in the case of decoding the quantization data obtains the dot creation data from the second dot number data corresponding to only the required ordinal numbers in the ordinal number matrix OM (for example, only the ordinal numbers 1, 6, 3, and 5 in the ordinal number matrix OM shown in FIG. 26). The skip-out procedure in the case of decoding the black/white edge data obtains the dot creation data from the black data table BT corresponding to only the required part of the black/white edge data (for example, data corresponding to elements 'A' and 'B' in the bottom drawing of FIG. 28). The conventional error diffusion method requires distribution of an error of the tone value arising in each target pixel to the tone values of peripheral pixels and accordingly has difficulty in generation of dot creation data corresponding to only the object raster lines of actual ink ejection. The halftoning process of this embodiment, however, readily generates dot creation data corresponding to only the object raster lines of actual ink ejection as described above.

C-3. Head-Driving Data Conversion Circuit

The head-driving data conversion circuit 500 shown in FIG. 10 converts the dot creation data accumulated in the dot creation data buffer DB into head-driving data for actuating the ink head 211. As illustrated, the head-driving data conversion circuit 500 includes a data rearrangement unit 510 that is connected with the dot creation data buffer DB and an HB control unit 520 that is connected with the data rearrangement unit 510.

(C-3-1) Data Rearrangement Unit

The data rearrangement unit 510 receives the ready signal from the decoder 430 of the halftoning circuit 400, reads the dot creation data from the dot creation data buffer DB, and converts the dot creation data into head-driving data. Until completion of this data conversion, the data rearrangement unit 510 continuously sends a busy signal to the decoder 430 of the halftoning circuit 400. The decoder 430 interrupts the decoding process until stop of the busy signal. This effectively prevents overflow of the dot creation data buffer DB.

Figure 29:
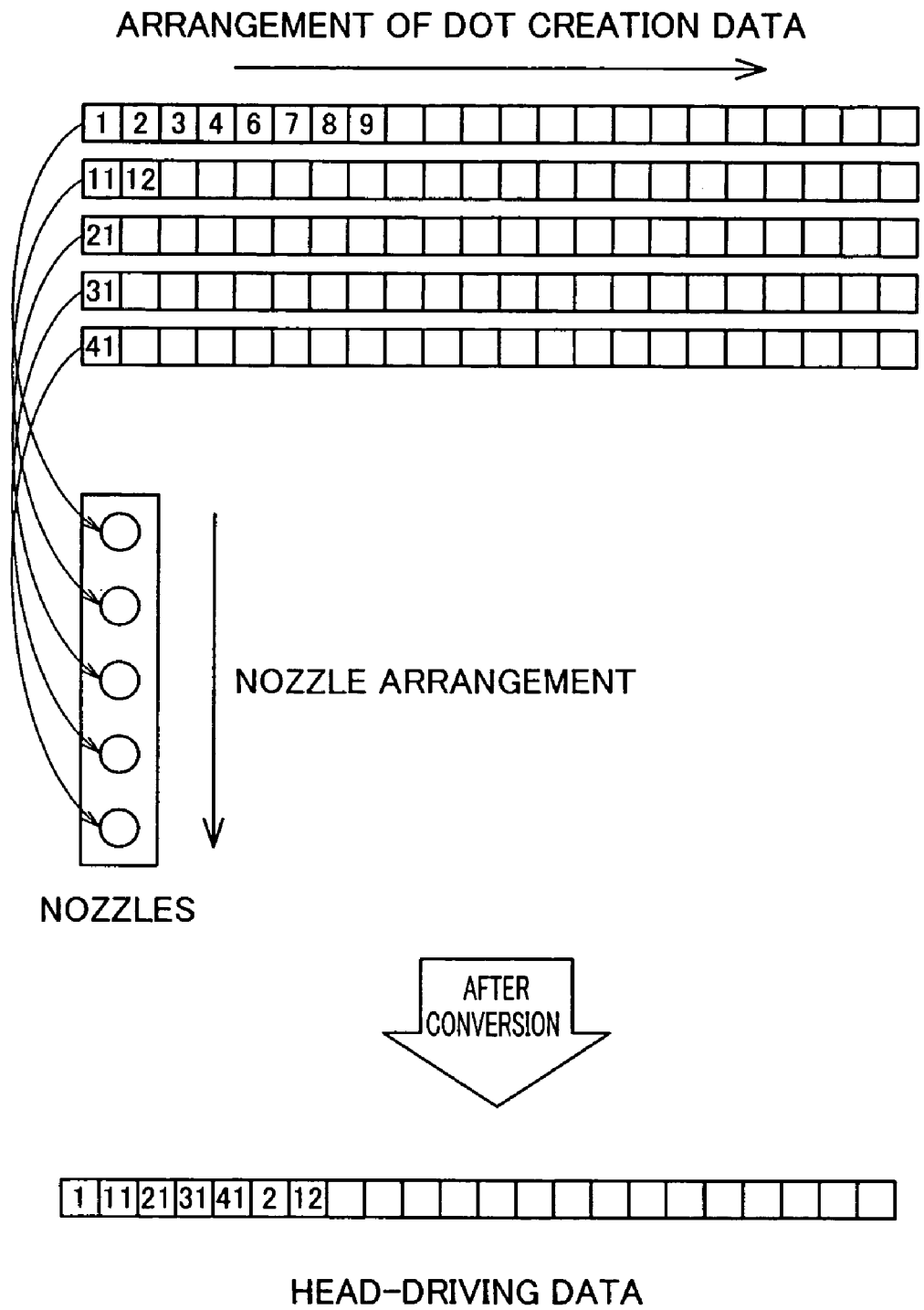
FIG. 29 conceptually shows data rearrangement by a data rearrangement unit 510.

FIG. 29 conceptually shows data rearrangement by the data rearrangement unit 510. The dot creation data buffer DB stores the dot creation data after the data skip-out aligned in the main scanning direction. The ink head 211 has an array of multiple nozzles for each color arranged in the sub-scanning direction and simultaneously prints a corresponding number of raster lines to the number of nozzles. The data rearrangement unit 510 reads the dot creation data in the vertical direction for sequential data allocation from the upper nozzle to the lower nozzle. This process rearranges the dot creation data to generate head-driving data as shown in the bottom of FIG. 29.

(C-3-2) HB Control Unit

The HB control unit 520 shown in FIG. 10 controls the data output to the head-driving data buffer HB. The head control unit 520 inputs the head-driving data from the data rearrangement unit 510 and sequentially stores the input head-driving data into the head-driving data buffer HB. The head-driving data stored in the head-driving data buffer HB are read by the head control unit 156 included in the control unit 150 shown in FIG. 2 to be subjected to ink ejection control. The head control unit 156 repeats main scans and sub-scans of the carriage 210 and applies a voltage waveform for creation of the large-size dot to piezoelectric elements in response to input data '11' from the head-driving data buffer HB, a voltage waveform for creation of the medium-size dot to piezoelectric elements in response to input data '10', and a voltage waveform for creation of the small-size dot to piezoelectric elements in response to input data '01'. In this manner, the printing apparatus 100 outputs a color printed image on the printing medium S.

D. Effects of Embodiment

As described above, the printing apparatus 100 of the embodiment inputs a high-resolution (720 dpi×720 dpi) image and performs the halftoning process at the input high resolution of 720 dpi×720 dpi with regard to the black/white edges of the input image representing the characters and symbols expressed by combinations of only white and black colors, while performing the halftoning process at the reduced resolution of 360 dpi×360 dpi with regard to the remaining background image. This halftoning process desirably saves the required memory capacity, compared with the conventional halftoning process at the high resolution over the whole image area.

The black/white edges representing the characters and symbols go through the halftoning process, while keeping the resolution of the input image. This ensures high-quality printing of the black/white edges. The background image is combined with the black/white edges after enhancement of its resolution to the original resolution (720 dpi×720 dpi). The printed image on the printing medium S accordingly has the identical resolution over the whole area. The background image a less number of edges than the characters and symbols. The reduced resolution of the background image in the course of the halftoning process hardly affects the picture quality of the resulting output image. Reduction of the resolution by averaging the tone values of four pixels may round the noise component and give the user the impression of the enhanced picture quality. The image processing of the embodiment thus gives the user the total impression of the enhanced picture quality.

The halftoning process of this embodiment encodes 8-bit each color tone value of CMYK image data into 5-bit quantization data with regard to the background image other than the black/white edges of an input image. This reduces the data volume by approximately 40%. The halftoning process of this embodiment binarizes and encodes 96-bit RGB data of four pixels (=4 pixels×8 bits×3 colors) to 5-bit black/white edge data including a black/white edge detection bit. This reduces the data volume for the black/white edges representing characters and symbols by approximately 85%.

According to the applicant's estimation, the halftoning process of this embodiment enables processing of image data at a high resolution of 720 dpi×720 dpi with only an approximately 20% increase of the memory capacity required for the halftoning process of image data at a standard resolution of 360 dpi×360 dpi. The simple halftoning of image data at the high resolution of 720 dpi×720 dpi without the processing of black/white edges and reduction of the resolution for the processing of the background image other than the black/white edges requires four times the memory capacity for halftoning of the image data at the standard resolution of 360 dpi×360 dpi. Namely the halftoning process of this embodiment significantly reduces the required memory capacity.

The procedure of this embodiment performs the halftoning process with reference to various tables including the quantization table QT, the first dot number table DT1, the second dot number table DT2, and the ordinal number matrix OM. The halftoning process of this embodiment basically determines the dot on-off state by simply referring to these tables. This arrangement requires neither the comparison between the threshold values and the tone values like the conventional systematic dither technique nor the distribution of errors arising in respective pixels to peripheral pixels like the conventional error diffusion technique, thus enabling the extremely higher-speed halftoning than the conventional techniques.

The printing apparatus 100 does not require dot creation for the white color image part. The procedure of the embodiment accordingly does not perform the halftoning process with regard to white pixels included in the black/white edges. This arrangement desirably enhances the total processing speed.

The printing apparatus 100 of this embodiment includes the main unit group of multiple main units connected in series to perform the preset series of image processing and the pass unit group of multiple pass units connected in series to be parallel with the multiple main units, as shown in FIGS. 5 and 10. The averaged data of the tone values of four pixels generated by the black/white edge processing unit 320 are sequentially transferred through the main unit group. The black/white edge data generated by the black/white edge processing unit 320 are sequentially transferred through the pass unit group, synchronously with transfer of the averaged data to the main unit group. The averaged data and the black/white edge data output synchronously from the respective unit groups enter the data selector 420 at the same timing. The data selector 420 selectively outputs one of the input averaged data and the input black/white edge data according to the setting of the black/white edge detection bit and accumulates the selectively output data into the encoded data buffer EB. The structure of this embodiment enables the averaged data and the black/white edge data to be readily processed by the different series of image processing. The averaged data and the black/white edge data are synchronously transferred respectively through the main unit group and through the pass unit group and enter the data selector 420 in their accurate transfer orders. This arrangement effectively prevents the earlier transfer of one data over the other data and does not require standby of next target data of processing before accumulation of the averaged data or the black/white edge data into the encoded data buffer EB. The averaged data and the black/white edge data can thus be successively transferred to the main unit group and to the pass unit group without the standby. This enhances the processing speed and thereby the total printing speed.

The printing apparatus 100 of this embodiment includes the main unit group of multiple main units connected in series to perform the preset series of image processing and the pass unit group of multiple pass units connected in series to be parallel with the multiple main units, as shown in FIGS. 5 and 10. The averaged data of the tone values of four pixels generated by the black/white edge processing unit 320 are sequentially transferred through the main unit group. The black/white edge data generated by the black/white edge processing unit 320 and the standard edge data and the noise data generated by the color conversion unit 330 are sequentially transferred through the pass unit group, synchronously with transfer of the averaged data to the main unit group. The edge data and the noise data transferred through the pass unit group enter the inner-block smoothing unit 380 to go through the smoothing process. In the printing apparatus 100 of this structure, auxiliary data (standard edge data and noise data) other than the averaged data as an object of image processing are transferred through the pass unit group, which is the different pathway of the main unit group that executes the diverse series of image processing. Namely the auxiliary data are not transferred together with the averaged data through the main unit group. This arrangement does not require significant change of the hardware configuration of the main units in response to a change in data structure or data volume of the auxiliary data. This enhances the versatility of the respective main units and facilitates the design change of the printing apparatus 100.

In the printing apparatus 100 of this embodiment, the auxiliary data used for imaging processing by a certain main unit is transferable to another main unit via the pass unit group. The auxiliary data is thus reused for image processing by another main unit. This arrangement does not require individual generation of the same auxiliary data commonly used for image processing by multiple main units. This desirably simplifies the hardware configuration and reduces the manufacturing cost.

In the structure of the embodiment, the number of pass units is equal to the number of main units. This facilitates synchronization of the transfer of the auxiliary data through the pass unit group with the transfer of the image data through the main unit group. The equal numbers of the pass units and the main units enables each pass unit to receive the auxiliary data from any main unit. This allows the flexible design of the main units constituting the main unit group.

E. Data Flow in Halftoning Circuit in 1×1 Mode

The signal line used in the 1×1 mode is shown by the broken line in FIG. 10. The 1×1 mode has both the input resolution and the output resolution of 360 dpi×360 dpi and does not include the processing of black/white edges that requires the resolution of 720 dpi×720 dpi. The halftoning process in the 1×1 mode is accordingly different from the halftoning process in the other modes.

As shown in FIG. 10, in the 1×1 mode, the encoder 410 encodes CMYK data input from the color conversion circuit 300 to 5-bit quantization data as in the other modes but directly outputs the quantization data to the decoder 430, instead of the data selector 420. The decoder 430 converts the quantization data input from the encoder 410 to 2-bit dot creation data with reference to the first dot number table DT1, the second dot number table DT2, and the ordinal number matrix OM. The generated dot creation data is accumulated through the EB control unit 440 into the encoded data buffer EB, instead of the dot creation data buffer DB. Namely the encoded data buffer EB has accumulation of either the 6-bit quantization data or the 6-bit black/white edge data in the other modes, while having accumulation of the 2-bit dot creation data in the 1×1 mode.

The dot creation data accumulated in the encoded data buffer EB is read by the data rearrangement unit 510 and is converted to the head-driving data. In the 1×1 mode, the dot creation data representing raster lines located between the nozzle pitch are skipped out (interlacing process) by the data rearrangement unit 510, instead of the decoder 430.

The halftoning-process in the 1×1 mode outputs the dot creation data to the data rearrangement unit 510 without using the data selector 420 and the dot creation data buffer DB. This enhances the printing speed and attains the speed-priority printing over the picture quality.

F. Creation of Black Data Table

The decoder 430 of the halftoning circuit 400 shown in FIG. 10 uses the black data table BT (see FIG. 28) to decode the black/white edge data. The black data table BT may be stored in advance in the ROM 153 and be loaded on the SDRAM 152 on a start of a printing process or on a start of the printing apparatus 100. The black data table BT, however, has an equivalent data volume to the ordinal number matrix OM and significantly consumes the storage area of the ROM 153. The printing apparatus 100 of this embodiment thus dynamically creates the black data table BT as described below.

Figure 30:
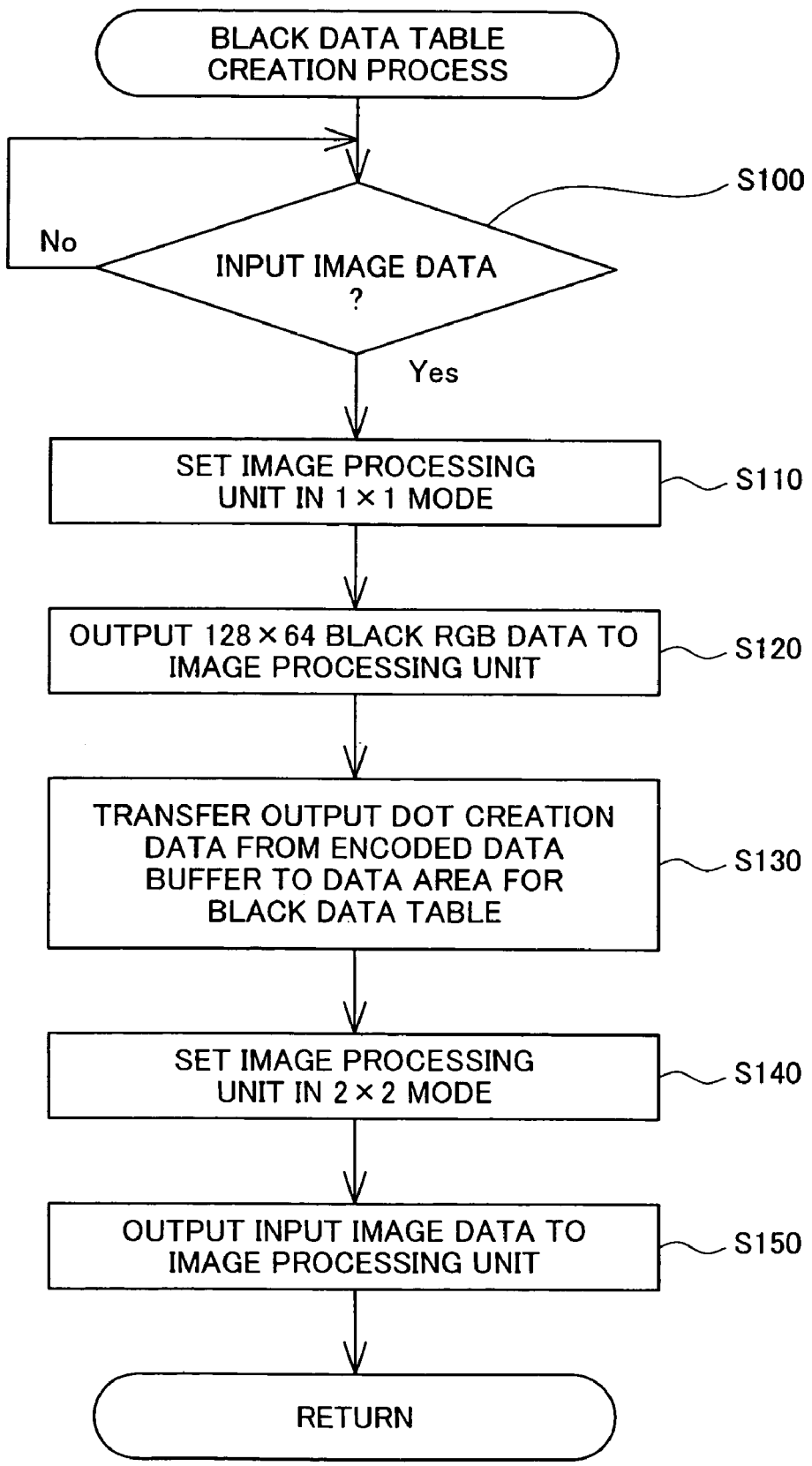
FIG. 30 is a flowchart showing a black data table creation process.

FIG. 30 is a flowchart showing a black data table creation process executed by the CPU 151 of the control unit 150. The CPU 151 inputs target RGB image data as an object of printing from the computer 900 or the scanner 110 (step S100) and sets the image processing unit 155 in the 1×1 mode (step S110), prior to the image processing of the input RGB image data. The CPU 151 subsequently outputs RGB image data of all black 128 pixels×64 pixels having the RGB value of (0,0, 0) to the image processing unit 155 (step S120). The 1×1 mode means 1-to-1 relation of the resolution of the input image to the resolution of the output image.

The image processing unit 155 receives the input RGB image data of 128 pixels×64 pixels and generates dot creation data of all black pixels having the size of 128×64 on the encoded data buffer EB in the SDRAM 152. The CPU 151 then transfers the generated dot creation data of all black pixels as a black data table BT to a specific area of the SDRAM 152 set for storage of the black data table BT (step S130).

After storage of the black data table BT in the specific area of the SDRAM 152, the CPU 151 sets the image processing unit 155 in the 2×2 mode (step S140) and outputs the RGB image data input at step S100 to the image processing unit 155 (step S150).

The black data table BT is created on the SDRAM 152 by simply outputting the RGB data of all black 128 pixels×64 pixels to the image processing unit 155. This arrangement has no requirement of storing the black data table BT in the ROM 153 and thus desirably saves the storage capacity of the ROM 153. The color conversion circuit 300 of the image processing unit 155 corrects the ink amounts and prevents the appearance of print fringes according to the characteristics of the printing apparatus 100. This ensures creation of the optimum black data table BT suitable for the characteristics of the printing apparatus 100 and enhances the picture quality of resulting output images.

The black data table creation process of this embodiment creates the black data table BT in response to every input of print data. The created black data table BT is thus suitable for the type of printing paper, the types of inks set in the printing apparatus 100, and the setting of the desired printing quality.

When creation of the black data table BT for the individual setting of each printing operation is not required, the processing of steps S110 to S130 in the flowchart of FIG. 30 may be executed on a start of the printing apparatus 100. Such modification does not require creation of the black data table BT at the time of every printing operation and thereby enhances the total printing speed.

G. Other Output Resolution Modes

The above description regards the diverse series of image processing performed by the printing apparatus 100 in the 2×2 mode.

<Identification of Block Numbers in Respective Modes>

Figure 31:
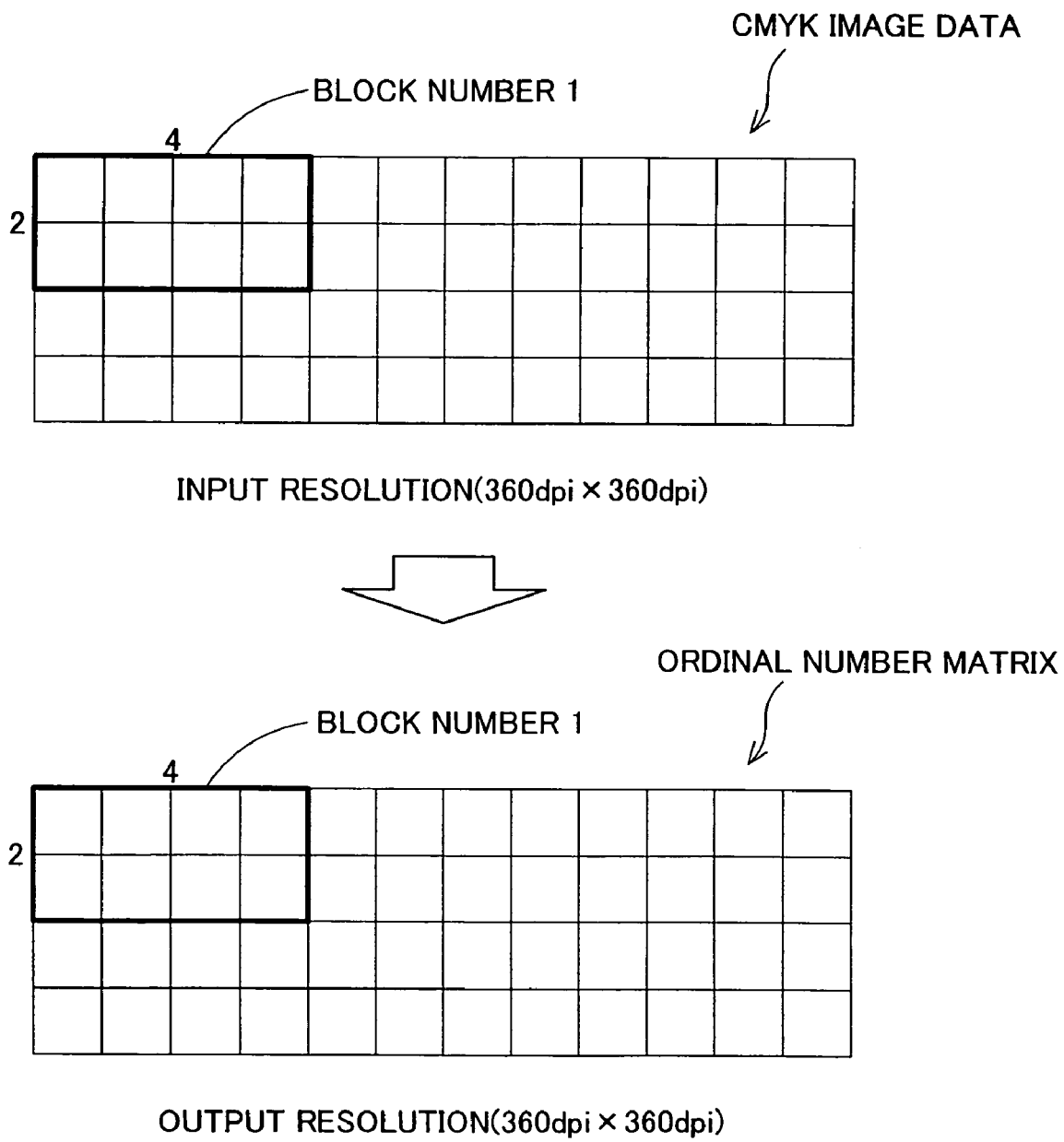
FIG. 31 shows identification of block numbers in a 1×1 mode.

FIG. 31 shows identification of the block numbers in the 1×1 mode. In the 1×1 mode, the resolution (360 dpi×360 dpi) of the CMYK image data input into the encoder 410 is identical with the resolution (360 dpi×360 dpi) of the output image data. The size of each 4×2 unit block having one block number in the ordinal number matrix OM is thus equivalent to the size of 4 pixels×2 pixels in the CMYK image data to be output in the 1×1 mode. The halftoning circuit 400 accordingly identifies the 4×2 pixels to have an identical block number.

Figure 32:
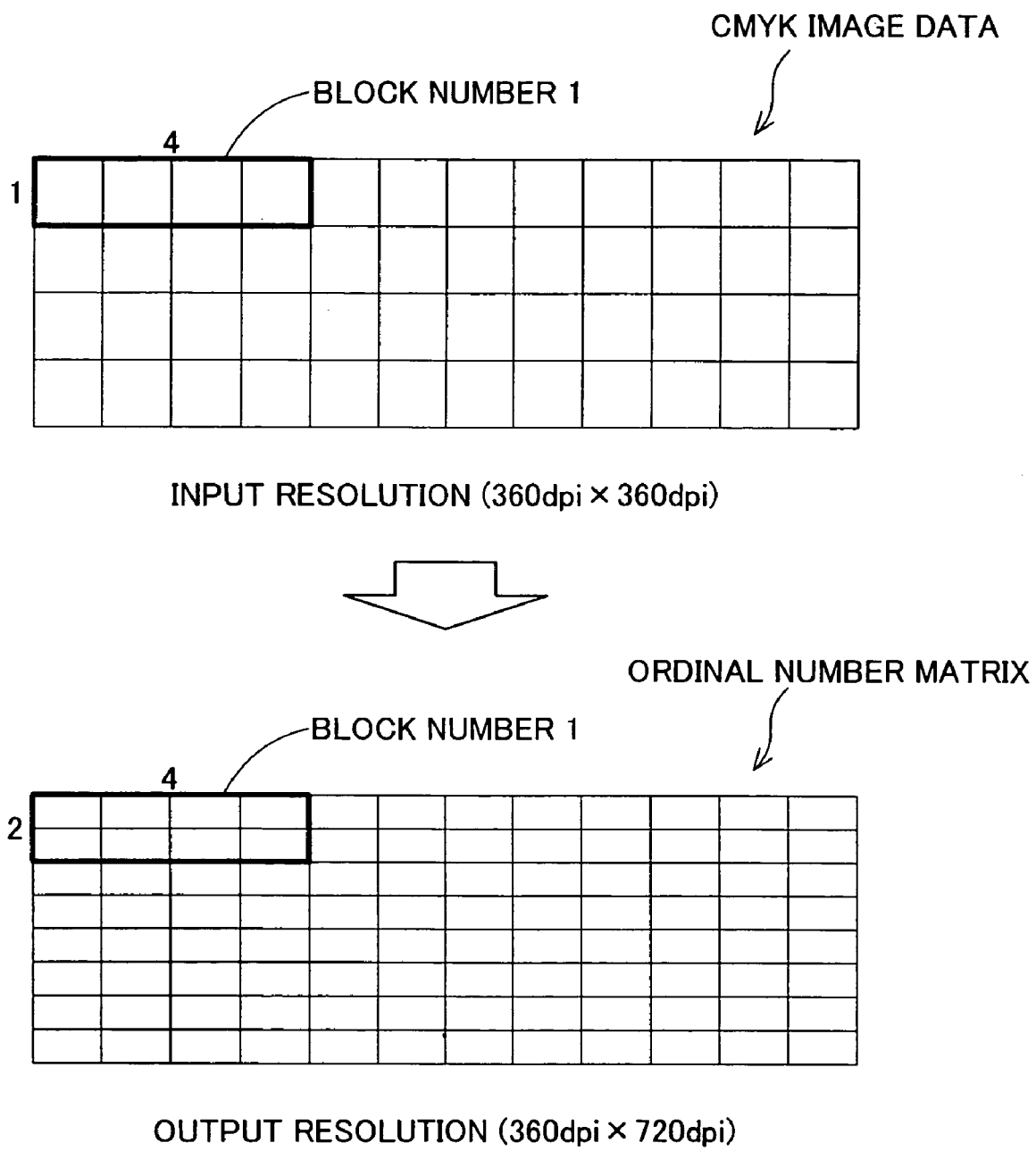
FIG. 32 shows identification of block numbers in a 1×2 mode.

FIG. 32 shows identification of the block numbers in the 1×2 mode. In the 1×2 mode, the resolution (360 dpi×360 dpi) of the CMYK image data input into the encoder 410 is doubled in the vertical direction to the resolution (360 dpi× 720 dpi) of the output image data. The size of each 4×2 unit block having one block number in the ordinal number matrix OM is thus equivalent to the size of 4 pixels×1 pixel in the CMYK image data to be output in the 1×2 mode. The halftoning circuit 400 accordingly identifies the 4×1 pixels to have an identical block number.

Figure 33:
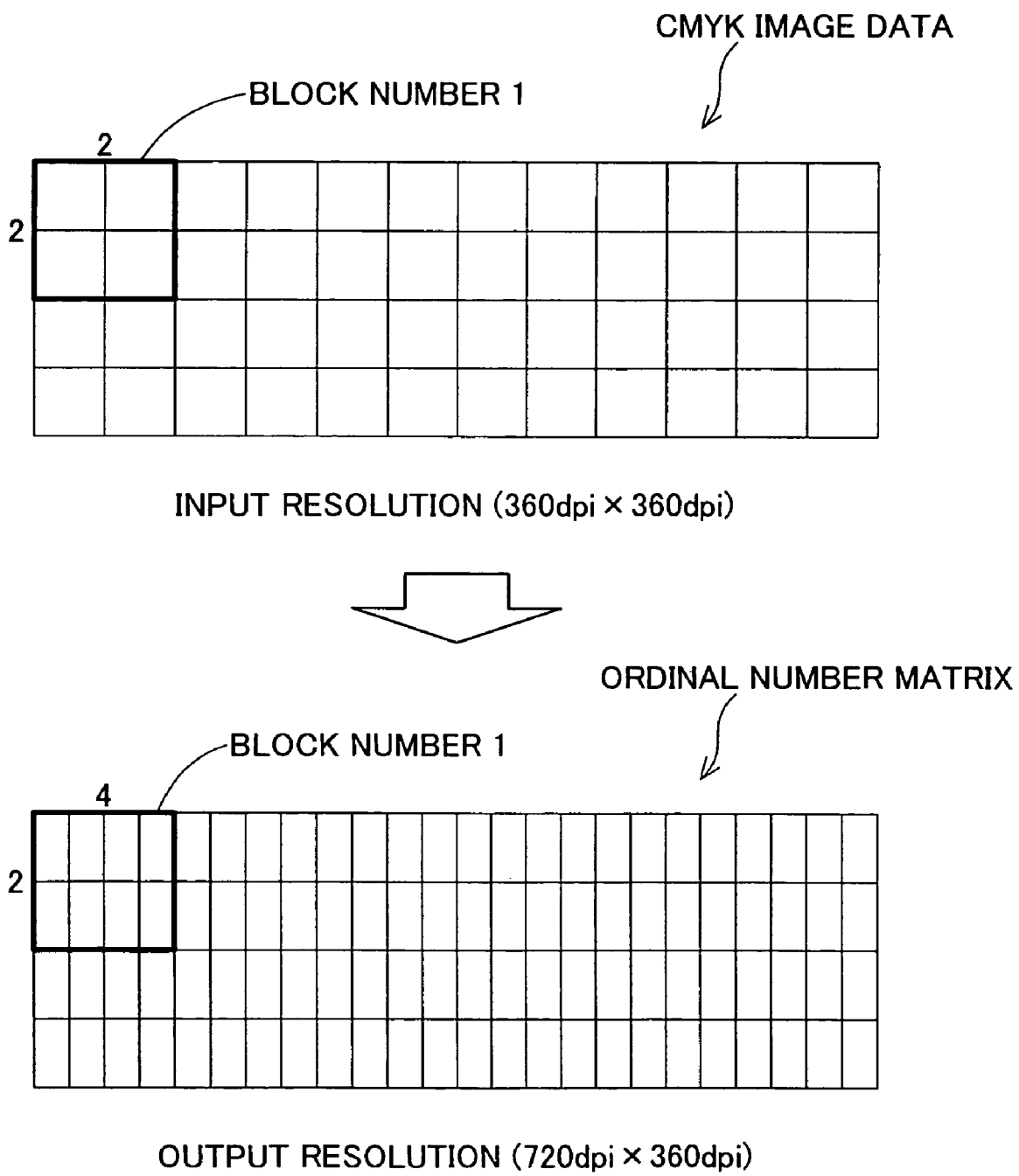
FIG. 33 shows identification of block numbers in a 2×1 mode.

FIG. 33 shows identification of the block numbers in the 2×1 mode. In the 2×1 mode, the resolution (360 dpi×360 dpi) of the CMYK image data input into the encoder 410 is doubled in the horizontal direction to the resolution (720 dpi×360 dpi) of the output image data. The size of each 4×2 unit block having one block number in the ordinal number matrix OM is thus equivalent to the size of 2 pixels×2 pixels in the CMYK image data to be output in the 2×1 mode. The halftoning circuit 400 accordingly identifies the 2×2 pixels to have an identical block number.

Figure 34:
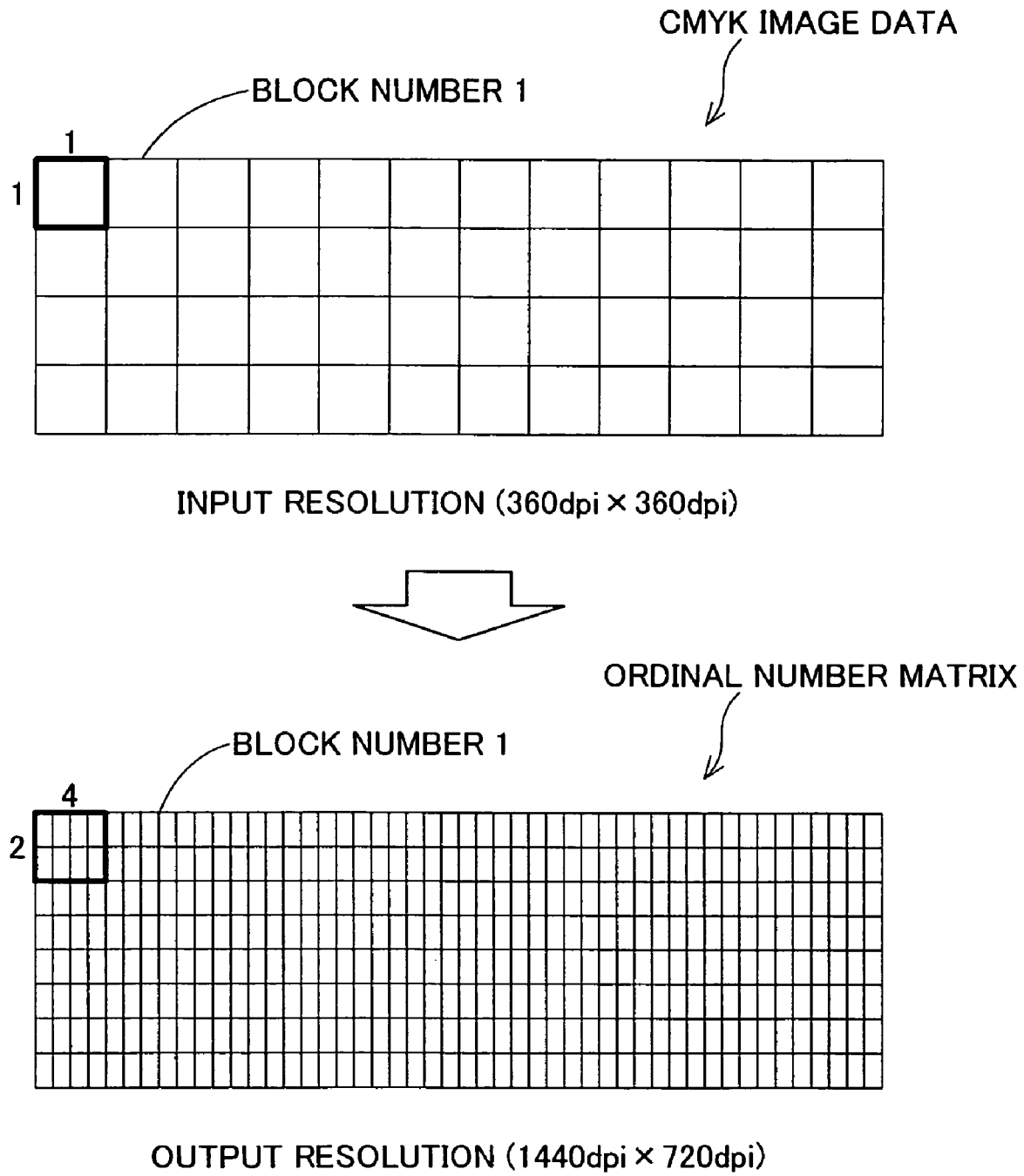
FIG. 34 shows identification of block numbers in a 4×2 mode.

FIG. 34 shows identification of the block numbers in the 4×2 mode. In the 4×2 mode, the resolution (360 dpi×360 dpi) of the CMYK image data input into the encoder 410 is quadruplicated in the horizontal direction and is doubled in the vertical direction to the resolution (1440 dpi×720 dpi) of the output image data. The size of each 4×2 unit block having one block number in the ordinal number matrix OM is thus equivalent to the size of 1 pixel×1 pixel in the CMYK image data to be output in the 4×2 mode. The halftoning circuit 400 accordingly identifies the 1×1 pixel to have an identical block number.

<Allocation of Intermediate Dot Data in Respective Modes>

As shown in FIG. 26, intermediate dot data of 4 pixels×2 pixels is generated from one quantization data, irrespective of the mode of the output resolution. One quantization data corresponds to one pixel of CMYK image data. Generation of intermediate dot data from all the quantization data accordingly converts the input resolution of 360 dpi×360 dpi to the output resolution of 1440 dpi×720 dpi. This output resolution is different from the expected output resolutions of the respective modes (except the 4×2 mode). The quantization data decoding circuit 433 in the decoder 430 thus adequately allocates the pixel divisions of the intermediate dot data corresponding to the mode of the output resolution, so as to adjust the output resolution.

<1×1 Mode>

Figure 35:
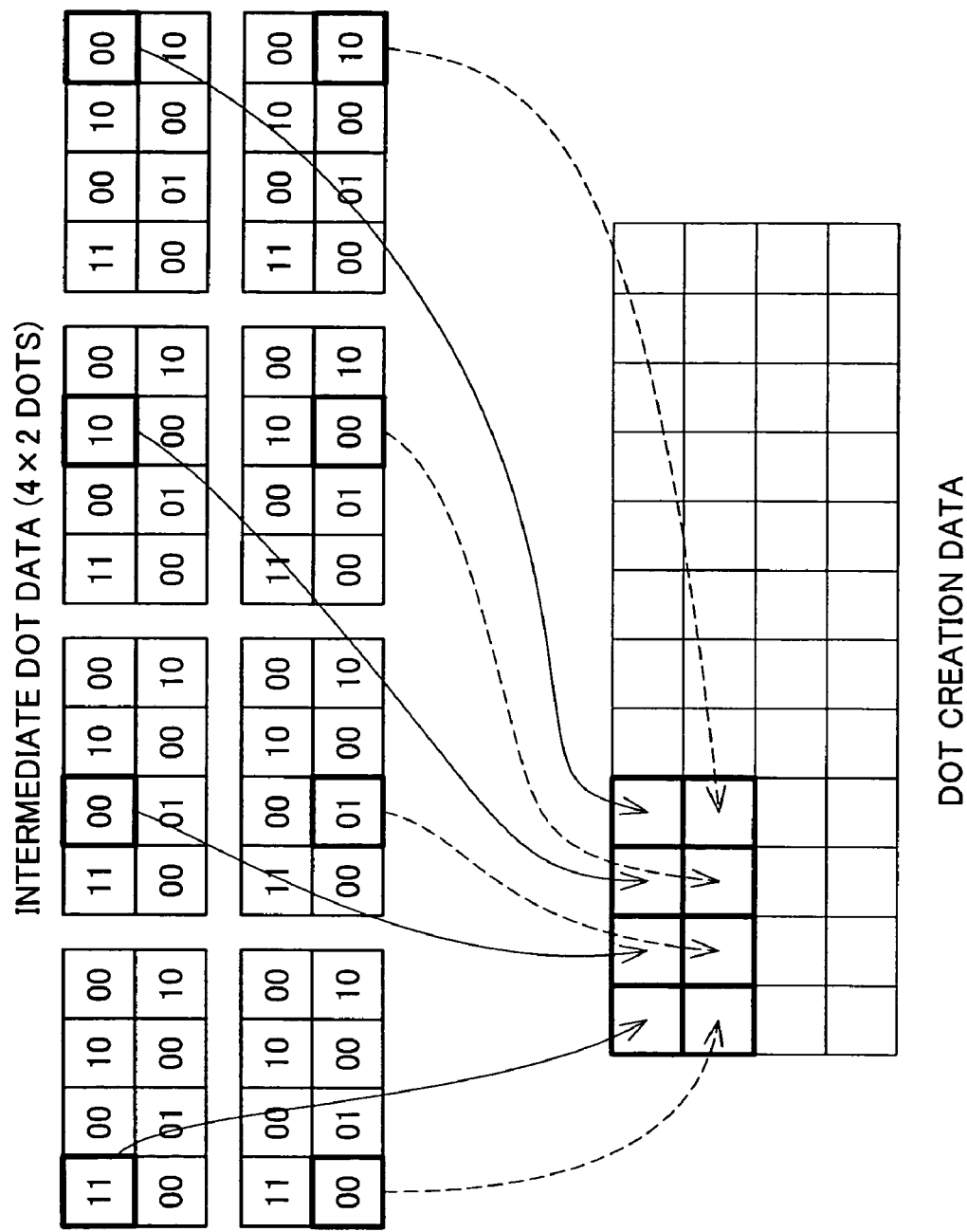
FIG. 35 shows allocation of intermediate dot data in the 1×1 mode.

FIG. 35 shows allocation of intermediate dot data in the 1×1 mode. As described above with reference to FIG. 31, the total 8 pixels (4 pixels×2 pixels) are identified to have an identical block number in the 1×1 mode. The allocation procedure of FIG. 35 extracts respective one pixels at different positions from the total 8 intermediate dot data, 4 in the horizontal direction and 2 in the vertical direction, generated from the 8 pixels to give dot creation data of 4 pixels×2 pixels. This converts the input resolution of 360 dpi×360 dpi to the expected output resolution of 360 dpi×360 dpi.

<1×2 Mode>

Figure 36:
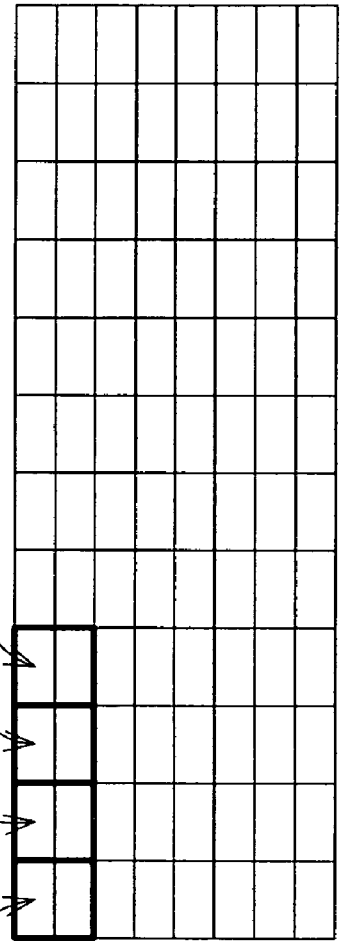
FIG. 36 shows allocation of intermediate dot data in the 1×2 mode.

FIG. 36 shows allocation of intermediate dot data in the 1×2 mode. As described above with reference to FIG. 32, the total 4 pixels (4 pixels×1 pixel) are identified to have an identical block number in the 1×2 mode. The allocation procedure of FIG. 36 extracts respective two adjacent pixels in the vertical direction at different positions from the total 4 intermediate dot data in the horizontal direction generated from the 4 pixels to give dot creation data of 4 pixels×2 pixels. This converts the input resolution of 360 dpi×360 dpi to the expected output resolution of 360 dpi×760 dpi.

<1×2 Mode>

Figure 37:
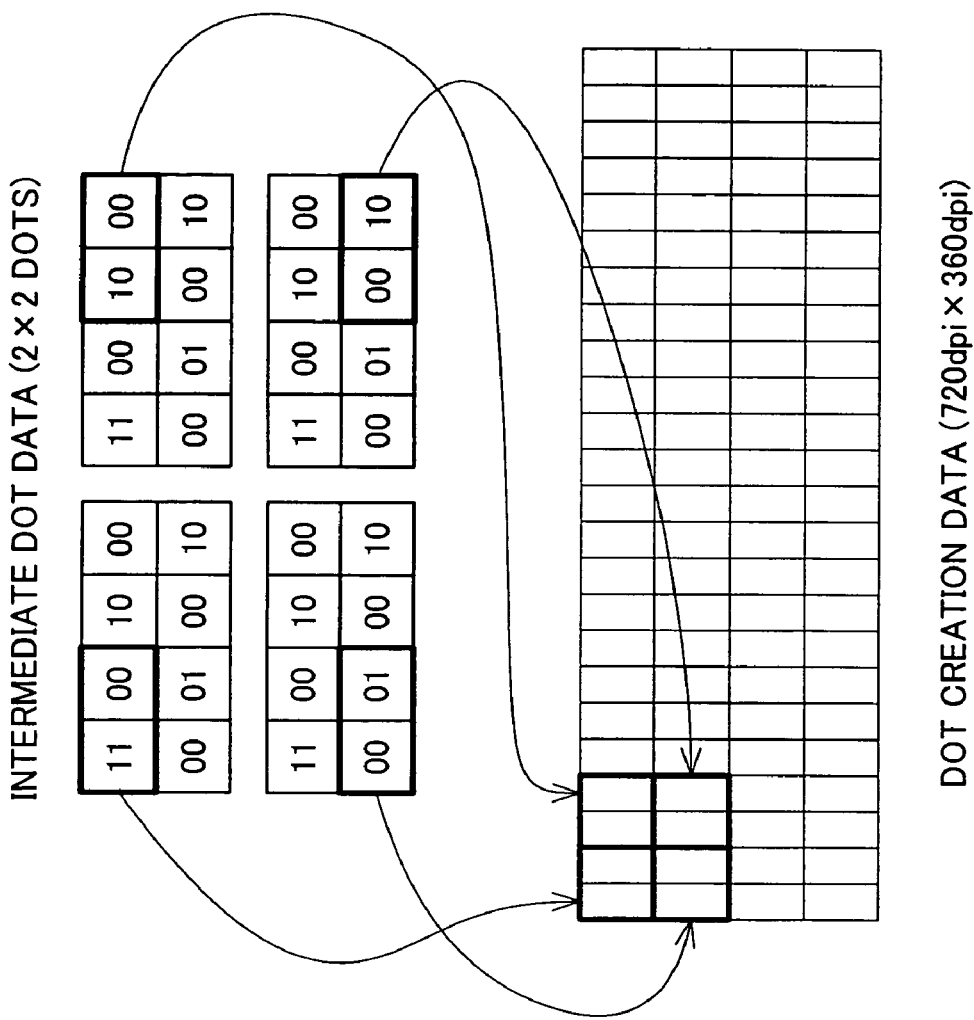
FIG. 37 shows allocation of intermediate dot data in the 2×1 mode.

FIG. 37 shows allocation of intermediate dot data in the 2×1 mode. As described above with reference to FIG. 33, the total 4 pixels (2 pixels×2 pixels) are identified to have an identical block number in the 2×1 mode. The allocation procedure of FIG. 37 extracts respective two adjacent pixels in the horizontal direction at different positions from the total 4 intermediate dot data, 2 in the horizontal direction and 2 in the vertical direction, generated from the 4 pixels to give dot creation data of 4 pixels×2 pixels. This converts the input resolution of 360 dpi×360 dpi to the expected output resolution of 720 dpi×360 dpi.

<4×2 Mode>

FIG. 38 shows allocation of intermediate dot data in the 4×2 mode. As described above with reference to FIG. 34, every 1 pixel is identified to have one block number in the 4×2 mode. The allocation procedure of FIG. 38 extracts all the pixels from the 1 intermediate dot data generated from the 1 pixel to give dot creation data of 4 pixels×2 pixels. This converts the input resolution of 360 dpi×360 dpi to the expected output resolution of 1440 dpi×760 dpi.

<Other Modes>

There are other modes of the output resolution, that is, 2×4 mode having the output resolution of 720 dpi×1440 dpi and 4×4 mode having the output resolution of 1440 dpi×1440 dpi. The first dot number data DT1 of FIG. 22 and the second dot number data DT2 of FIG. 23 have different contents in these modes, and the different techniques are adopted for the halftoning process in these modes. The details of these modes are not described in the specification hereof.

H. Modifications

The embodiment discussed above is to be considered in all aspects as illustrative and not restrictive. There may be many modifications, changes, and alterations without departing from the scope or spirit of the main characteristics of the present invention. For example, the functions of the hardware elements may be attained by the software configuration by execution of preset programs by the CPU 151. Some examples of other possible modification are given below.

(H-1) MODIFIED EXAMPLE 1

In the structure of the embodiment, the printing apparatus 100 alone performs the color conversion and encoding and decoding of the quantization data. In one modified structure, the devices located before the encoded data buffer EB, that is, the color conversion circuit 300, the encoder 410, and the data selector 420, may be incorporated in a different apparatus from the printing apparatus 100. The printing apparatus 100 and the different apparatus are interconnected by a predetermined communication path. A typical example of the different apparatus is the computer 900. In this modified structure, for example, a printer driver stored in the computer 900 executes the functions of the color conversion circuit 300, the encoder 410, and the data selector 420 by the software configuration. Such modification relieves the processing load of the printing apparatus 100. The quantization data encoded by the encoder 410 and the black/white edge data encoded by the black/white edge processing unit 320 have drastically reduced data volume relative to the original RGB data. This arrangement thus desirably saves the volume of the communication data.

(H-2) MODIFIED EXAMPLE 2

In the above embodiment, the ordinal number matrix has the size of 128×64. The ordinal number matrix is, however, not restricted to this size but may have a greater size (for example, 512×256). The ordinal number matrix of the greater size enables the efficient halftoning of input image data in larger size.

Figure 39:
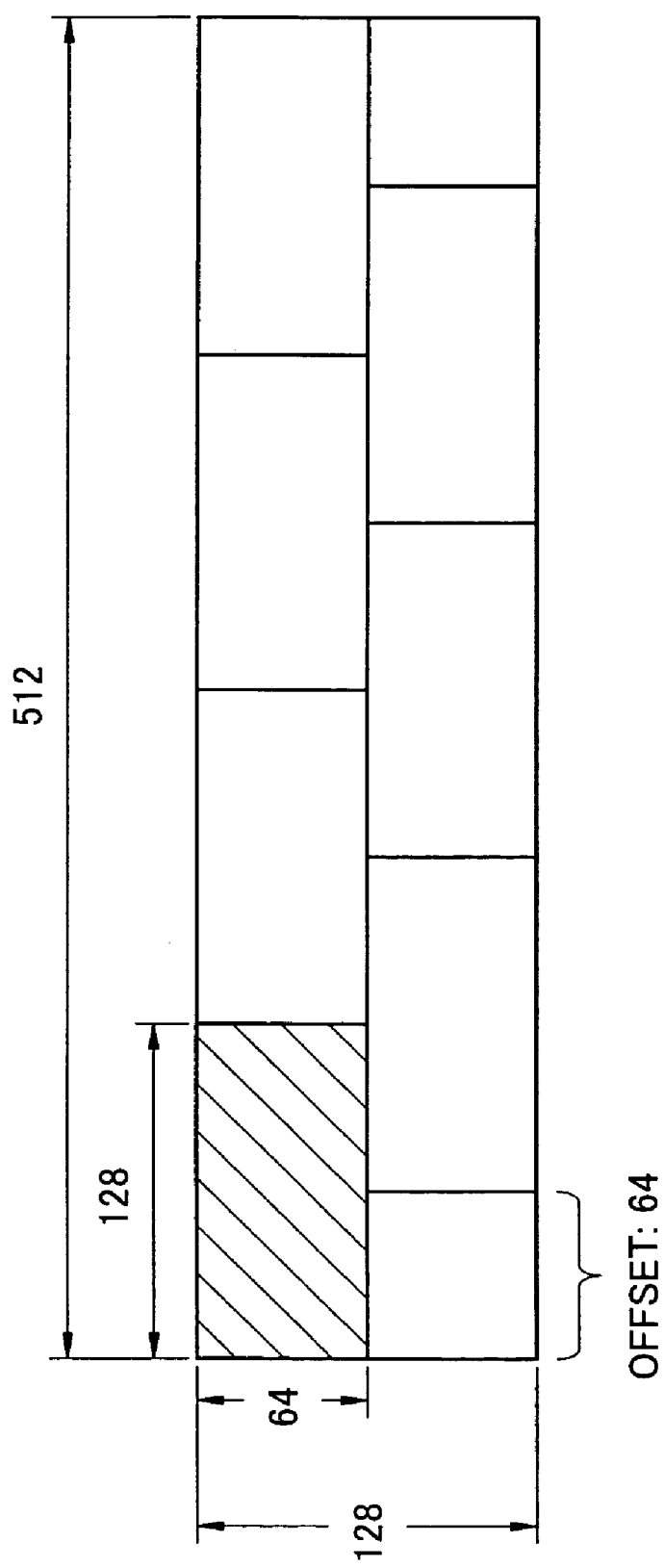
FIG. 39 shows one example of 512×256 ordinal number matrix.
Figure 40:
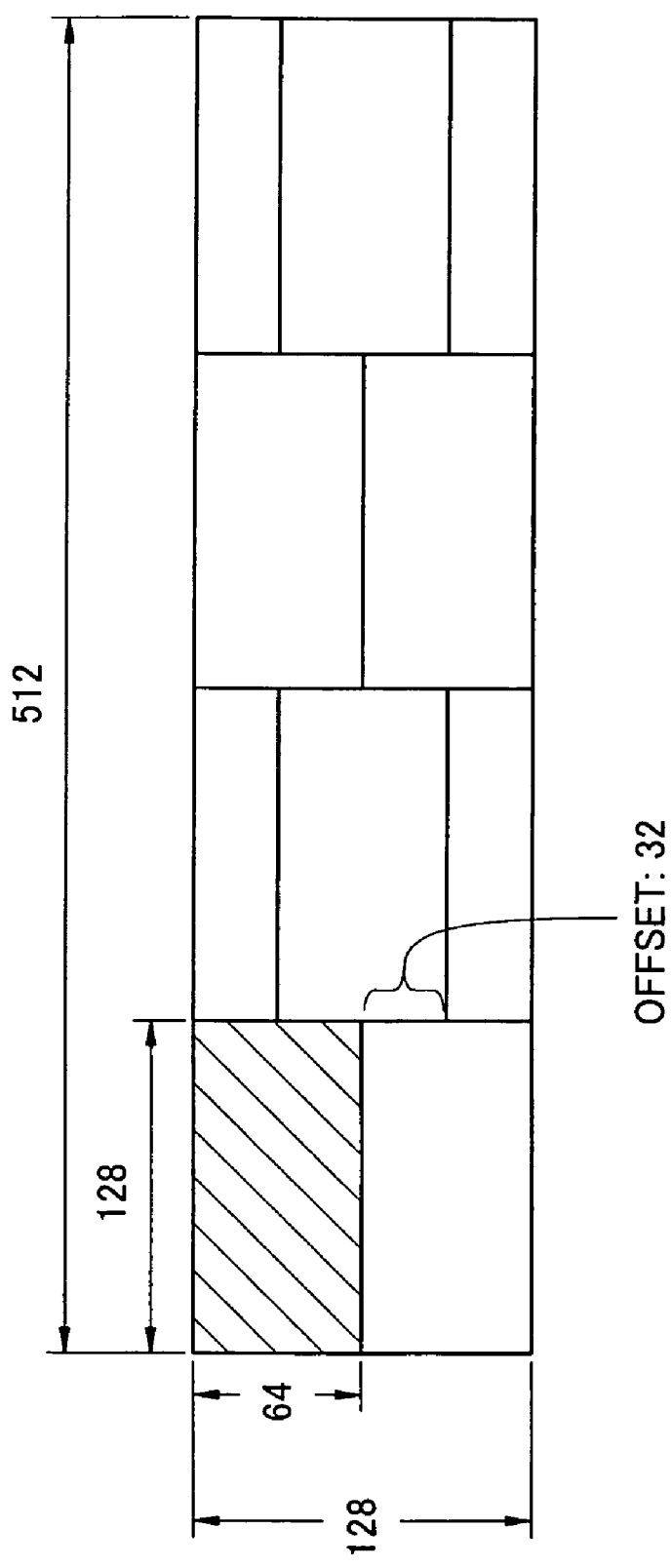
FIG. 40 shows another example of 512×256 ordinal number matrix.

FIGS. 39 and 40 show examples of the 512×256 ordinal number matrix. The 512×256 ordinal number matrix of FIG. 39 is obtained by repeatedly allocating the 128×64 ordinal number matrix (hatched rectangle) of the embodiment with an offset of 64 pixels in the horizontal direction. The 512×256 ordinal number matrix of FIG. 40 is obtained by repeatedly allocating the 128×64 ordinal number matrix of the embodiment with an offset of 32 pixels in the vertical direction. The repeated application of the ordinal number matrix in the general size readily gives the ordinal number matrix in the greater size.

The ordinal number matrix in the greater size may be wholly stored in the ROM 153. In one preferable application, the ordinal number matrix in the general 128×64 size is stored in the ROM 153. On a start of the printing apparatus 100, the CPU 151 loads the stored ordinal number matrix in the general size, repeatedly allocates the ordinal number matrix in the general size to prepare the ordinal number matrix in the greater size shown in FIG. 39 or FIG. 40, and extends the ordinal number matrix in the greater size on the SDRAM 152. This application desirably saves the storage capacity in the ROM 153. The black data table BT should be expanded to the greater size corresponding to the ordinal number matrix in the greater size.

(H-3) MODIFIED EXAMPLE 3

The halftoning process of the embodiment keeps the high resolution with regard to the image part consisting of only black and white colors. The color combination for the high-resolution halftoning is not restricted to black and white but may be, for example, blue and white or green and white. The user may specify a desired color combination through the operation of the computer 900 or the operation panel 140. This arrangement enables characters and symbols expressed by any desired color other than black to be printed at the high resolution. When the user specifies a desired color for the characters and symbols, the black data table BT is replaced by the user's specified color data table. The user's specified color data table is readily creatable according to the black data table creation process described previously.

(H-4) MODIFIED EXAMPLE 4

The image processing of the embodiment regards the mode having the input resolution of 720 dpi×720 dpi and the output resolution of 720 dpi×720 dpi. The input resolution and the output resolution are not restricted to this value but may be 600 dpi×600 dpi, 1200 dpi×1200 dpi, or 1440 dpi×1440 dpi.

(H-5) MODIFIED EXAMPLE 5

In the structure of the embodiment, each pass unit has the function of sequentially transferring data, such as the black/white edge data. Each pass unit may be modified to have the additional function of processing the black/white edge data and the other data by a preset series of image processing prior to the transfer. The preset series of image processing may convert the resolution of the black/white edge data to a higher resolution or converting the color of black or white pixels expressed by the black/white edge data into another color. Such image processing should be completed by a pass unit within a time of image processing executed by a main unit corresponding to the pass unit. This arrangement does not delay the data transfer by the main unit and ensures adequate synchronization of the data transfer.

(H-6) MODIFIED EXAMPLE 6

In the structure of the embodiment, the number of pass units included in the color conversion circuit 300 and the halftoning circuit 400 is equal to the number of the corresponding main units. The number of pass units may, however, be reduced to be less than the number of the corresponding main units.

Figure 41A:
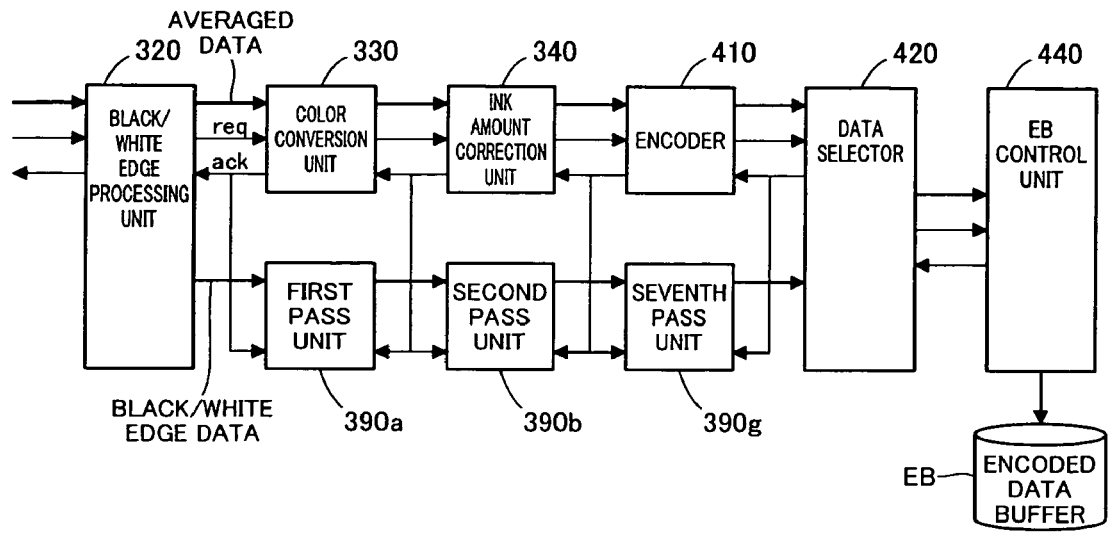
FIGS. 41A and 41B show comparison between the configuration of pass units in the embodiment and the configuration of pass units in one modified example.
Figure 41B:
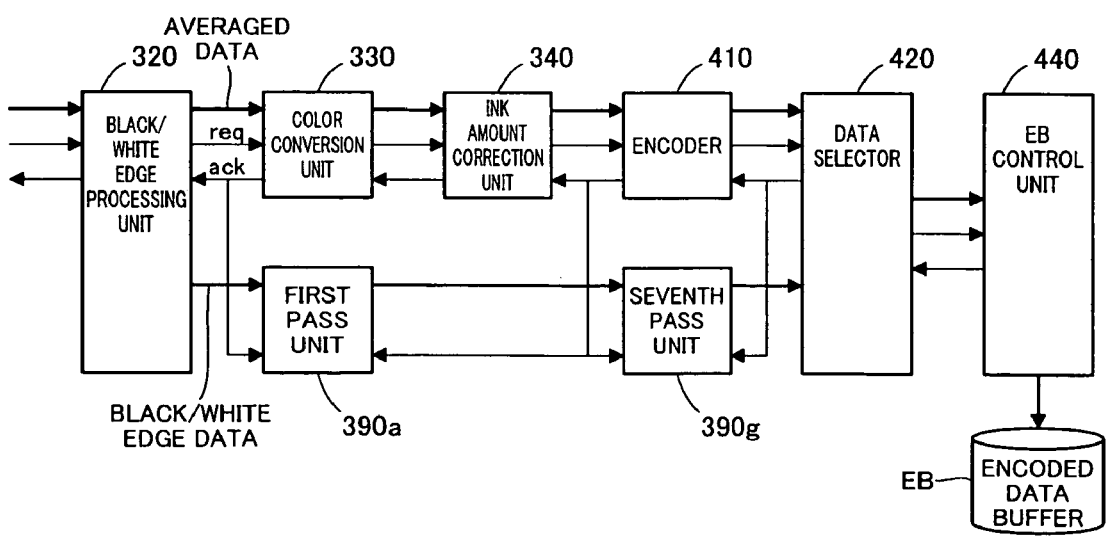

FIGS. 41A and 41B show comparison between the configuration of pass units in the embodiment and the configuration of pass units in one modified example. FIG. 41A shows the configuration of pass units in the embodiment, and FIG. 41B shows the configuration of pass units in the modified example. For the matter of convenience, part of the main units shown in the embodiment is omitted from the illustrations. As shown in FIG. 41A, the printing apparatus 100 of the embodiment has the same number of pass units as the number of main units. As shown in FIG. 41B, on the other hand, the printing apparatus of the modified example has the less number of pass units than the number of main units.

In the modified example, the 'ack' signal output from the encoder 410 to the ink amount correction unit 340 on the previous stage is branched into the output terminal of the first pass unit 390a and the input terminal of the seventh pass unit 390g. The black/white edge data is accordingly transferred from the first pass unit 390a to the seventh pass unit 390g at the transfer timing of the averaged data from the ink amount correction unit 340 to the encoder 410. This arrangement ensures the adequate synchronization in transfer of the averaged data with synchronization of the black/white edge data even when the number of the pass units is different from the number of the main units. In the modified example of FIG. 41B, the FIFO memories of the first pass unit 390a have a greater memory capacity for storage of at least the data accumulated by the color conversion unit 330 and the ink amount correction unit 340.

(H-7) MODIFIED EXAMPLE 7

Figure 42:
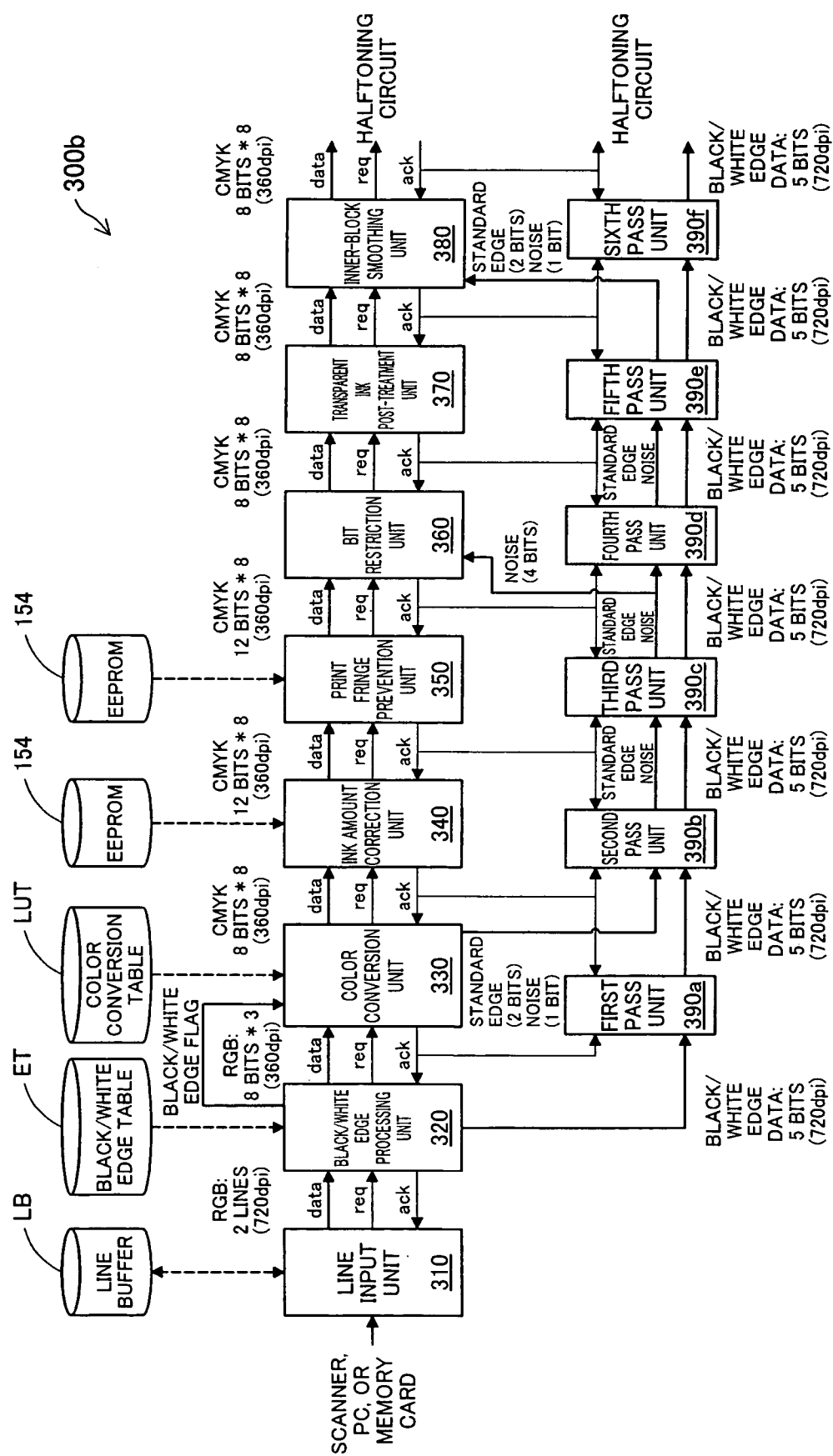
FIG. 42 illustrates one modified structure of the color conversion circuit 300.

FIG. 42 shows one modified structure of the color conversion circuit 300. In the structure of the embodiment, the standard edge data and the noise data output from the color conversion unit 330 are transferred through the pass unit group and enters the inner-block smoothing unit 380. In the structure of the modified example, a color conversion circuit 300*b* supplies the noise data to the bit reduction unit 360 as well as to the inner-block smoothing unit 380. The bit reduction unit 360 accordingly does not require an internal circuit for generating the noise for bit reduction. This desirably reduces the manufacturing cost. As described previously with regard to the embodiment, the bit reduction unit 360 uses the 4-bit noise. In one application, the color conversion unit 330 may generate 5-bit noise data and transfer 4 bits of the 5-bit noise data to the bit reduction unit 360 and the remaining 1 bit of the 5-bit noise data to the inner-block smoothing unit 380.

The various modifications of the image output apparatus of the invention have been described above. The image output apparatus may have diversity of other applications and modifications as described below. In one preferable embodiment, the image output apparatus may additionally have a data storage module that receives the dot creation data from the processing module and temporarily stores the dot creation data for creation of dots on the printing medium.

In one preferable application of the image output apparatus, the pass unit group includes an equal number of the multiple pass units to a number of the multiple image processing units.

This arrangement facilitates synchronization in transfer of the second intermediate data through the pass unit group with transfer of the first intermediate data through the image processing unit group.

In one preferable embodiment of the image output apparatus, one image processing unit as a transfer source of the first intermediate data sends a request signal representing requirement of data reception to another image processing unit as a transfer destination of the first intermediate data. The another image processing unit receives the first intermediate data transferred from the one image processing unit in response to the request signal and, on completion of reception of the first intermediate data, sends back a confirmation signal representing completion of the data reception to the one image processing unit to complete the transfer of the first intermediate data.

In the image output apparatus of this arrangement, each image processing unit executes a required series of image processing and sequentially transfers the first intermediate data with high efficiency In one preferable application of the image output apparatus of this embodiment, one pass unit receives a branch of the confirmation signal sent from an image processing unit corresponding to the one pass unit to another image processing unit as a transfer source of the first intermediate data and, in response to input of the confirmation signal, receives the second intermediate data from another pass unit as a transfer source of the second intermediate data.

The one pass unit receives a branch of the confirmation signal sent from still another image processing unit as a transfer destination of the first intermediate data to the image processing unit corresponding to the one pass unit as a transfer source of the first intermediate data and, in response to input of the confirmation signal, outputs the second intermediate data to still another pass unit as a transfer destination of the second intermediate data to transfer the second intermediate data synchronously with transfer of the first intermediate data through the image processing units.

In the image output apparatus of this arrangement, each pass unit adequately transfers the second intermediate data in response to the signal used for transfer of the first intermediate data from each image processing unit. This simple structure enables synchronization in transfer of the second intermediate data with transfer of the first intermediate data.

In one preferable embodiment of the image output apparatus with the intermediate data generation unit, the intermediate data generation unit averages pixel values of the preset number of plural pixels included in the unit pixel group and generates data of a reduced resolution than a resolution of the unit pixel group, as the first intermediate data.

The data of the reduced resolution than the resolution of the input image data is generated as the first intermediate data. This arrangement enhances the speed of image processing executed by each image processing unit.

In another preferable embodiment of the image output apparatus with the intermediate data generation unit, the intermediate data generation unit has: a detection module that detects either presence or absence of an edge in the unit pixel group; and a data generation module that, in response to detection of the presence of an edge by the detection module, generates data of an edge state as the second intermediate data.

The image output apparatus of this arrangement performs the series of image processing at the high input resolution with regard to a characteristic image part including an edge, for example, characters and symbols, while performing the series of image processing at the reduced resolution with regard to a remaining image part.

In one preferable application of the image output apparatus of this embodiment, the detection module of the intermediate data generation unit detects the presence of an edge when the unit pixel group consists of white pixels and black pixels.

The presence or the absence of an edge is readily detected by the simple determination of whether the unit pixel group consists of white pixels and black pixels. A most character image part of image data representing a business document is expressed by black and white colors. This arrangement enables efficient extraction of the character image part from the image data and processes the extracted character image part by a different series of image processing from the series of image processing executed for a residual image part.

In the image output apparatus of this application, the data generation module of the intermediate data generation unit may generate binary data of the unit pixel group according to an arrangement of the white pixels and the black pixels in the unit pixel group, as the data of the edge state. This arrangement significantly reduces the data volume of the second intermediate data.

In another preferable application of the image output apparatus of the above embodiment, the data generation module of the intermediate data generation unit, in response to detection of the absence of an edge by the detection module, generates specific dummy data, as the second intermediate data.

When the unit pixel group does not include an edge, the dummy data is transferred to the pass unit group. This arrangement ensures adequate synchronization of the data transfer through the image processing unit group with the data transfer through the pass unit group.

In still another preferable application of the image output apparatus of the above embodiment, the intermediate data generation unit generates an identifier, which specifies priority of either the first intermediate data or the second intermediate data, corresponding to the presence or the absence of an edge and outputs the generated identifier with the second intermediate data to the pass unit group.

In the image output apparatus of this application, the data selector may input the second intermediate data with the identifier and select one of the first intermediate data and the second intermediate data according to the input identifier.

This arrangement enables easy selection between the first intermediate data and the second intermediate data to be stored in the data storage module.

In one preferable embodiment of the image output apparatus, each pass unit includes FIFO memories at preset number of stages.

When one image processing unit receives a preset number of multiple first intermediate data and processes the multiple first intermediate data by a series of image processing, this arrangement enables accumulation of the same preset number of multiple second intermediate data in one pass unit. This arrangement thus enables adequate synchronization in transfer of the first intermediate data with transfer of the second intermediate data.

In another preferable embodiment of the image output apparatus with the intermediate data generation unit, the output image generation module performs different series of halftoning individually for the first intermediate data and the second intermediate data stored in the data storage module to generate the output image.

Execution of the different series of halftoning according to the respective characteristics of the first intermediate data and the second intermediate data to generate the output image desirably enhances the picture quality of the output image.

In one preferable embodiment of the image output apparatus with the first image processing unit and the second image processing unit, the first image processing unit has a random digit generation module that generates random digit data as the auxiliary data, and the second image processing unit has a smoothing module that uses the random digit data to smooth the image data.

In the image output apparatus of this embodiment, the random digit data used for imaging processing by the first image processing unit is transferable to the second image processing unit. The random digit data is reused in the second image processing unit to smooth the image data. Smoothing the sums of the random digit data and the respective pixel values effectively prevents consecutive pixels from having an identical pixel value in the image data. This arrangement desirably enhances the picture quality of a natural image expressed by such image data.

In the image output apparatus of this embodiment, the first image processing unit further has an edge data generation module that generates edge data, which represents a differential degree between pixel values of adjacent pixels, as the auxiliary data, and the smoothing module of the second image processing unit smoothes the pixel values of the adjacent pixels with the random digit data according to the differential degree of the pixel values represented by the edge data.

The pixel values are smoothed according to the differential degree between the pixel values of the adjacent pixels. For example, when the adjacent pixels have significantly different pixel values, the smoothing process is not performed to prevent a decrease in clearance of a resulting output image. When the adjacent pixels have significantly close pixel values, on the other hand, the smoothing process is performed to reduce a noise component and enhance the picture quality of a resulting output image.

In one preferable application of the image output apparatus of this embodiment, one image processing unit as a transfer source of the first intermediate data sends a request signal representing requirement of data reception to another image processing unit as a transfer destination of the first intermediate data. The another image processing unit receives the first intermediate data transferred from the one image processing unit in response to the request signal and, on completion of reception of the first intermediate data, sends back a confirmation signal representing completion of the data reception to the one image processing unit to complete the transfer of the first intermediate data.

In the image output apparatus of this arrangement, each image processing unit executes a required series of image processing and sequentially transfers the first intermediate data with high efficiency In another preferable application of the image output apparatus of this embodiment, one pass unit receives a branch of the confirmation signal sent from an image processing unit corresponding to the one pass unit to another image processing unit as a transfer source of the first intermediate data and, in response to input of the confirmation signal, receives the second intermediate data from another pass unit as a transfer source of the second intermediate data.

The one pass unit receives a branch of the confirmation signal sent from still another image processing unit as a transfer destination of the first intermediate data to the image processing unit corresponding to the one pass unit as a transfer source of the first intermediate data and, in response to input of the confirmation signal, outputs the second intermediate data to still another pass unit as a transfer destination of the second intermediate data to transfer the second intermediate data synchronously with transfer of the first intermediate data through the image processing units.

In the image output apparatus of this arrangement, each pass unit adequately transfers the second intermediate data in response to the signal used for transfer of the first intermediate data from each image processing unit. This simple structure enables synchronization in transfer of the second intermediate data with transfer of the first intermediate data.

In still another preferable application of the image output apparatus of this embodiment, the pass unit group includes an equal number of the multiple pass units to a number of the multiple image processing units.

This arrangement facilitates synchronization in transfer of the second intermediate data through the pass unit group with transfer of the first intermediate data through the image processing unit group. When the image processing unit group and the pass unit group have the same numbers of the image processing units and the pass units, each pass unit can input the second intermediate data from any image processing unit. This arrangement enables flexible design change of the image processing unit group.

In another preferable application of the image output apparatus of this embodiment, each pass unit includes FIFO memories at preset number of stages.

When one image processing unit receives a preset number of multiple first intermediate data and processes the multiple first intermediate data by a series of image processing, this arrangement enables accumulation of the same preset number of multiple second intermediate data in one pass unit. This arrangement thus enables adequate synchronization in transfer of the first intermediate data with transfer of the second intermediate data.

What is claimed is:

1. An image output apparatus that makes input image data subjected to a preset series of image processing and outputs processed image data, comprising:

an image processing unit group including multiple image processing units that are connected in series to process first intermediate data of average RGB values of a plurality of pixels based on the input image data by respective series of image processing and sequentially transfer the processed first intermediate data through the multiple image processing units in the image processing unit group;

a pass unit group including multiple pass units that are connected in series to receive second intermediate data representing a black and white edge pattern and sequentially transfer the second intermediate data synchronously with transfer of the first intermediate data through the multiple image processing units;

an intermediate data generation unit that divides the input image data into at least one unit pixel group including a preset number of plural pixels, generates the first intermediate data and the second intermediate data according to a characteristic of the unit pixel group, generating an edge detection flag if the unit pixel group is from a black and white edge pattern, and outputs the generated first intermediate data to a first image processing unit on a first stage of the image processing unit group, while outputting the generated second intermediate data to a first pass unit on a first stage of the pass unit group;

a data selector that inputs both the first intermediate data that has gone through the respective series of image processing by the image processing unit group and the second intermediate data that has been sequentially transferred through the pass unit group and selects one of the input first and second intermediate data based on whether the edge detection flag is set;

a data storage module that stores the intermediate data selected by the data selector; and an output image generation module that generates an output image, based on at least either of outputs from the image processing unit group and from the pass unit group;

wherein the intermediate data generation unit has a detection module that detects either presence or absence of an edge in the unit pixel group and a data generation module that, in response to detection of the presence of an edge by the detection module, generates the second intermediate data representing a black and white edge pattern; and the data generation module of the intermediate data generation unit, in response to detection of the absence of an edge by the detection module, generates specific dummy data, as the second intermediate data;

the output image generation module uses the intermediate data stored in the data storage module to generate the output image; and the output image generation module individually performs a different halftoning process for each of the processed first intermediate data which is output from the image processing unit group and the second intermediate data which is output from the pass unit group, so as to generate the output image.

2. An image output apparatus that makes input image data subjected to a preset series of image processing and outputs processed image data, comprising:

an image processing unit group including multiple image processing units that are connected in series to process first intermediate data of average RGB values of a plurality of pixels based on the input image data by respective series of image processing and sequentially transfer the processed first intermediate data through the multiple image processing units in the image processing unit group;

a pass unit group including multiple pass units that are connected in series to receive second intermediate data representing a black and white edge pattern and sequentially transfer the second intermediate data synchronously with transfer of the first intermediate data through the multiple image processing units;

an intermediate data generation unit that divides the input image data into at least one unit pixel group including a preset number of plural pixels, generates the first intermediate data and the second intermediate data according to a characteristic of the unit pixel group, generating an edge detection flag if the unit pixel group is from a black and white edge pattern, and outputs the generated first intermediate data to a first image processing unit on a first stage of the image processing unit group, while outputting the generated second intermediate data to a first pass unit on a first stage of the pass unit group;

a data selector that inputs both the first intermediate data that has gone through the respective series of image processing by the image processing unit group and the second intermediate data that has been sequentially transferred through the pass unit group and selects one of the input first and second intermediate data based on whether the edge detection flag is set;

a data storage module that stores the intermediate data selected by the data selector; and an output image generation module that generates an output image, based on at least either of outputs from the image processing unit group and from the pass unit group;

wherein the intermediate data generation unit has a detection module that detects either presence or absence of an edge in the unit pixel group and a data generation module that, in response to detection of the presence of an edge by the detection module, generates the second intermediate data representing a black and white edge pattern;

the intermediate data generation unit outputs the generated edge detection flag with the second intermediate data to the pass unit group;

the output image generation module uses the intermediate data stored in the data storage module to generate the output image; and the output image generation module individually performs a different halftoning process for each of the processed first intermediate data which is output from the image processing unit group and the second intermediate data which is output from the pass unit group, so as to generate the output image.

3. An image output apparatus that makes input image data subjected to a preset series of image processing and outputs processed image data, comprising:

an image processing unit group including multiple image processing units that are connected in series to process first intermediate data of average RGB values of a plurality of pixels based on the input image data by respective series of image processing and sequentially transfer the processed first intermediate data through the multiple image processing units in the image processing unit group;

a pass unit group including multiple pass units that are connected in series to receive second intermediate data representing a black and white edge pattern and sequentially transfer the second intermediate data synchronously with transfer of the first intermediate data through the multiple image processing units;

an intermediate data generation unit that divides the input image data into at least one unit pixel group including a preset number of plural pixels, generates the first intermediate data and the second intermediate data according to a characteristic of the unit pixel group, generating an edge detection flag if the unit pixel group is from a black and white edge pattern, and outputs the generated first intermediate data to a first image processing unit on a first stage of the image processing unit group, while outputting the generated second intermediate data to a first pass unit on a first stage of the pass unit group;

a data selector that inputs both the first intermediate data that has gone through the respective series of image processing by the image processing unit group and the second intermediate data that has been sequentially transferred through the pass unit group and selects one of the input first and second intermediate data based whether the edge detection flag is set;

a data storage module that stores the intermediate data selected by the data selector; and an output image generation module that generates an output image, based on at least either of outputs from the image processing unit group and from the pass unit group;

wherein the intermediate data generation unit has a detection module that detects either presence or absence of an edge in the unit pixel group and a data generation module that, in response to detection of the presence of an edge by the detection module, generates the second intermediate data representing a black and white edge pattern;

the intermediate data generation unit outputs the generated edge detection flag with the second intermediate data to the pass unit group;

the data selector inputs the second intermediate data with the edge detection flag and selects one of the first intermediate data and the second intermediate data according to the input edge detection flag;

the output image generation module uses the intermediate data stored in the data storage module to generate the output image; and the output image generation module individually performs a different halftoning process for each of the processed first intermediate data which is output from the image processing unit group and the second intermediate data which is output from the pass unit group, so as to generate the output image.

* * * * *